United States Patent
Nordlin et al.

(10) Patent No.: US 11,633,794 B2
(45) Date of Patent: Apr. 25, 2023

(54) CONTROL DEVICE FOR AND METHOD OF OPERATING A METAL CLAD CABLE CUTTING MACHINE

(71) Applicant: Greenlee Tools, Inc., Rockford, IL (US)

(72) Inventors: William Frederick Nordlin, Poplar Grove, IL (US); Sean A. Daugherty, Yadkinville, NC (US); John Jeremiah Morton, Chattanooga, TN (US); Daniel John Marben, Rockford, IL (US); Sumeet Pujari, Elgin, IL (US)

(73) Assignee: GREENLEE TOOLS, INC., Rockford, IL (US)

( * ) Notice: Subject to any disclaimer, the term of this patent is extended or adjusted under 35 U.S.C. 154(b) by 172 days.

(21) Appl. No.: 15/690,003

(22) Filed: Aug. 29, 2017

(65) Prior Publication Data
US 2018/0062360 A1 Mar. 1, 2018

Related U.S. Application Data

(60) Provisional application No. 62/382,768, filed on Sep. 1, 2016.

(51) Int. Cl.
*B23D 35/00* (2006.01)
*B23D 29/00* (2006.01)
(Continued)

(52) U.S. Cl.
CPC ......... *B23D 35/005* (2013.01); *B23D 29/002* (2013.01); *B23D 35/002* (2013.01); *B23D 45/003* (2013.01); *G05B 19/182* (2013.01); *H02G 1/005* (2013.01); *H02G 1/1297* (2013.01); *B23D 15/14* (2013.01); *B23D 33/02* (2013.01); *B23D 33/10* (2013.01); *G05B 2219/45044* (2013.01)

(58) Field of Classification Search
CPC .... B23D 35/002; B23D 35/005; H02G 1/005; H02G 1/1263; H02G 1/1268; H02G 1/1229–1234; H02G 1/1297
USPC .......................................... 83/408, 924, 947
See application file for complete search history.

(56) References Cited

U.S. PATENT DOCUMENTS 2,171,541 A * 9/1939 Crouch .................. B23D 47/10
83/370
2,293,754 A 8/1942 Ludke et al.
(Continued)

FOREIGN PATENT DOCUMENTS

DE 102008047542 A1 3/2010

OTHER PUBLICATIONS

"Cable Stripping and Handling Equipment Catalog," Seatek Co. Inc., www.seatek.com, 16 pages.
(Continued)

*Primary Examiner* — Laura M Lee
(74) *Attorney, Agent, or Firm* — Klintworth & Rozenblat IP LLP

(57) ABSTRACT

A control device according to some embodiments of the disclosure includes one or more motors directed by the control device to form whip(s) from a length of a cable by causing the cutting of the cable in accordance with specifications based at least in part on whip information. An interface communicates the whip information between the control device and a user device.

20 Claims, 55 Drawing Sheets

(51) Int. Cl.
   *H02G 1/12*    (2006.01)
   *B23D 45/00*   (2006.01)
   *G05B 19/18*   (2006.01)
   *H02G 1/00*    (2006.01)
   *B23D 33/10*   (2006.01)
   *B23D 33/02*   (2006.01)
   *B23D 15/14*   (2006.01)

(56) References Cited

U.S. PATENT DOCUMENTS

| | | | | |
|---|---|---|---|---|
| 2,480,536 | A | * | 8/1949 | Andrus .............. B23D 47/08 83/81 |
| 2,683,930 | A | | 7/1954 | Walters |
| 2,693,057 | A | * | 11/1954 | Eastwood ............ B24B 27/06 451/231 |
| 2,989,806 | A | | 6/1961 | Davis |
| 3,136,045 | A | | 6/1964 | De Rieux et al. |
| 3,316,781 | A | * | 5/1967 | Bignell et al. .......... H01B 7/36 81/9.51 |
| 3,374,698 | A | * | 3/1968 | Sleeper ................ B21F 11/00 83/171 |
| 3,386,322 | A | * | 6/1968 | Stone et al. .......... B23D 47/08 83/488 |
| 3,523,392 | A | * | 8/1970 | Carl ..................... H02G 1/005 451/236 |
| 3,545,336 | A | * | 12/1970 | Savko ................... B23C 3/28 409/157 |
| 3,593,460 | A | * | 7/1971 | Hensley ............... B23D 47/08 451/121 |
| 3,789,279 | A | * | 1/1974 | Dempsey ............. B23D 47/08 219/751 |
| 3,817,132 | A | * | 6/1974 | Emery et al. ......... H01B 15/005 83/105 |
| 3,959,877 | A | | 6/1976 | Zorzenon |
| 4,055,097 | A | * | 10/1977 | Ducret ................ B23D 45/122 83/169 |
| 4,103,578 | A | | 8/1978 | Ducret |
| 4,169,400 | A | | 10/1979 | Ducret |
| 4,476,754 | A | * | 10/1984 | Ducret ................ B23D 47/042 83/150 |
| 4,538,487 | A | * | 9/1985 | Hatfield et al. ...... G02B 6/4498 81/9.51 |
| 4,584,912 | A | | 4/1986 | Gudmestad et al. |
| 4,592,253 | A | * | 6/1986 | Hatfield ............... H02G 1/1268 30/90.6 |
| 4,901,611 | A | * | 2/1990 | Bentley ............... B23D 45/124 82/100 |
| 5,105,702 | A | * | 4/1992 | Fara .................... H01B 15/005 81/9.51 |
| 5,199,328 | A | * | 4/1993 | Hoffa .................. H02G 1/1256 81/9.42 |
| 5,454,287 | A | | 10/1995 | Fuchigami et al. |
| 5,456,148 | A | * | 10/1995 | Hoffa .................. H02G 1/1256 198/626.4 |
| 5,487,220 | A | | 1/1996 | Saitou |
| 5,542,327 | A | * | 8/1996 | Schultz ................ H01B 15/006 29/426.4 |
| 6,038,903 | A | | 3/2000 | Traub |
| 6,152,003 | A | | 11/2000 | Jung |
| 6,230,542 | B1 | | 5/2001 | Frenken |
| 6,234,057 | B1 | | 5/2001 | Vorpahl |
| 6,311,600 | B1 | * | 11/2001 | Lo et al. .............. H02G 1/126 30/90.9 |
| 6,766,724 | B2 | * | 7/2004 | Bernardelle et al. ......... H02G 1/1256 29/33 F |
| 6,886,438 | B2 | * | 5/2005 | Viviroli et al. ....... H01R 43/28 81/9.51 |
| 7,254,982 | B2 | | 8/2007 | Frenken |
| 7,340,812 | B2 | * | 3/2008 | Speck .................. H01R 43/055 29/33 M |
| 9,270,095 | B2 | | 2/2016 | Johnston |
| 9,327,424 | B2 | * | 5/2016 | Jonsson et al. ....... B23D 47/08 |
| 2009/0151167 | A1 | | 6/2009 | Lu et al. |
| 2015/0151367 | A1 | | 6/2015 | Frenken |

OTHER PUBLICATIONS

"MC Whip™ Standardized Cut-to-Length MC Cable With Installed Fittings," Southwire OEM Division, www.southwire.com/commercialproductspecs, 2 pages.
http://katalog.klauke.com/en/electrical/products/crimping-and-cutting-tools/battery-operated-crimping-and-cutting-tools/battery-powered-cutting-tools/, 1 page.
http://katalog.klauke.com/en/electrical/products/crimping-and-cutting-tools/hydraulic-crimping-and-cutting-heads/hydraulic-cutting-heads/, 1 page.
http://katalog.klauke.com/en/electrical/products/crimping-and-cutting-tools/hydraulic-drive-units/, 1 page.
Machine translation of DE 102008047542.
Office Action from United States U.S. Appl. No. 15/688,965 dated Feb. 28, 2020, 9 pages.
Office Action from United States U.S. Appl. No. 15/688,965 dated Jul. 28, 2020, 13 pages.

\* cited by examiner

| | | | 900 | 1 | 902 | 904 | 906 | 908 |
|---|---|---|---|---|---|---|---|---|

| Greenlee | C3 Auto W Types | | | |
|---|---|---|---|---|
| Revision | | | | |
| Units | Standard | | | |
| Cable # | Cable Man | Cable Armo | Cable Type | Notch Dep | Notch Length |
| 1 | Generic | Aluminum | 10-2 Solid | 0.4375 | 0 |
| 2 | Generic | Aluminum | 10-3 Solid | 0.1875 | 0 |
| 3 | Generic | Aluminum | 10-4 Solid | 0.3125 | 0 |
| 4 | Generic | Aluminum | 12-2 Stranded | 0.375 | 0 |
| 5 | Generic | Aluminum | 12-3 Stranded | 0.3125 | 0 |
| 6 | Generic | Aluminum | 12-4 Stranded | 0.125 | 0 |
| 7 | Generic | Aluminum | 10-2 Stranded | 0.3125 | 0 |
| 8 | Generic | Aluminum | 10-3 Stranded | 0.375 | 0 |
| 9 | Generic | Aluminum | 10-4 Stranded | 0.25 | 0 |
| 10 | Generic | Aluminum | 8-2 Stranded | 0.1875 | 0 |
| 11 | Generic | Aluminum | 8-3 Stranded | 0.25 | 0 |
| 12 | Generic | Aluminum | 8-4 Stranded | 0.1875 | 0 |
| 13 | Generic | Aluminum | 6-2 Stranded | 0.375 | 0.1 |
| 14 | Generic | Aluminum | 6-3 Stranded | 0.3125 | 0.125 |
| 15 | Generic | Aluminum | 6-4 Stranded | 0.3125 | 0.175 |
| 16 | Generic | Aluminum | 12-6 Solid | 0.25 | 0 |
| 17 | Generic | Aluminum | 12-8 Solid | 0.0625 | 0 |
| 18 | Generic | Aluminum | 10-6 Solid | 0.0625 | 0 |
| 19 | Generic | Aluminum | 10-8 Solid | 0.25 | 0 |
| 20 | Generic | Steel | 8-2 Stranded | 0.125 | 0 |
| 21 | Generic | Steel | 8-3 Stranded | 0.1875 | 0 |
| 22 | Generic | Steel | 8-4 Stranded | 0.4375 | 0 |
| 23 | Generic | Steel | 6-2 Stranded | 0.25 | 0.1 |
| 24 | Generic | Steel | 6-3 Stranded | 0.0625 | 0.125 |
| 25 | Generic | Steel | 6-4 Stranded | 0.125 | 0.175 |

Processed    0

FIG. 63

900 — Greenlee Revision Units · C3 Auto Whip 2 Standard — 902

| Cable Man Generic | Cable Armor Aluminum | Cable Type 10/2 Solid — 904 | | |
|---|---|---|---|---|
| Whip # | Whip Length | Lead Length | Tail Length — 914 | # of Whips — 916 |
| 1 | 0 | 0 | 0 | 0 |
| 2 | 0 — 910 | 0 — 912 | 0 | 0 |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| 7 | 0 | 0 | 0 | 0 |
| 8 | 0 | 0 | 0 | 0 |
| 9 | 0 | 0 | 0 | 0 |
| 10 | 0 | 0 | 0 | 0 |
| 11 | 0 | 0 | 0 | 0 |
| 12 | 0 | 0 | 0 | 0 |
| 13 | 0 | 0 | 0 | 0 |
| 14 | 0 | 0 | 0 | 0 |
| 15 | 0 | 0 | 0 | 0 |
| 16 | 0 | 0 | 0 | 0 |
| 17 | 0 | 0 | 0 | 0 |
| 18 | 0 | 0 | 0 | 0 |
| 19 | 0 | 0 | 0 | 0 |
| 20 | 0 | 0 | 0 | 0 |
| 21 | 0 | 0 | 0 | 0 |
| 22 | 0 | 0 | 0 | 0 |
| 23 | 0 | 0 | 0 | 0 |
| 24 | 0 | 0 | 0 | 0 |
| 25 | 0 | 0 | 0 | 0 |
| 26 | 0 | 0 | 0 | 0 |
| 27 | 0 | 0 | 0 | 0 |
| 28 | 0 | 0 | 0 | 0 |
| 29 | 0 | 0 | 0 | 0 |
| 30 | 0 | 0 | 0 | 0 |
| 31 | 0 | 0 | 0 | 0 |
| 32 | 0 | 0 | 0 | 0 |
| 33 | 0 | 0 | 0 | 0 |
| 34 | 0 | 0 | 0 | 0 |
| 35 | 0 | 0 | 0 | 0 |
| 36 | 0 | 0 | 0 | 0 |
| 37 | 0 | 0 | 0 | 0 |
| 38 | 0 | 0 | 0 | 0 |
| 39 | 0 | 0 | 0 | 0 |
| 40 | 0 | 0 | 0 | 0 |
| 41 | 0 | 0 | 0 | 0 |

| Cable Type Configuration | | | | | |
|---|---|---|---|---|---|
| Cable # | Cable Manufacturer | Cable Armor | Cable Type | Notch Depth | Notch Length |
| ## | XXXXXXXXXXXXX | XXXXXXXXX | XXXXXX | #.### | #.### |
| ## | XXXXXXXXXXXXX | XXXXXXXXX | XXXXXX | #.### | #.### |
| ## | XXXXXXXXXXXXX | XXXXXXXXX | XXXXXX | #.### | #.### |
| ## | XXXXXXXXXXXXX | XXXXXXXXX | XXXXXX | #.### | #.### |
| ## | XXXXXXXXXXXXX | XXXXXXXXX | XXXXXX | #.### | #.### |
| ## | XXXXXXXXXXXXX | XXXXXXXXX | XXXXXX | #.### | #.### |
| ## | XXXXXXXXXXXXX | XXXXXXXXX | XXXXXX | #.### | #.### |
| ## | XXXXXXXXXXXXX | XXXXXXXXX | XXXXXX | #.### | #.### |
| ## | XXXXXXXXXXXXX | XXXXXXXXX | XXXXXX | #.### | #.### |
| ## | XXXXXXXXXXXXX | XXXXXXXXX | XXXXXX | #.### | #.### |

Back | Input Screen | Download from USB | Page Dn

| Whip Configuration | | | | C3 Auto Whip |
|---|---|---|---|---|
| Whip # | Whip Length | Lead Length | Trail Length | # of Whips |
| 1 | ##### | ####.# | ####.# | ##### |
| 2 | ##### | ####.# | ####.# | ##### |
| 3 | ##### | ####.# | ####.# | ##### |
| 4 | ##### | ####.# | ####.# | ##### |
| 5 | ##### | ####.# | ####.# | ##### |
| 6 | ##### | ####.# | ####.# | ##### |
| 7 | ##### | ####.# | ####.# | ##### |

Main Menu | Input Screen | Download from USB | Page Dn

Cut Length Setup — C3 Auto Whip
- Reset
- Notch: Increase / Decrease — 186
- Notch Pos: #.##
- # of Cables: ####
- Lead Length: ###
- Trail Length: ###
- Cut Length: ##### — 198
- Setup Menu
- Main Screen
- Pause Cycle
- Cancel Cycle
- Start Cycle
- Start Cycle

FIG. 69

Progress Screen — C3 Auto Whip

| Cable Manufacturer | Cable Armor | Cable Type | Notch Depth |
|---|---|---|---|
| XXXXXXXXXXXXXXXXXXXX | XXXXXXX | XXXXXXX | #.## |

- Whip #: ##
- Lead Length: ##.#
- Tail Length: ##.#
- Whip Length: ###
- Whip Qty. Start: ####
- Cable Length On Spool: ###### FT.
- Qty. Completed: ####
- Remaining On Spool: ###### FT.
- Saw Cuts: 3501
- # of Notch Cuts: 2005
- Main Menu / Favorites / Input Screen 1 / Change Saw Blade
- Saw Cuts > Change Wheel

CONTROL DEVICE FOR AND METHOD OF OPERATING A METAL CLAD CABLE CUTTING MACHINE

CROSS-REFERENCE TO RELATED APPLICATION

This application claims the domestic benefit of U.S. provisional application Ser. No. 62/382,768, filed on Sep. 1, 2016, the contents of which are incorporated herein by reference.

FIELD OF THE DISCLOSURE

The present disclosure relates to a machine configured to form whip(s) from a length of cable.

BACKGROUND

Electrical power cables are traditionally installed in commercial buildings using straight lengths of steel or aluminum conduit. In recent years, flexible metallic cable AKA MC (metal clad) cable, BX cable, AC cable and Greenfield flexible conduit have become popular as a faster, less expensive option to install various electrical conductors into buildings. The flexible metal cable is formed of a helical, spiral wound strip of aluminum or steel which is roll-formed to lock onto itself. The metal cable is sold in 25-foot to 1000-foot reel lengths and is pre-loaded with various numbers of wires, wire sizes, and insulator colors. The flexible metal cable can be cut to length with shearing cable cutter, a hacksaw, or a rotary cutoff saw, and the ends can be stripped to expose the wire ends. Stripping the cable involves cutting one width of the metallic helical wound strip and then pulling the cut end of the conduit off of the cable. Various methods have been devised to cut the metallic conduit without damaging the wires inside, but all such known methods require considerable time and effort.

SUMMARY

A control device configured to direct a machine to form whip(s) from a length of cable, in accordance with some example embodiments, includes one or more motors that under the control of the control device cause the cutting of the cable in accordance with specifications based at least in part on whip information. An interface communicates the whip information between the control device and a user device.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIGS. 63 and 64 depict spreadsheets used to fabricate the whips;

FIGS. 66-68 depict screenshots of an example display of the user interface during setup to form a whip(s);

FIG. 69 depicts a screenshot of an example display of the user interface during a whip forming operation.

DETAILED DESCRIPTION

Figure 1:
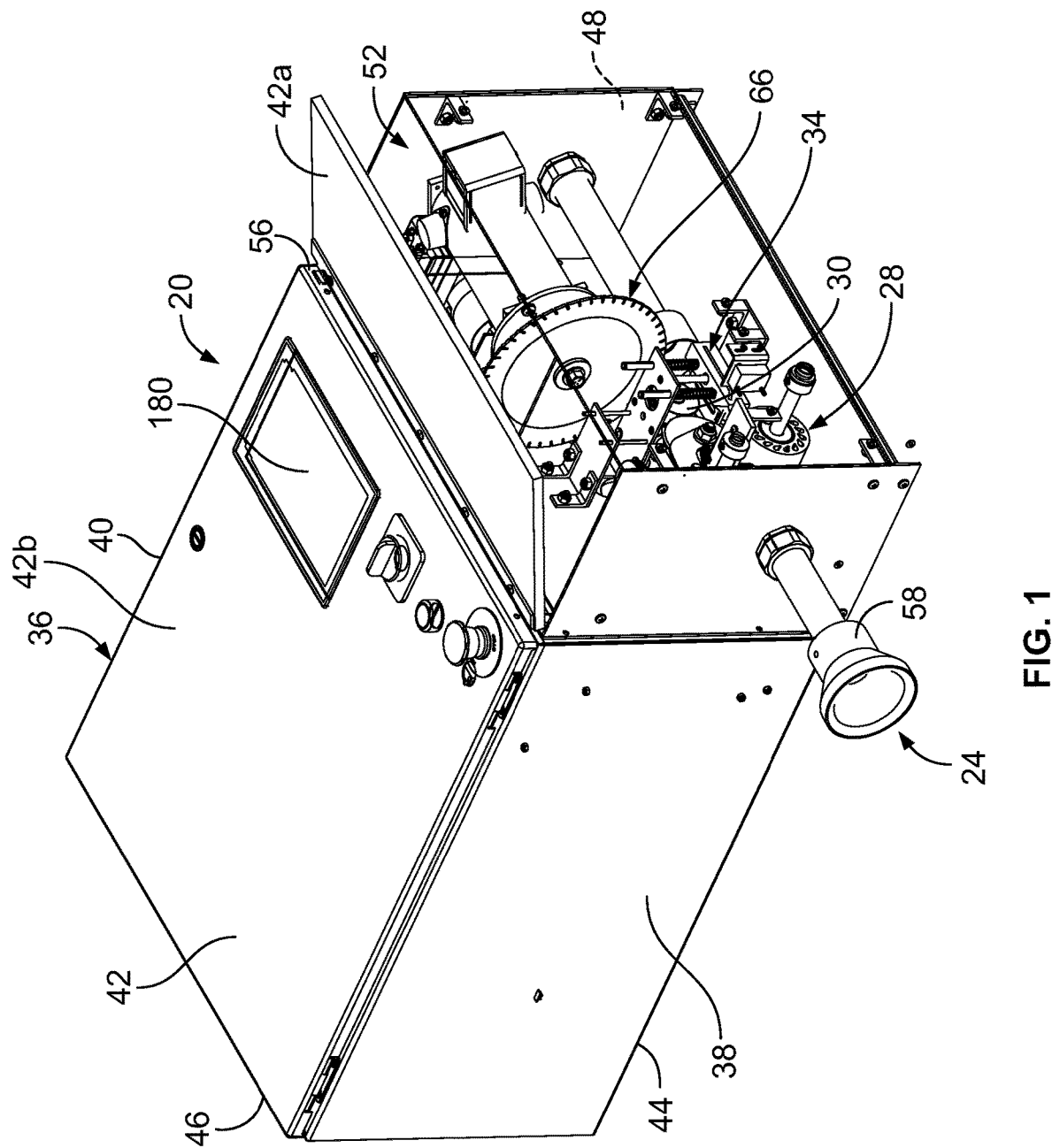
FIG. 1 depicts a perspective view of a machine showing an embodiment of a cabinet, the machine configured to form a whip.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

A machine 20 configured to cut a flexible metal clad cable 22 to form a whip is disclosed. The cable 22 may be coated with polyvinyl chloride (PVC). The machine 20 cuts the cable 22 such that the cut end of the cable 22 can be easily removed. A length(s) of cable is fed into a feed end 24 of the machine 20. The formed whip (not shown) exits a discharge end 26 of the machine 20. A whip is also called a pig-tail.

Metal clad cables are known. A metal clad cable 22 has a plurality of wires which are surrounded by a metal jacket. The metal jacket is formed of a plurality of overlapping turns which form a helical shape along the length of the cable 22.

The machine 20 includes a feed assembly 28 configured to advance the cable 22 through the machine 20 from the feed end 24 to the discharge end 26, a notching saw 30 which notches the cable 22 and a cutting assembly 66 which cuts the cable 22 into individual whips. The machine 20 further includes a clamping assembly 34, 1034, which clamps the cable 22 to deter the cable 22 from moving upwardly and downwardly or side to side in the machine 20 (that is, any direction which is angled relative to the translation direction of the cable 22 through the machine 20) while the cable 22 is being notched by the notching saw 30 and the cutting assembly 66. A first embodiment of the cutting assembly 66 is shown for example in FIGS. 1-3, 42 and 43; a second embodiment of the cutting assembly 66 is shown for example in FIG. 59. A first embodiment of the clamping assembly 34 is shown in FIGS. 19-41; a second embodiment of the clamping assembly 1034 is shown in FIGS. 42-58.

In an embodiment, the cable 22 is fed through the machine 20 by the feed assembly 28 until a first predetermined location on the cable 22 is positioned underneath the notching saw 30 and within the clamping assembly 34, 1034 when the machine 20 is in a raised position. The machine 20 is moved to a clamping position (discussed in detail herein) such that the clamping assembly 34, 1034 is actuated to engage with the cable 22 and to deter movement of the cable 22. In some embodiments, the machine 20 is back tensioned to provide tension to the cable 22 prior to the cable 22 being further acted upon. Thereafter, the machine 20 is moved to a notching position (discussed in detail herein) such that the notching saw 30 is then engaged with the cable 22 to cut or "notch" the metal jacket of the cable 22 at the first predetermined location on the cable 22 by forming a first notch in the cable 22 which cuts a complete turn of the cable 22. During the notching, the wires within the cable 22 are not cut. For example, the first notch can be formed 6 to 8 inches away from where the end of the whip is ultimately provided. The first notch is formed parallel to or substantially parallel to the centerline of the cable 22. The clamping assembly 34, 1034 remains engaged, but does not prevent this movement by the feed assembly 28. Thereafter, in an embodiment, the notching saw 30 and the clamping assembly 34, 1034 are moved to the raised position such that the notching saw 30 and the clamping assembly 34, 1034 are disengaged from the cable 22. In some embodiments, the machine 20 is moved to the clamping position such that only the notching saw 30 is raised to disengage from the cable 22, but the clamping assembly 34, 1034 remains engaged with the cable 22. The cable 22 is then advanced a predetermined amount by the feed assembly 28 toward the discharge end 26 of the machine 20 until a second predetermined location on the cable 22 is positioned underneath the notching saw 30. If the machine 20 was moved to the raised position, the machine 20 is again moved to the clamping position such that the clamping assembly 34, 1034 is actuated to engage with the cable 22 and to deter movement of the cable 22. In some embodiments, the machine 20 is again back tensioned to provide tension to the cable 22 prior to the cable 22 being further acted upon. Thereafter, the machine 20 is moved to the notching position such that the notching saw 30 is then engaged with the cable 22 to cut or "notch" the metal jacket of the cable 22 at the second predetermined location on the cable 22 by forming a second notch in the cable 22 which cuts a complete turn of the cable 22 and which is spaced from the first notch. During the notching, the wires within the cable 22 are not cut. For example, the second notch can be formed 6 to 8 inches away from where the end of the whip is ultimately provided. The second notch is formed parallel to or substantially parallel to the centerline of the cable 22 and is in-line with the first notch. The clamping assembly 34, 1034 remains engaged, but does not prevent this movement. Thereafter, in an embodiment, the notching saw 30 and the clamping assembly 34, 1034 are moved to a raised position such that the notching saw 30 and the clamping assembly 34, 1034 are disengaged from the cable 22. In some embodiments, the machine 20 is moved to the clamping position such that only the notching saw 30 is raised to disengage from the cable 22, but the clamping assembly 34, 1034 remains engaged with the cable 22. The cable 22 is then advanced a predetermined amount by the feed assembly 28 through the machine 20 toward the discharge end 26 of the machine 20 until a third predetermined location on the cable 22 is positioned to be acted upon the cutting assembly 66. If the clamping assembly 34, 1034 was moved to the raised position, the clamping assembly 34, 1034 is again moved to the clamping position. The cutting assembly 66 is then moved into the cable space 62 such that the cutting assembly 66 engages and cuts the cable 22 by cutting the cable 22 perpendicular to, or substantially perpendicular to, the centerline of the cable 22, thereby forming a whip. Thereafter, the cutting assembly 66 is moved to disengage the cutting assembly 66 from the cable 22 and to move out of the cable travel space 62, and in an embodiment, the notching saw 30 and the clamping assembly 34, 1034 are moved to a raised position such that the notching saw 30 and the clamping assembly 34, 1034 are disengaged from the cable 22. In some embodiments, the machine 20 is moved to the clamping position such that only the notching saw 30 is raised to disengage from the cable 22, but the clamping assembly 34, 1034 remains engaged with the cable 22. In some embodiments, the whip is pulled out of the discharge end 26 of the machine 20 by a user. Alternatively, in some embodiments, the whip may be automatically discharged out of the discharge end 26. The operations are then repeated to form subsequent whips. During operation, the clamping assembly 34, 1034 can be moved to a fully raised position, or may be moved to a slightly raised position in which the clamping assembly 34, 1034 is not fully raised.

In some embodiments, during the cutting or notching, the feed assembly 28 advances the cable 22 a predetermined amount toward the discharge end 26 of the machine 20 to elongate the first and second notches and to ensure that complete turn of the helical turn is cut by each notch.

The whip has the two notched ends at either end of the whip. The ends of the metal jacket of the whip can be easily pulled off of the whip to expose the plurality of wires therein. Thereafter, connectors are attached to the ends of the metal jacket in a known manner.

Figure 60:
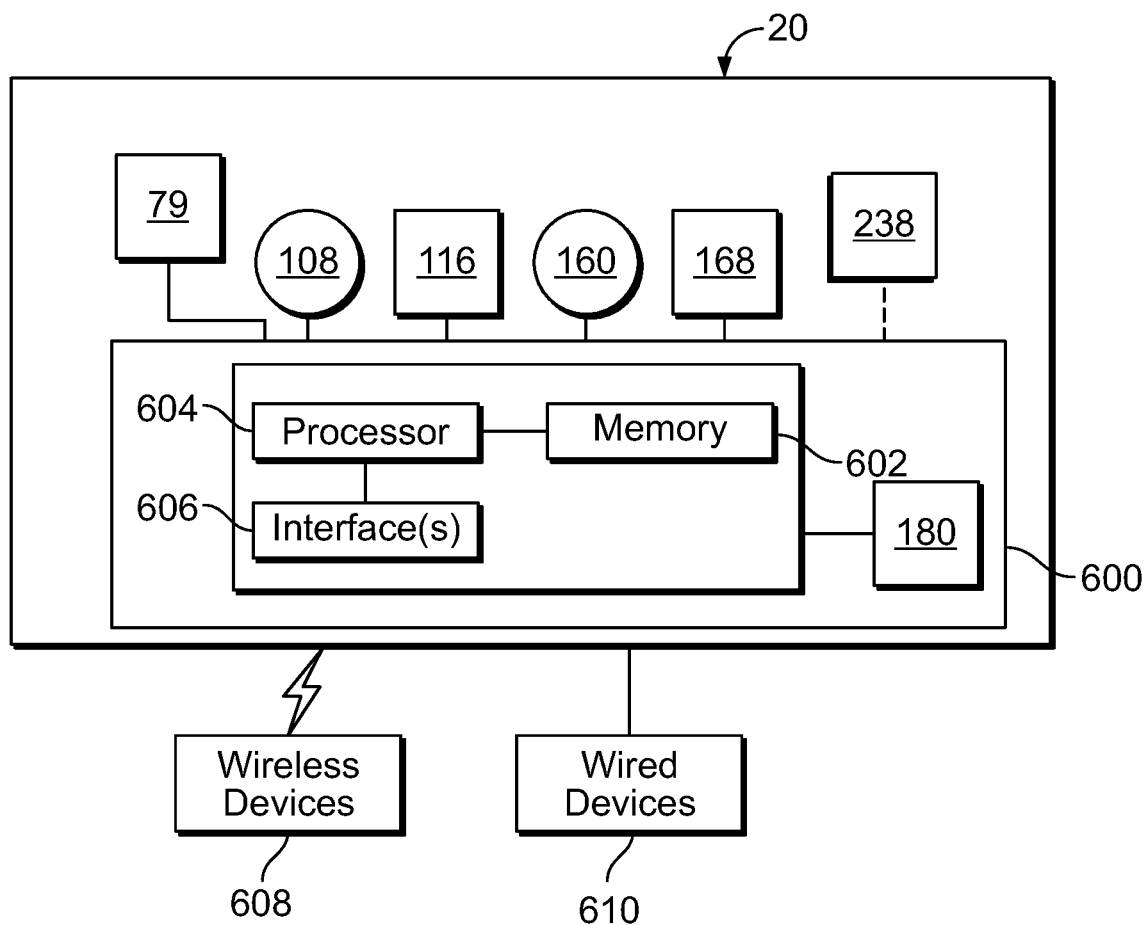
FIG. 60 depicts a block diagram showing the control device(s) of the machine.

In some embodiments, operation of the machine 20 is affected by one or more control device(s) 600, see FIG. 60, which may be at least partially mounted on the machine 20, and/or may be at least partially located in a remote location to the machine 20. In some example embodiments, the control device 600 may be configured to provide a user interface 180 configured to display and/or enter the data used to form the whips.

Figure 2:
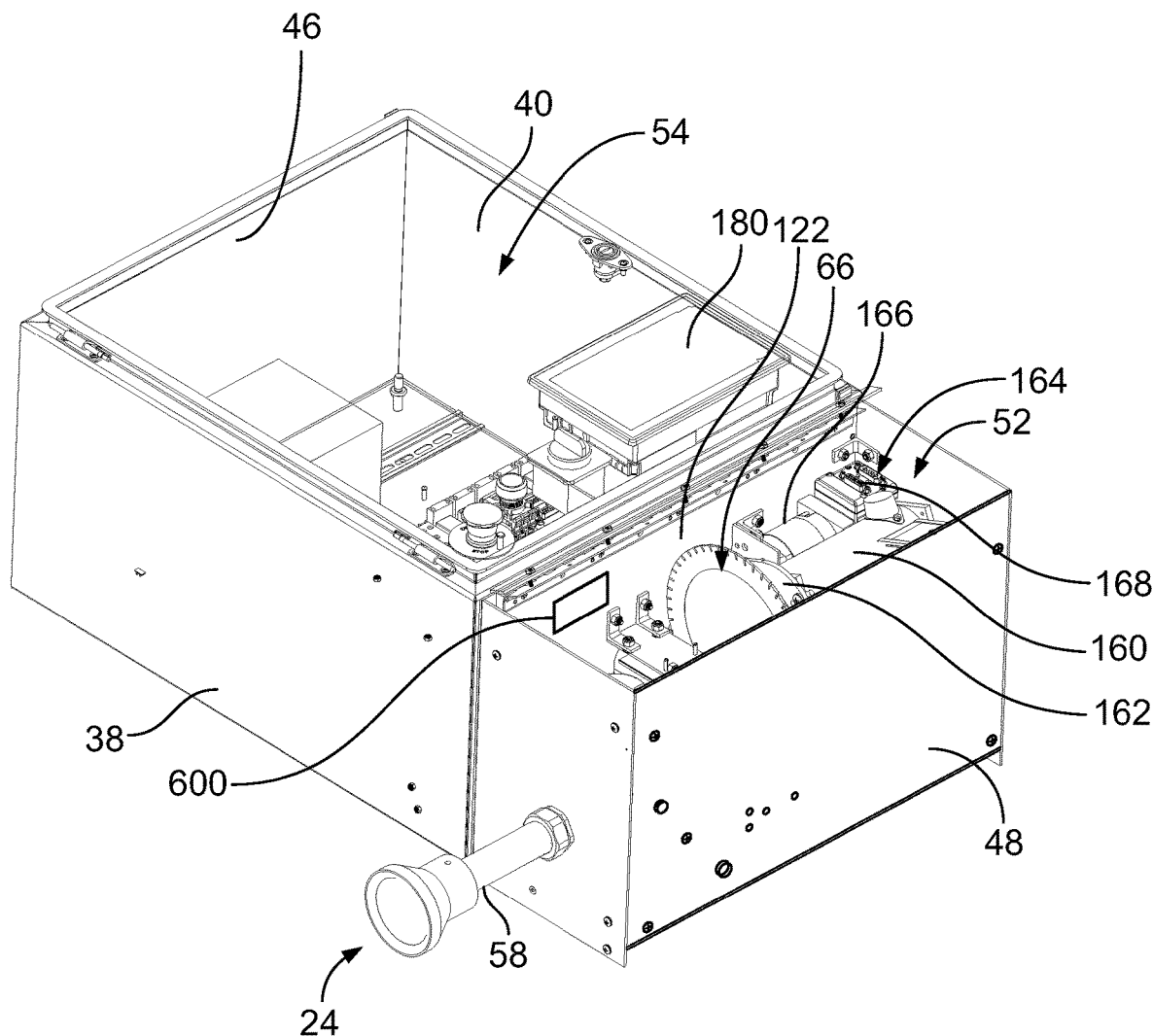
FIG. 2 depicts an alternate perspective view of the machine, but with the top wall of the cabinet removed.
Figure 3:
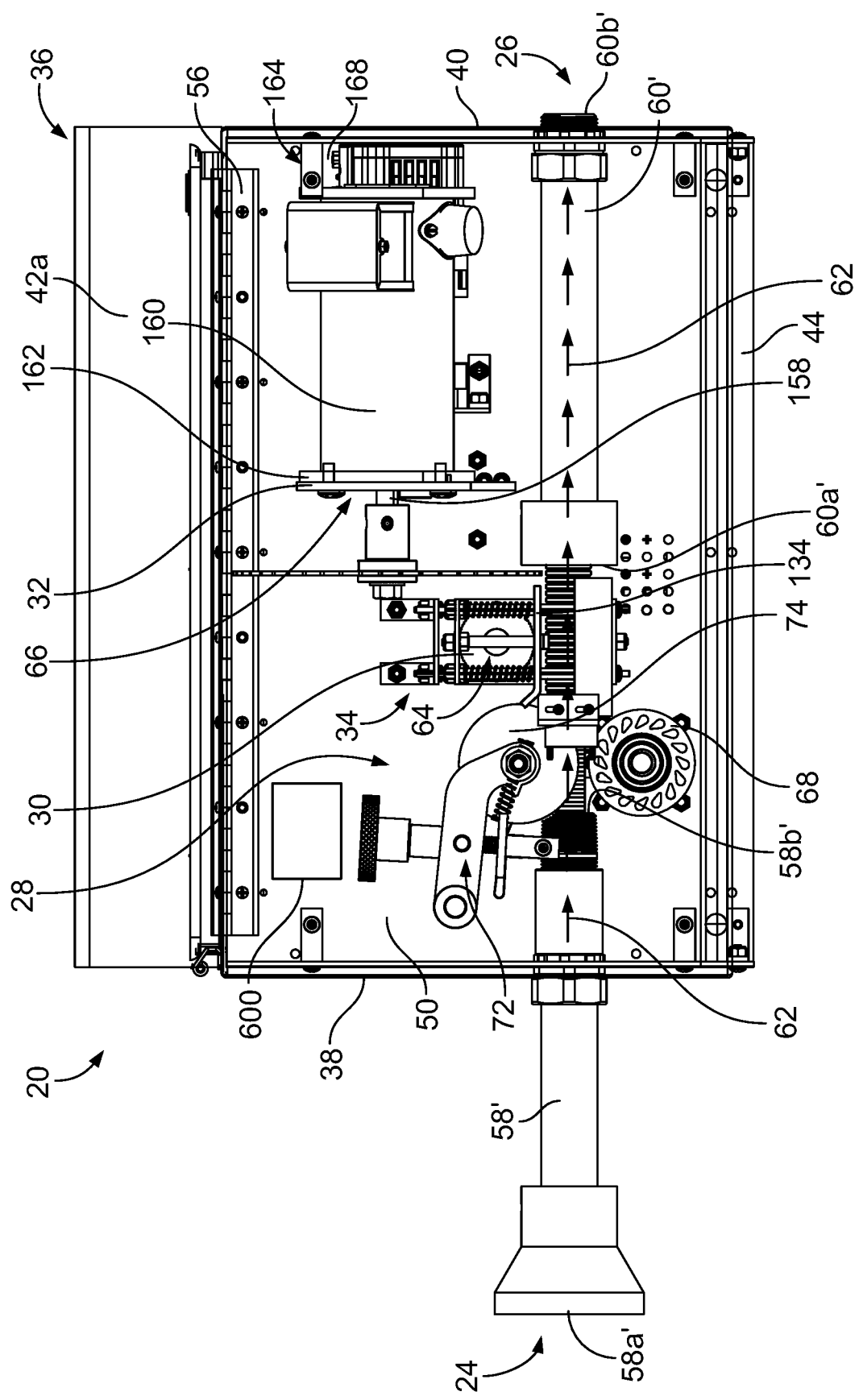
FIG. 3 depicts a side elevation view of the machine, but with the front wall of the cabinet removed.
Figure 4:
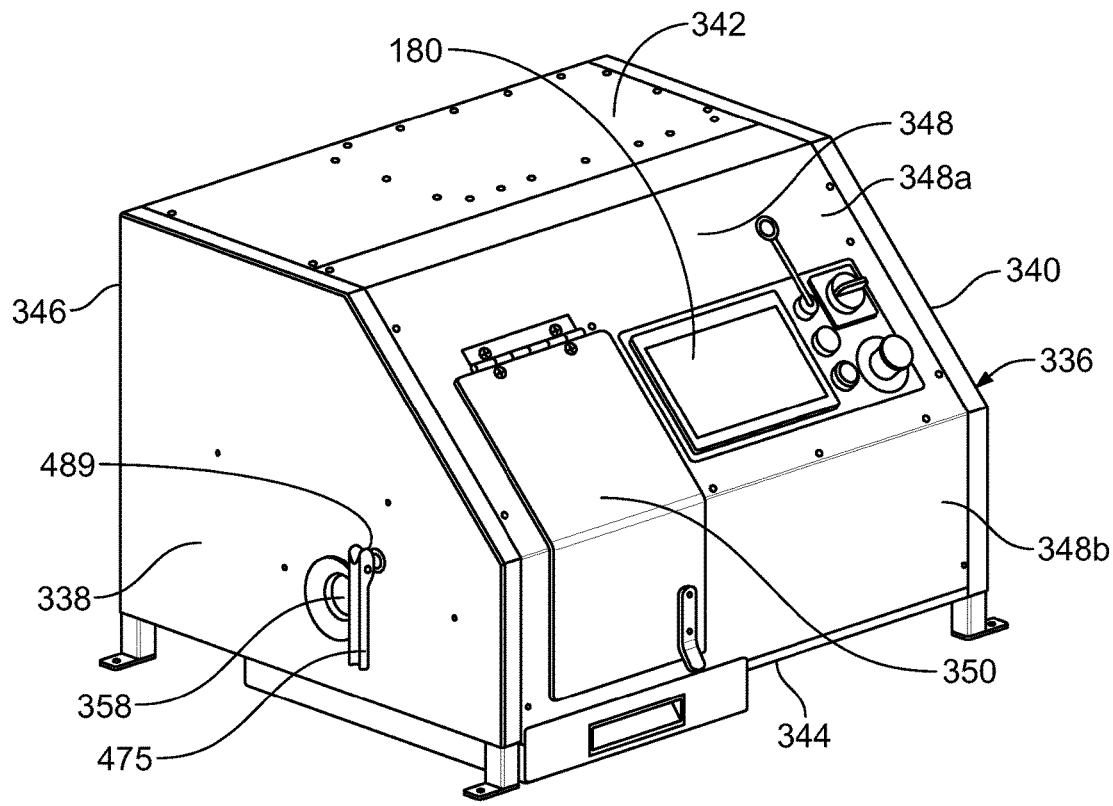
FIG. 4 depicts a perspective view of another embodiment of the machine used to form a whip, with an alternate cabinet design.
Figure 5:
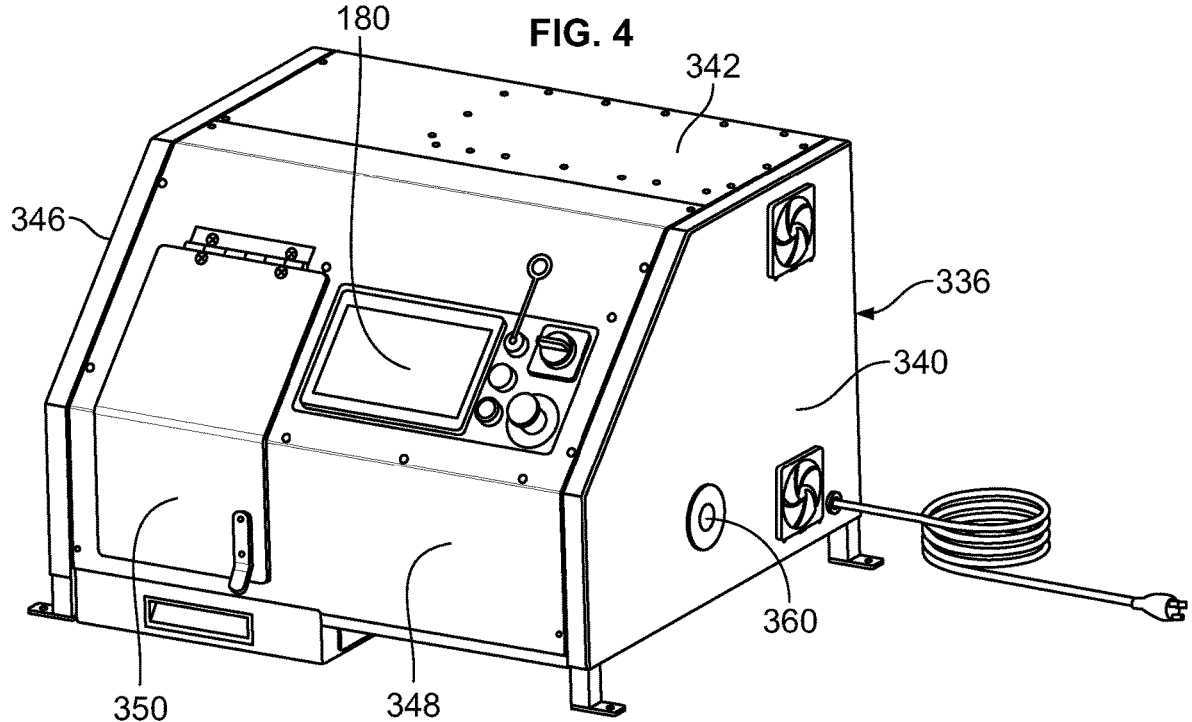
FIG. 5 depicts an alternate perspective view of the machine of FIG. 4.
Figure 6:
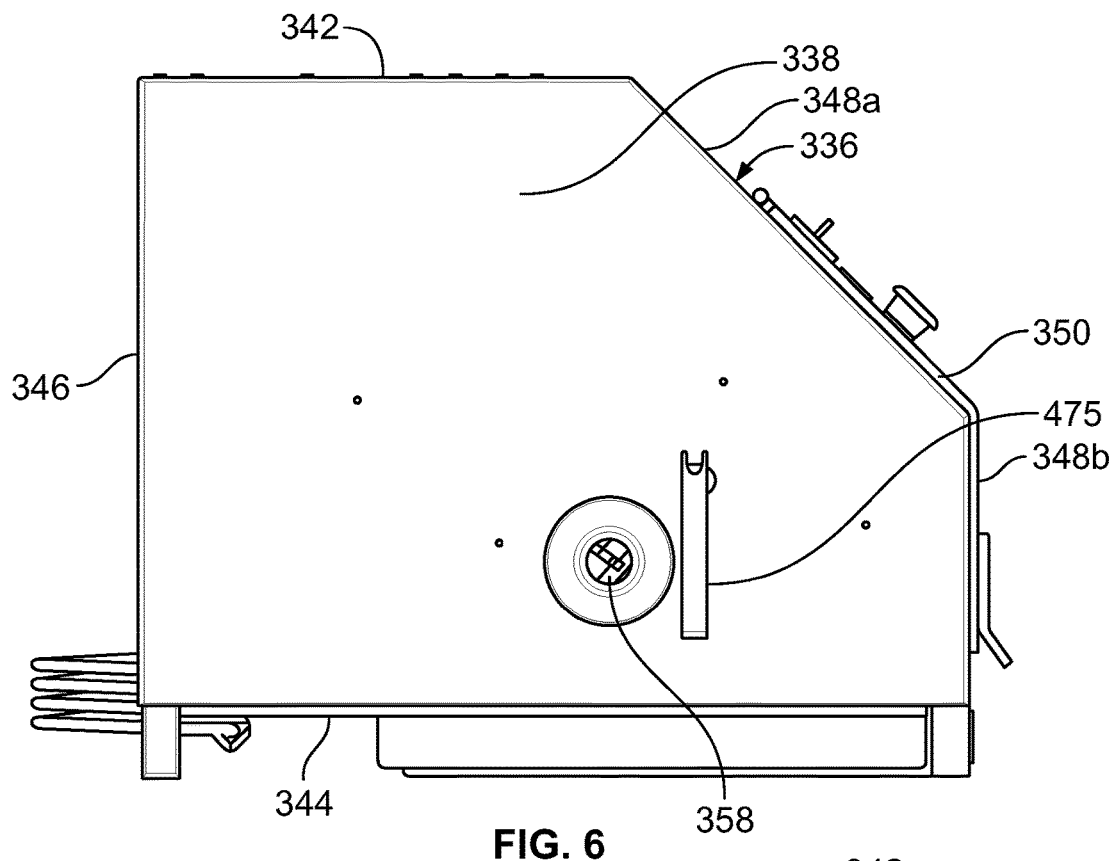
FIG. 6 depicts a front elevation view of the machine of FIG. 4.
Figure 7:
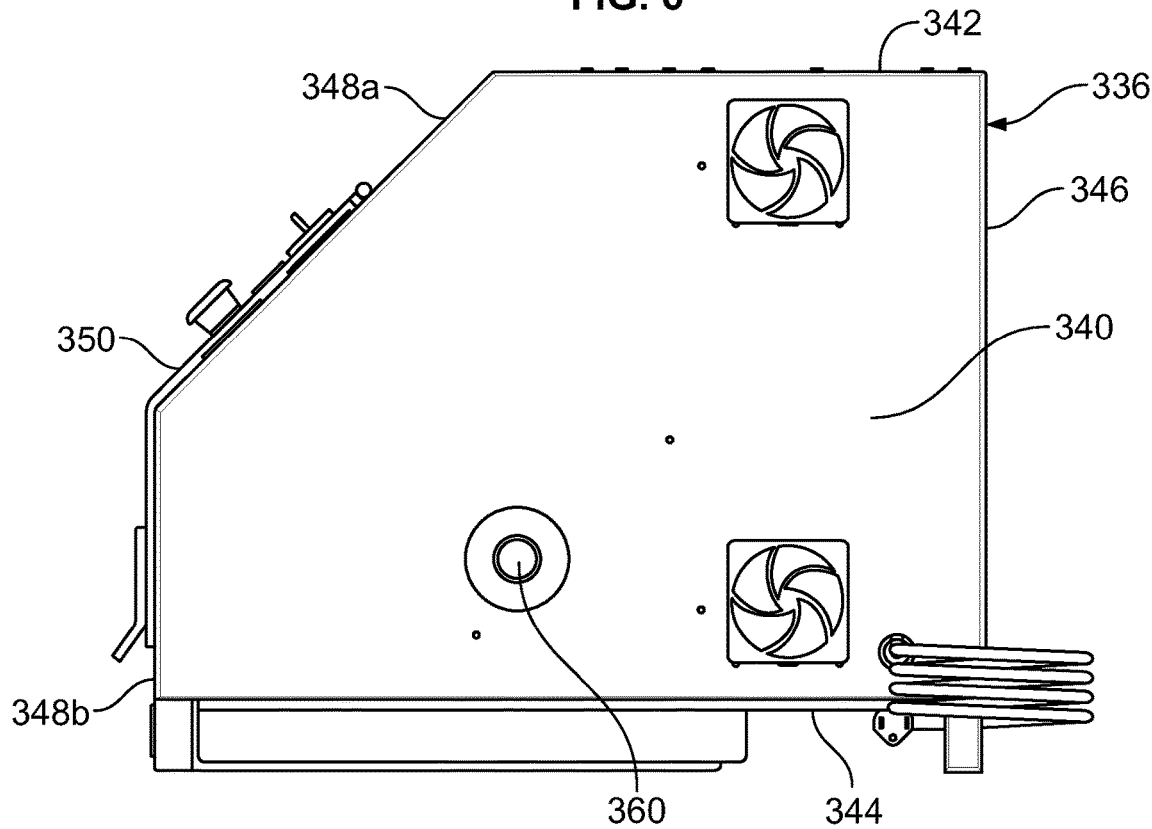
FIG. 7 depicts a rear elevation view of the machine of FIG. 4.
Figure 8:
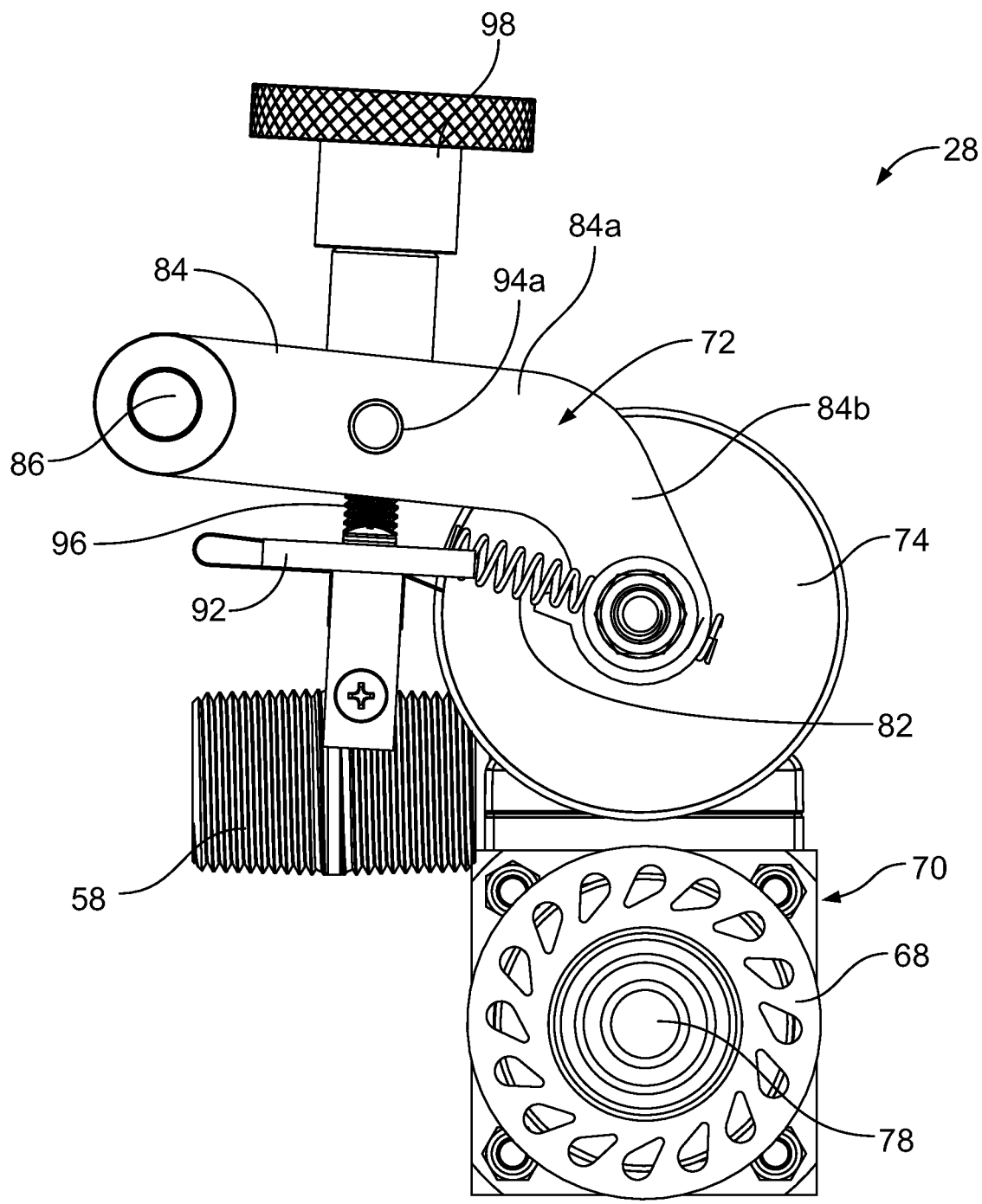
FIG. 8 depicts a side elevation view of an embodiment of a feed assembly of the machine.
Figure 9:
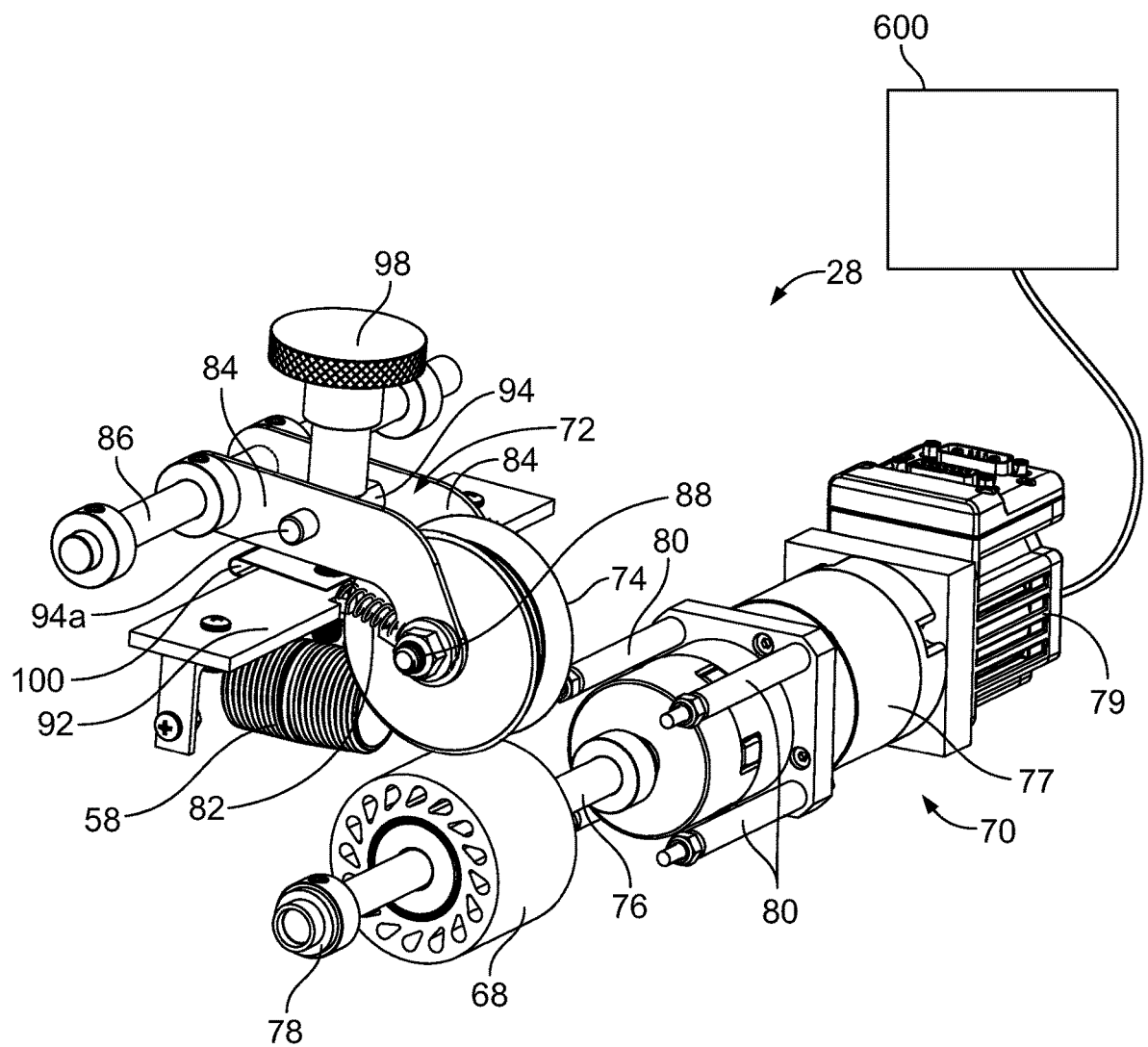
FIG. 9 depicts a perspective view of the feed assembly of FIG. 8.
Figure 10:
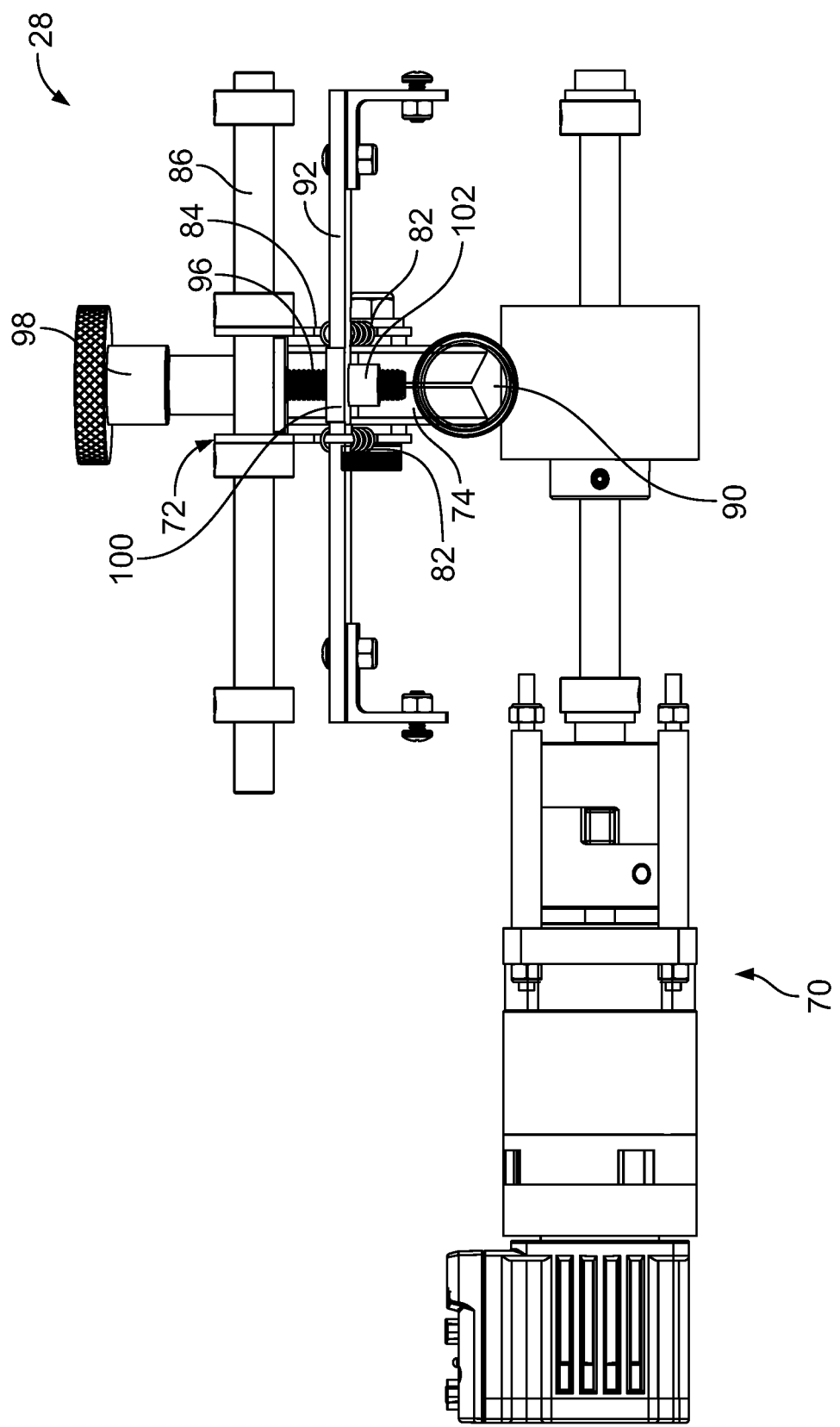
FIG. 10 depicts a front elevation view of the feed assembly of FIG. 8.
Figure 11:
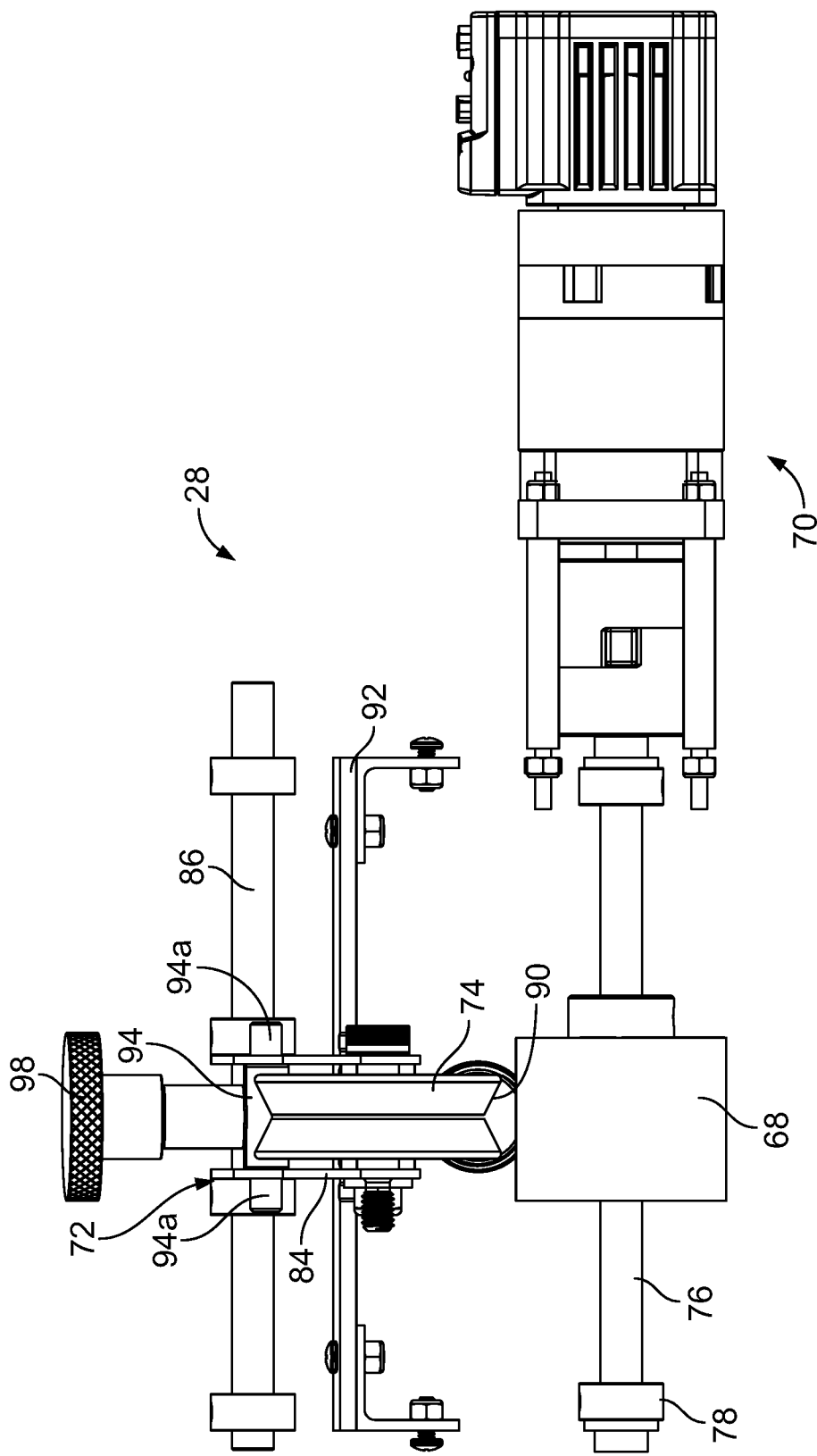
FIG. 11 depicts a rear elevation view of the feed assembly of FIG. 8.
Figure 12:
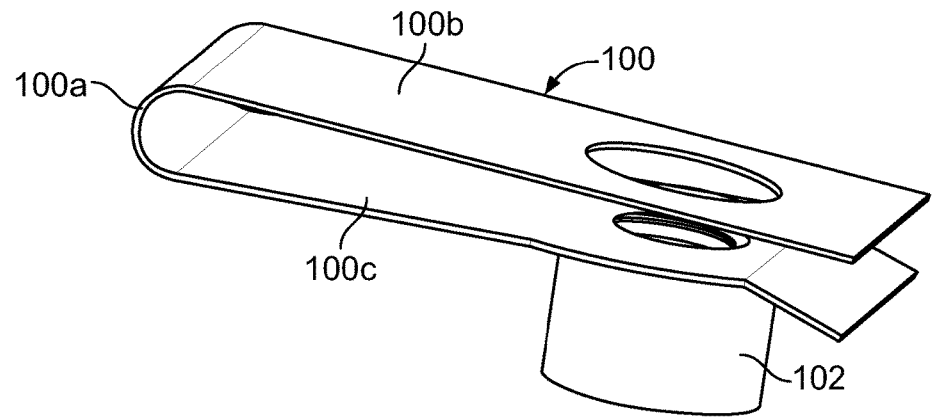
FIG. 12 depicts a perspective view of a spring clip of the feed assembly of FIG. 8.

Turning now to the specifics of the machine 20 of some example embodiments as shown in FIGS. 1-3 shown with the clamping assembly 34, the machine 20 of some example embodiments includes a cabinet 36 in which the feed assembly 28, the notching saw 30, the cutting assembly 66 and the clamping assembly 34 (or clamping assembly 1034) are mounted. The cabinet 36 of such embodiments includes first and second side walls 38, 40, top and bottom walls 42, 44 connecting the side walls 38, 40 together, a rear wall 46 connecting the side walls 38, 40 and the top and bottom walls 42, 44 together, and a front wall 48 (shown in phantom in some of the drawings) connecting the side walls 38, 40 and the top and bottom walls 42, 44 together. An upstanding support wall 50 extends between the side walls 38, 40 to divide the cabinet 36 into a front compartment 52 and a rear compartment 54. Alternatively, in some embodiments, the cabinet 36 may be formed as two separate boxes which are joined together. The top wall 42 of such embodiments is divided into a front wall 48 section 42a and a rear wall section 42b; the front wall section 42a overlays the front compartment 52 and the rear wall section 42b overlays the rear compartment 54. The front wall section 42a of such embodiments is hinged to the support wall 50 or to the top wall 42 at a hinge 56 so that the front wall section 42a can be lifted to access the internal components of the machine 20 within the front compartment 52.

An input 58 configured to feed cable 22 into the machine 20 is provided through the side wall 38 and has an output into the front compartment 52. An output 60 through which formed whips exit from the front compartment is provided through side wall 40. The input 58 defines the feed end 24 of the machine 20 and the output 60 defines the discharge end 26 of the machine 20. In some example embodiments, the input is an input tube 58', which may, for example, extend outwardly from the side wall 38, through the side wall 38 and into the front compartment 52. The input tube 58' has an input end 58a' and an output end 58b' which are linearly aligned. In some embodiments, the input 58 and the output 60 are aligned. In some example embodiments, the output 60 is an output tube 60', which may, for example, extend outwardly from the side wall 40, through the side wall 40 and into the front compartment 52. The output tube 60' of such embodiments has an input end 60a' and an output end 60b' which are linearly aligned. The tubes 58', 60' of such embodiments are aligned with each other. The input end 58a' of the input tube 58' may be enlarged to provide easier feeding of the cable 22 into the machine 20. The cable 22 travels linearly, or generally linearly, through the machine 20 from the input tube 58' to the output tube 60' along a cable travel space 62 (shown by arrows and the area surrounding the arrows) through the machine 20.

Turning now to the specifics of the machine 20 of some example embodiments as shown in FIGS. 4-7, the machine 20 of some example embodiments includes a cabinet 336 in which the feed assembly 28, the notching saw 30, the cutting assembly 66 and the clamping assembly 34 (or clamping assembly 1034) are mounted. The cabinet 336 of such embodiments includes first and second side walls 338, 340, top and bottom walls 342, 344 connecting the side walls 338, 340 together, a rear wall 346 connecting the side walls 338, 340 and the top and bottom walls 342, 344 together, and a front wall 348 (shown in phantom in some of the drawings) connecting the side walls 338, 340 and the top and bottom walls 342, 344 together. The front wall 348 has an upper wall portion 348a which is partially angled relative to a lower wall portion 348b. A hinged wall 350 is connected to the front wall 348 to allow access to some of the internal components of the machine 20. As shown in these figures, the input 358 and output 360 do not extend outwardly from the side walls 338, 340, however, the input 358 and output 360 may extend outwardly from the side walls 338, 340 and be formed as tubes 58', 60'.

The internal components of the machine 20 are divided into the feed assembly 28 which is proximate to the output end of the input 58, the clamping assembly 34 which is proximate to the feed assembly 28, a notching saw assembly 64 which includes the notching saw 30 and which is proximate to the clamping assembly 34, and the cutting assembly 66 and which is proximate to the clamping assembly 34 and to the output 60. The input 58, the feed assembly 28, the clamping assembly 34, the notching saw assembly 64, the cutting assembly 66 and the output 60 are in-line with each other in some embodiments.

As shown in FIGS. 8-17 (which do not show the cabinet 36), the feed assembly 28 of some example embodiments includes a feed roller 68 which is driven by a drive assembly 70, and a pivotable stamping 72, 472 which has an idler roller 74 mounted thereon. The area between the feed roller 68 and the idler roller 74 forms part of the cable travel space 62. In use, the cable 22 is engaged between the feed roller 68 and the idler roller 74, and rotation of the feed roller 68 causes the cable 22 to move in a first direction toward the output 60 and into the clamping assembly 34 or to move in a second opposite direction toward the input 58.

The feed roller 68 has a motor shaft 76 which extends through the support wall 50 and between the support wall 50 and the front wall 48, and is proximate to the output end of the input 58. The motor shaft 76 is rotatably mounted to the front wall 48 by a bearing 78. The motor shaft 76 and the feed roller 68 are driven by the drive assembly 70, which in an embodiment may be a gearbox 77 and a motor 79, such as a servomotor or stepper motor, or any motor along with positional feedback. In an embodiment, the drive assembly 70 is mounted to the support wall 50 by shafts 80. In some embodiments, the feed roller 68 has a cylindrical body.

Attention is invited to the embodiment of the stamping 72 and its idler roller 74 shown in FIGS. 8-12 which may be used in the machine 20 in some embodiments. The stamping 72 and its idler roller 74 are mounted above the feed roller 68 and are biased upwardly and away from the feed roller 68 by a pair of springs 82.

The stamping 72 is formed of a pair of arms 84. Each arm 84 is generally L-shaped and has a first section 84a which is linear, and a second section 84b which extends at an angle relative to the first section 84a, for example at 45-degree relative to the first section 84a. The end of the first section 84a is fixedly mounted on a pivot shaft 86. In an embodiment, the pivot shaft 86 extends between the support wall 50 and the front wall 48 and is rotatable relative thereto. The idler roller 74 is rotatably mounted to the second sections 84b by a shaft 88, and in an embodiment the idler roller 74 is rotatably mounted at the ends of the second sections 84b.

The idler roller 74 may have a V-shaped groove 90 around its perimeter to aid in positioning the cable 22 in the cable travel space 62.

In some embodiments, a support plate 92 is fixedly mounted between the support wall 50 and the front wall 48 and extends underneath the first sections 84a of the arms 84. The springs 82 extend between the support plate 92 and each second section 82b of the arms 84, such that a first end of each spring 82 is attached to the support plate 92 and the second end of each spring 82 is attached to the second end of each arm 84. The springs 82 bias the idler roller 74 upward and away from the feed roller 68 and into the cable travel space 62.

A block 94 may be fixedly mounted between the first sections 84a of the stamping arms 84. The block 94 of some embodiments has a pair of shafts 94a extending outwardly therefrom and which extend through the arms 84. The block 94 of such embodiments has a passageway therethrough which extends from its top surface to its bottom surface.

In accordance with some embodiments, a threaded shaft 96 extends through the passageway, but the passageway is larger than the threaded shaft 96. The threaded shaft 96 has an enlarged knob 98 attached to its upper end.

In some embodiments, a spring clip 100 may be attached to the support plate 92. In some embodiments, the spring clip 100 is generally U-shaped with a U-shaped base 100a having an upper arm 100b extending from the base 100a, a lower arm 100c extending from the base 100a, and a threaded cylinder 102 extending downwardly from the lower arm 100c. The threaded cylinder 102 is permanently affixed to the lower arm 100c. The upper arm 100b engages the upper surface of the support plate 92 and the lower arm 100c engages the lower surface of the support plate 92. The threaded cylinder 102 extends below the support plate 92. The threaded shaft 96 extends through apertures in the upper and lower arms 100b, 100c and threadedly engages with the threaded cylinder 102.

In use, the user lifts the front wall section 42a to access the internal components of the machine 20 within the front compartment 52 and the user rotates the knob 98 to initially position the stamping 72 and its idler roller 74 into the correct position for the size of the cable 22. When the knob 98 is rotated, the threaded shaft 96 rotates relative to the clip 100 and the support plate 92 which causes the block 94 to linearly translate relative to the threaded shaft 96. This also causes the stamping 72 and its idler roller 74 to pivot toward or away from the feed roller 68 to decrease or enlarge the cable travel space 62. As an alternative in some embodiments, the spring clip 100 can be eliminated and the support plate 92 have a threaded aperture which engages with the threaded shaft 96. After the desired position is obtained, the front wall section 42a is closed.

When the cable 22 is fed through the feed assembly 28, the stamping 72 can pivot upwardly to accommodate the size of the cable 22, but applies sufficient pressure to the cable 22 via the biasing provided by the springs 82.

Attention is invited to the embodiment of the stamping 472 and its idler roller 74 shown in FIGS. 13-17 which may be used in the machine 20 in some embodiments. The stamping 472 and its idler roller 74 are mounted above the feed roller 68 and are biased upwardly and away from the feed roller 68 by a handle 475 and a pin 477 connected to the stamping 472.

The stamping 472 is formed of a pair of arms 484 connected together by a pin 469. Each arm 484 is generally L-shaped and has a first section 484a and a second section 484b which extend at an angle relative to each other, for example a 45-degree angle. In an embodiment, one or both of the arms 484 have an extension 484c extending from the second section 484b. The first section 484a has a slot 483 which divides the first section 484a into an upper portion 485a and a lower portion 485b.

In some embodiments and as illustrated, the pivot shaft 486 is mounted on a U-shaped bracket 479 which may be attached to a horizontal support wall 481 that extends between the support wall 50 and the front wall 48. In an embodiment, the support wall 50 is formed by the rear wall 46, 346 of the cabinet 36, 336 and brackets extend upwardly from the support wall 481 to support the components described as being supported by the support wall 50. The bracket 479 has an upper horizontal portion 479a from which legs 479b, 479c extend. The legs 479b, 479c are mounted on the support wall 481 by suitable means, such as fasteners. The pivot shaft 486 extends through the legs 479b, 479c and through the lower portion 485b of each arm 484. In an embodiment, the stamping 472 is rotatable relative to the pivot shaft 486. The stamping 472 is rotatable relative to the bracket 479. The upper portion 479a of the bracket 479 is seated within the slot 483, but the slot 483 is wider than the thickness of the upper portion 479a. The pin 469 is connected between the upper portions 485a of the arms 484 and is above the bracket 479. The pivot shaft 486 is attached to the lower portions 485b of the arms 484 and to the bracket 479, such that the pivot shaft 486 is below the bracket 479. Thus, the bracket 479 is fixed in place in the machine 20, but the stamping 472 is rotatable relative to the bracket 470.

The handle 475 has a gripping portion 487 and an eccentric cam surface 489 at an end thereof. The cam surface 489 engages with the side wall 338 of the cabinet 336 (not shown in FIGS. 13-17, but shown in FIGS. 4 and 5), or with the side wall 38 of the cabinet 36. The pin 477 is rotatably attached to the handle 475 at pivot 491 such that the handle 475 can rotate relative to the pin 477. The pin 477 extends through the side wall 38 of the cabinet 36, such that the pin 477 can only move linearly inwardly and outwardly relative to the side wall 38. The pin 469 passes through pin 477. The pin 469 is rotatable relative to the pin 477.

The feed roller 68 extends through an aperture 485 in the support wall 481.

The idler roller 74 is rotatable on the shaft 488 and rotatable relative to the arms 484. The idler roller 74 is mounted on the second sections 484b of the arms 484, and in an embodiment at the ends of the second sections 484b.

Figure 13:
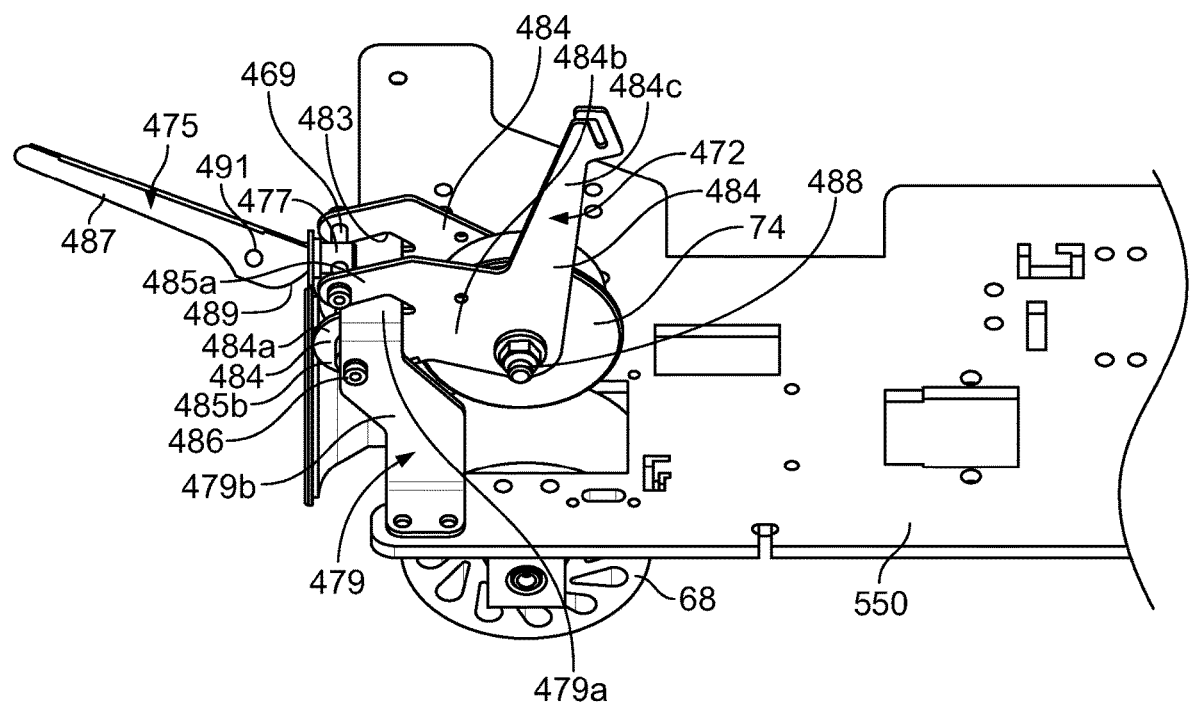
FIG. 13 depicts a perspective view of another embodiment of a feed assembly of the machine with a handle in a first position.
Figure 14:
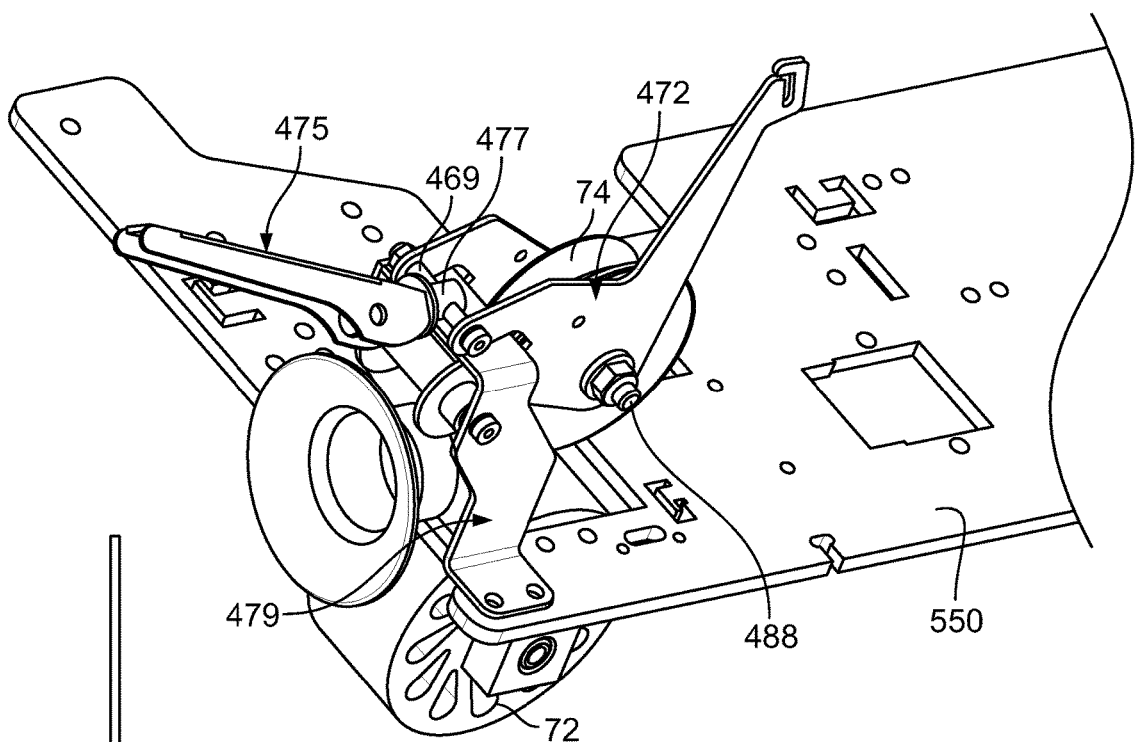
FIG. 14 depicts an alternate perspective view of the feed assembly of FIG. 13 with the handle in the first position.
Figure 15:
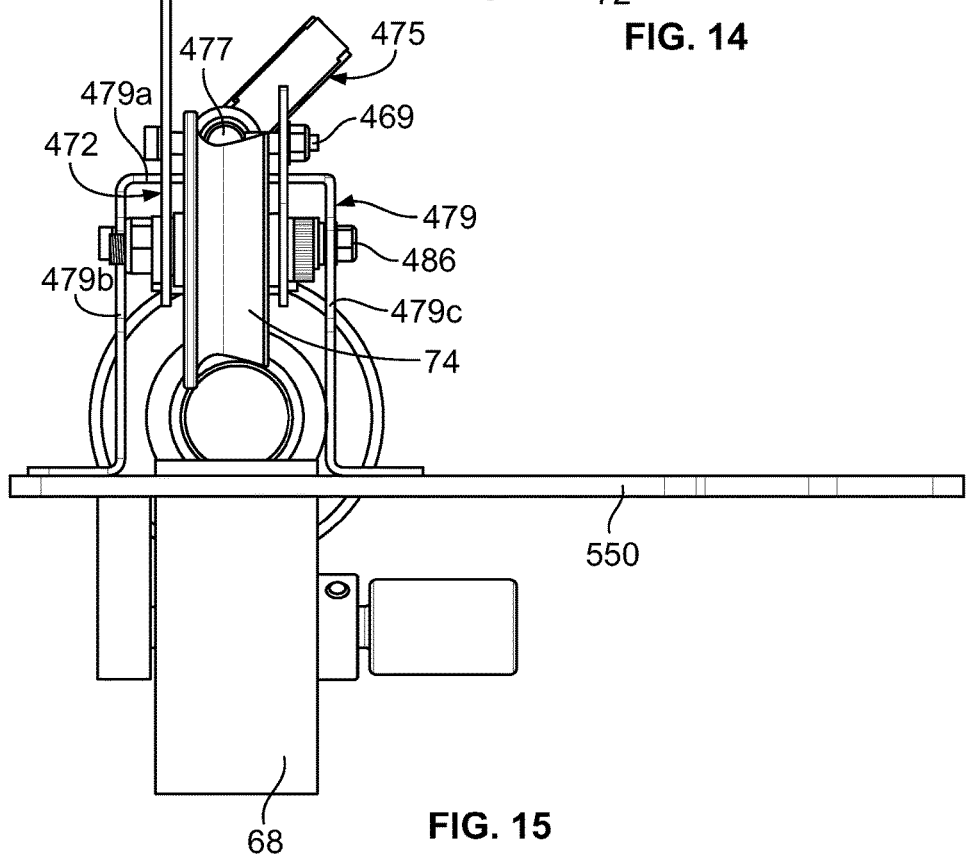
FIG. 15 depicts a rear elevation view of the feed assembly of FIG. 13 with the handle in the first position.
Figure 16:
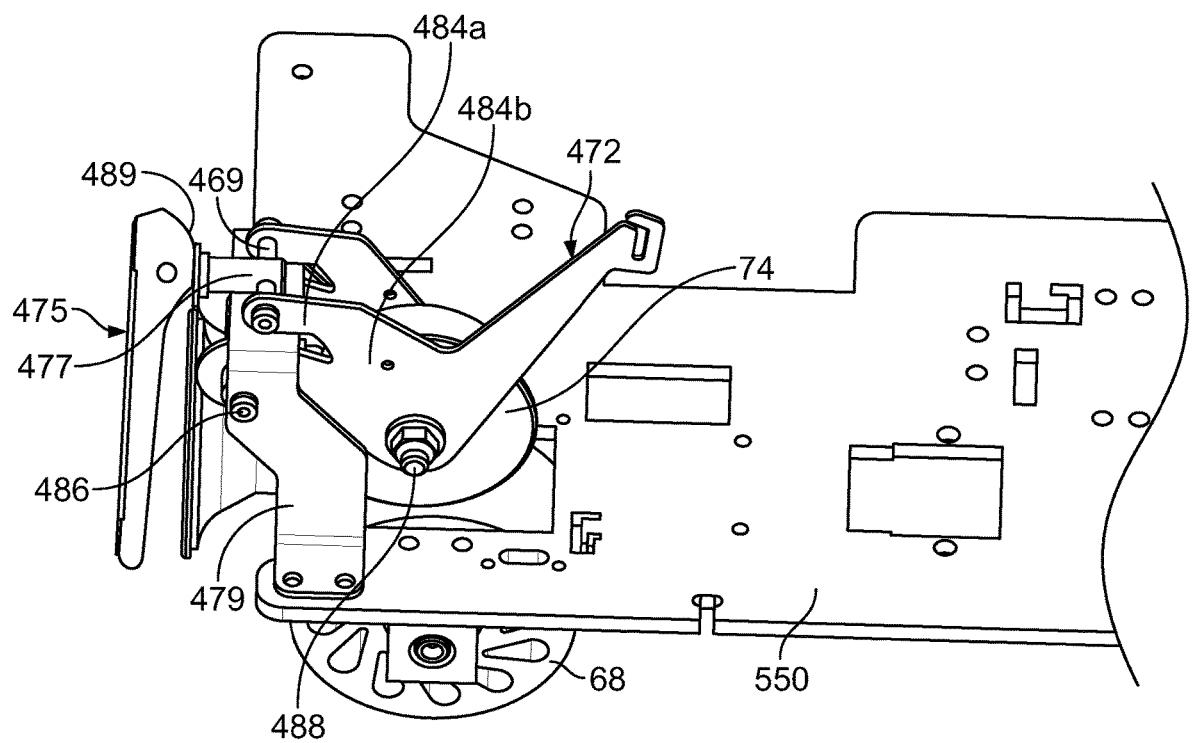
FIG. 16 depicts a perspective view of the feed assembly of FIG. 13 with the handle in a second position.
Figure 17:
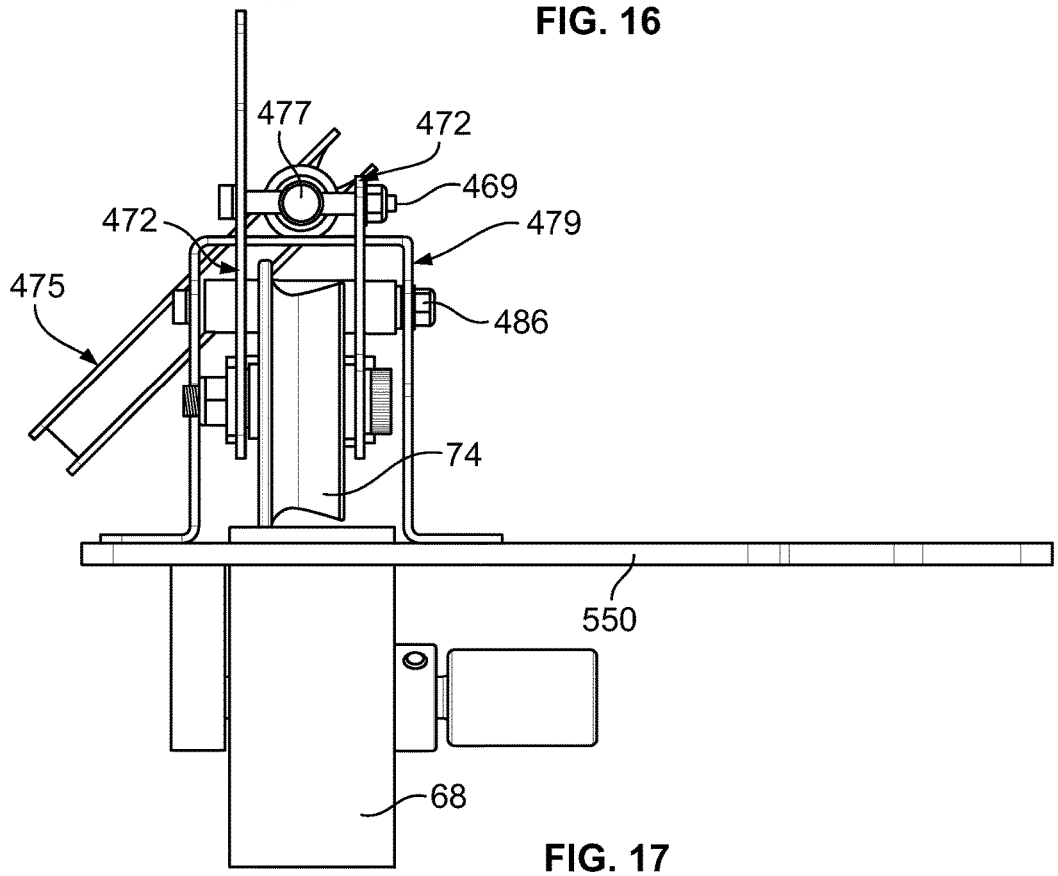
FIG. 17 depicts a rear elevation view of the feed assembly of FIG. 13 with the handle in the second position.

In use, the user rotates the handle 475 to initially position the arms 484 and its idler roller 74 in an upward position, as shown in FIGS. 13-15, so that the cable 22 can be fed into the cable travel space 62. Once the cable 22 is within the cable travel space 62, the handle 475 is rotated downwardly, as shown in FIGS. 16 and 17, to move the idler roller 74 toward the feed roller 68. When the handle 475 is rotated, the cam surface 489 rides against the side wall 338 of the cabinet 336 which causes the pin 477 to move linearly inwardly into the front compartment 52. This causes the stamping 472 to rotate around the pivot shaft 486 to move the idler roller 74 downwardly to engage the cable 22. The width of the slot 483 limits the amount of travel of the stamping 472.

To disengage from the cable 22, the handle 475 is rotated upwardly to the upward position as shown in FIGS. 13-15, to move the idler roller 74 away from the feed roller 68. When the handle 475 is rotated, the cam surface 489 rides against the side wall 338 of the cabinet 336 which causes the pin 477 to move linearly outwardly from the front compartment 52. This causes the stamping 472 to rotate around the pivot shaft 486 to move the idler roller 74 upwardly to disengage from the cable 22. The width of the slot 483 limits the amount of travel of the stamping 472.

Since the handle 475 is outwardly from the cabinet 336, the idler roller 74 can be easily actuated.

The handle 475 may take a variety of forms. In some embodiments, the handle 475 is an elongated member which can be grasped as shown. In some embodiments, the handle 475 may be a knob that can pivot the eccentric cam surface 489 through its rotation.

While the stamping 72, 472 and the idler roller 74 are disclosed and shown herein in example embodiments, in an alternate embodiment the idler roller 74 applies sufficient pressure by biasing provided by a spring (not shown). The spring biasing can be sufficiently relieved to allow the idler roller 74 to pivot upwardly to accommodate the size of the cable 22 while the cable 22 is fed through the feed assembly 28. In addition, in some embodiments, the handle may be an actuator that automatically lifts the idler roller 74 responsive to a signal generated in response to input through the user interface 180. With this, the feed assembly 28 may be actuated entirely from outside the machine 20.

Figure 18:
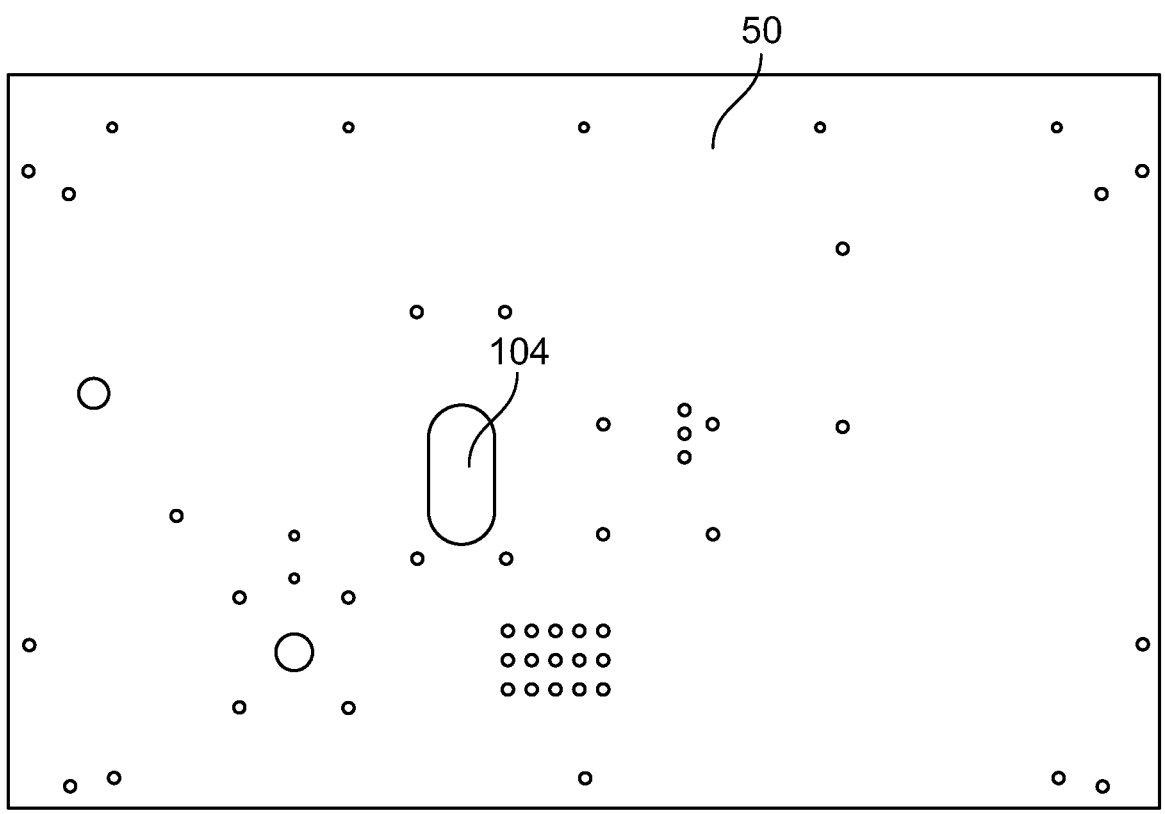
FIG. 18 depicts a side elevation view of a support wall used in an embodiment of the machine of FIG. 1.
Figure 19:
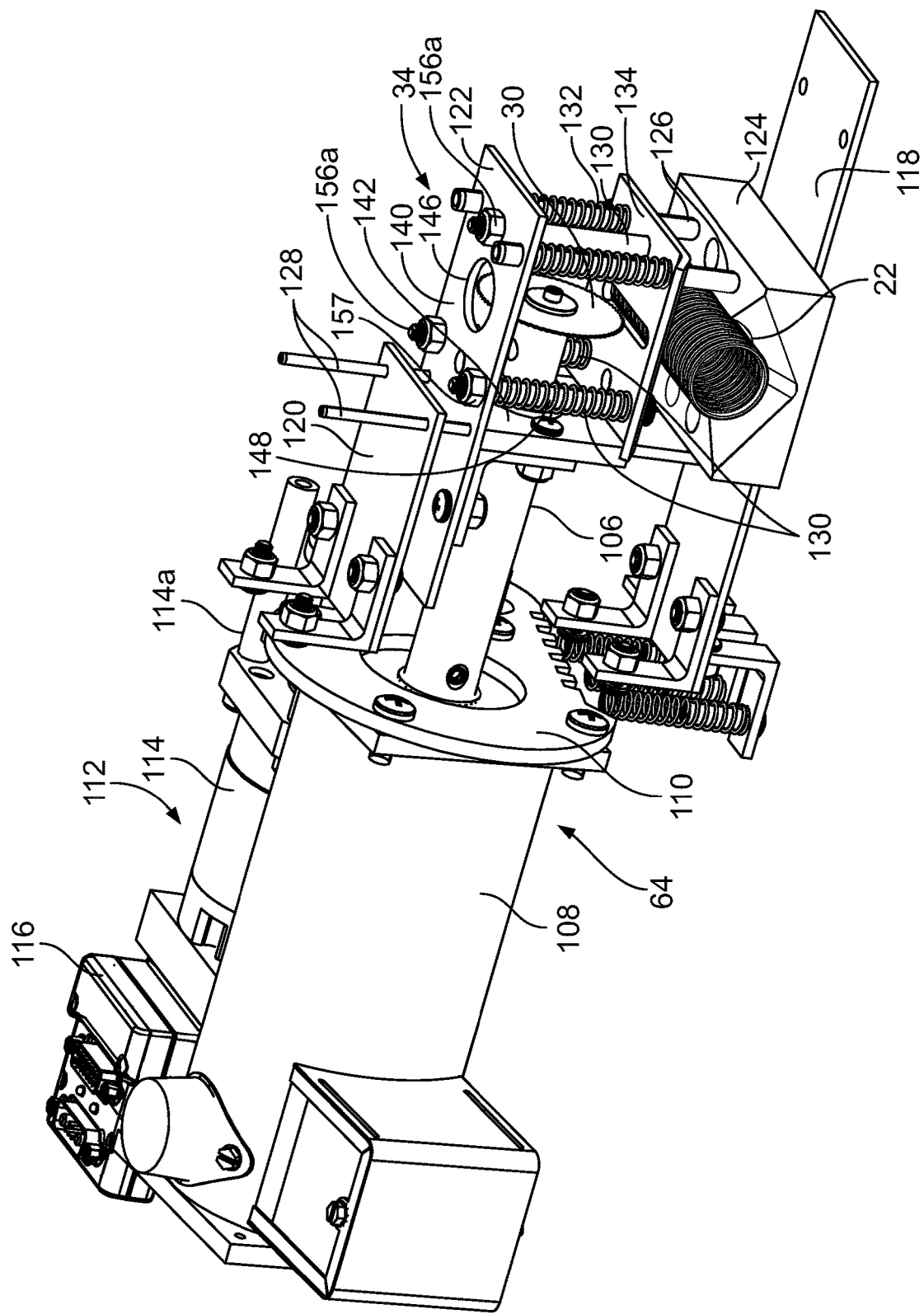
FIG. 19 depicts a perspective view of a clamping assembly of the machine with the clamping assembly in a raised position.
Figure 20:
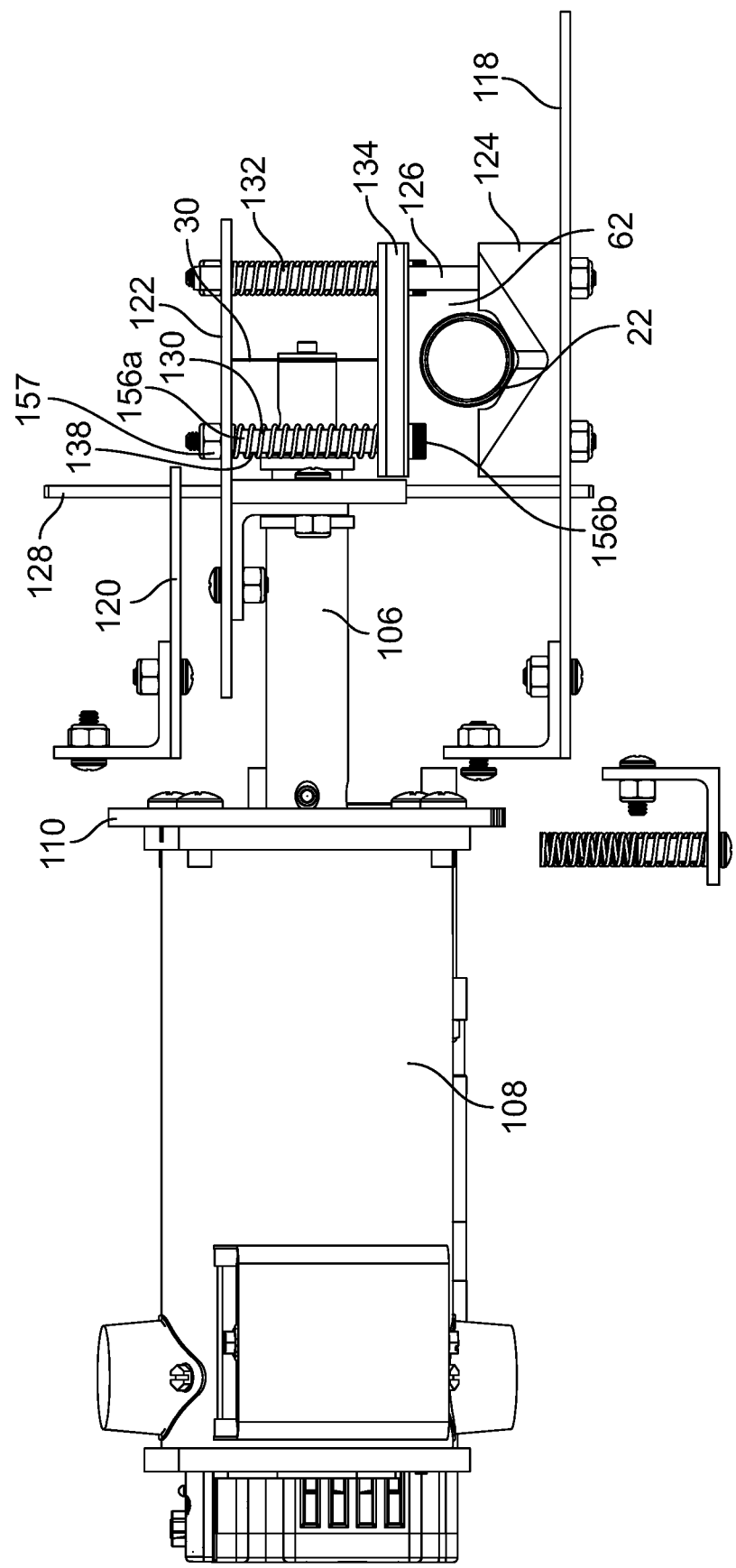
FIG. 20 depicts a front elevation view of the clamping assembly in the raised position.
Figure 21:
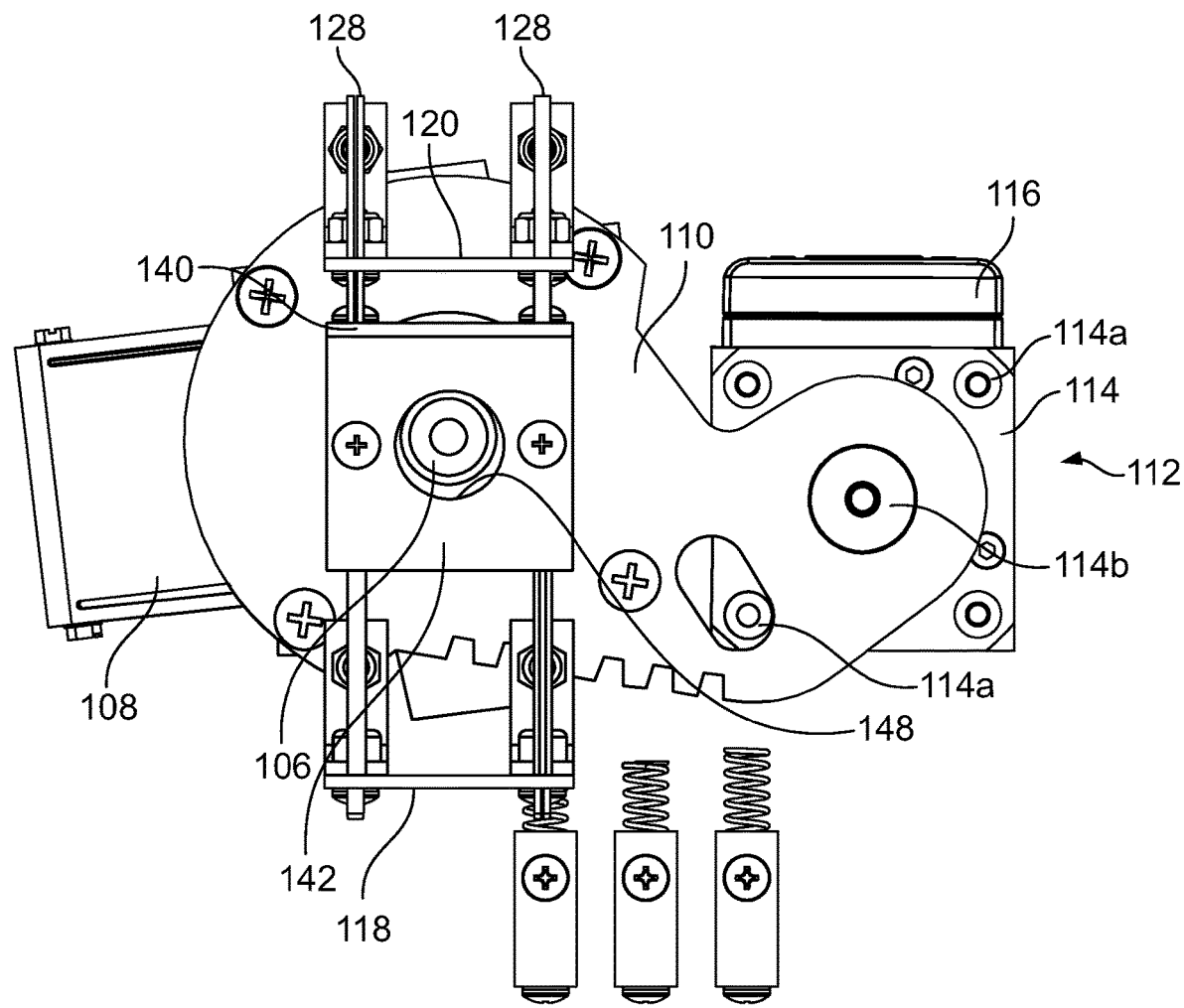
FIG. 21 depicts a cross-sectional view of the clamping assembly in the raised position.
Figure 22:
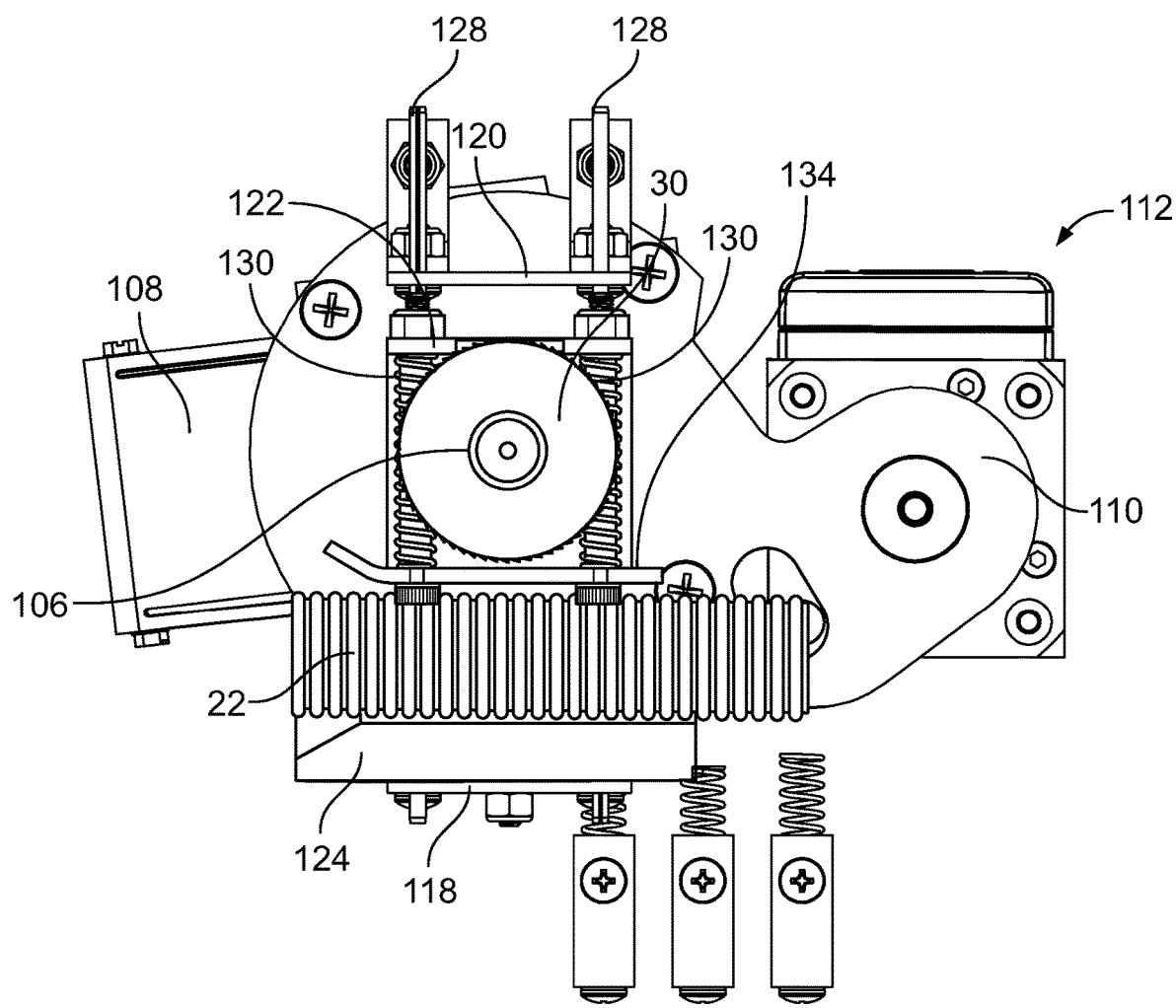
FIG. 22 depicts a side elevation view of the clamping assembly in the raised position.
Figure 23:
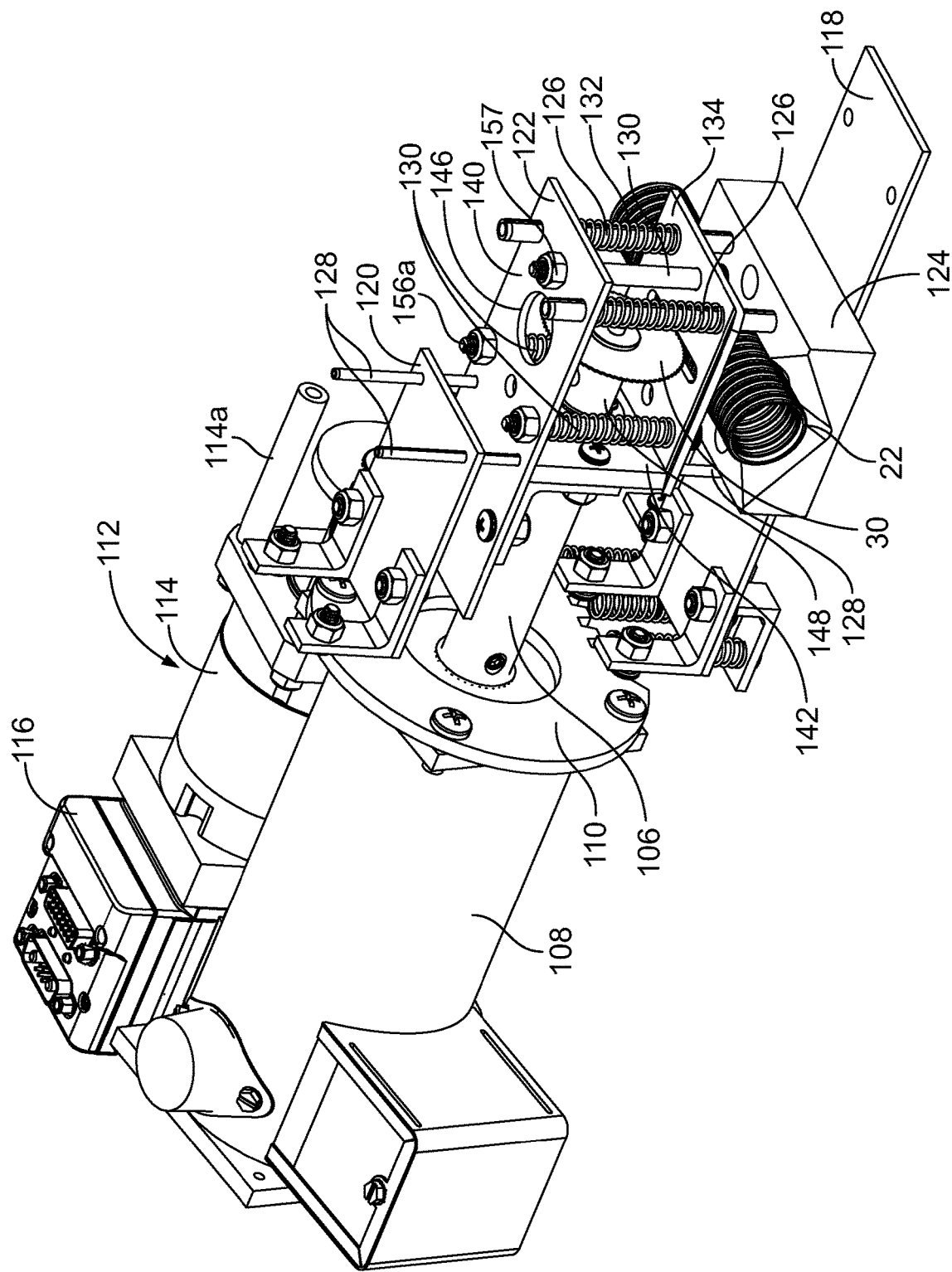
FIG. 23 depicts a perspective view of the clamping assembly with the clamping assembly in a clamping position.
Figure 24:
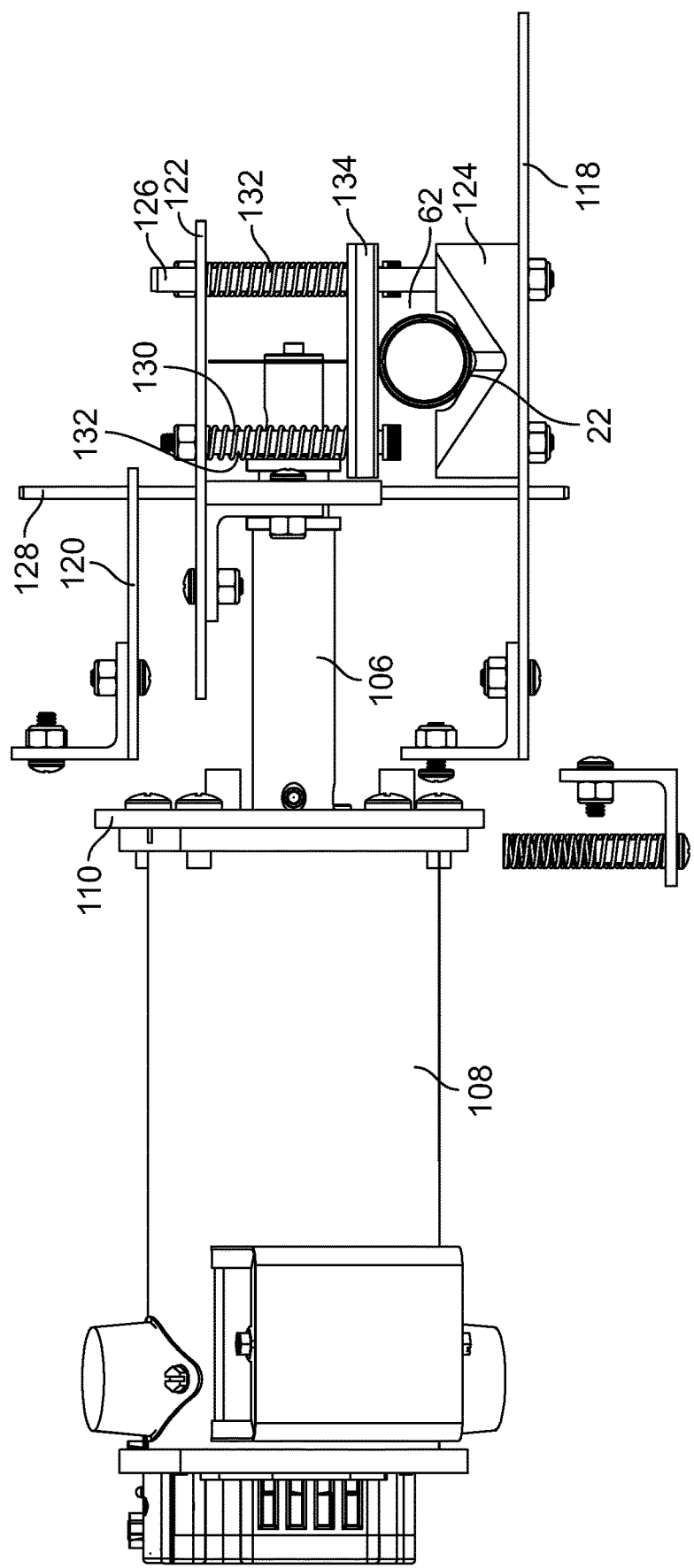
FIG. 24 depicts a front elevation view of the clamping assembly in the clamping position.
Figure 25:
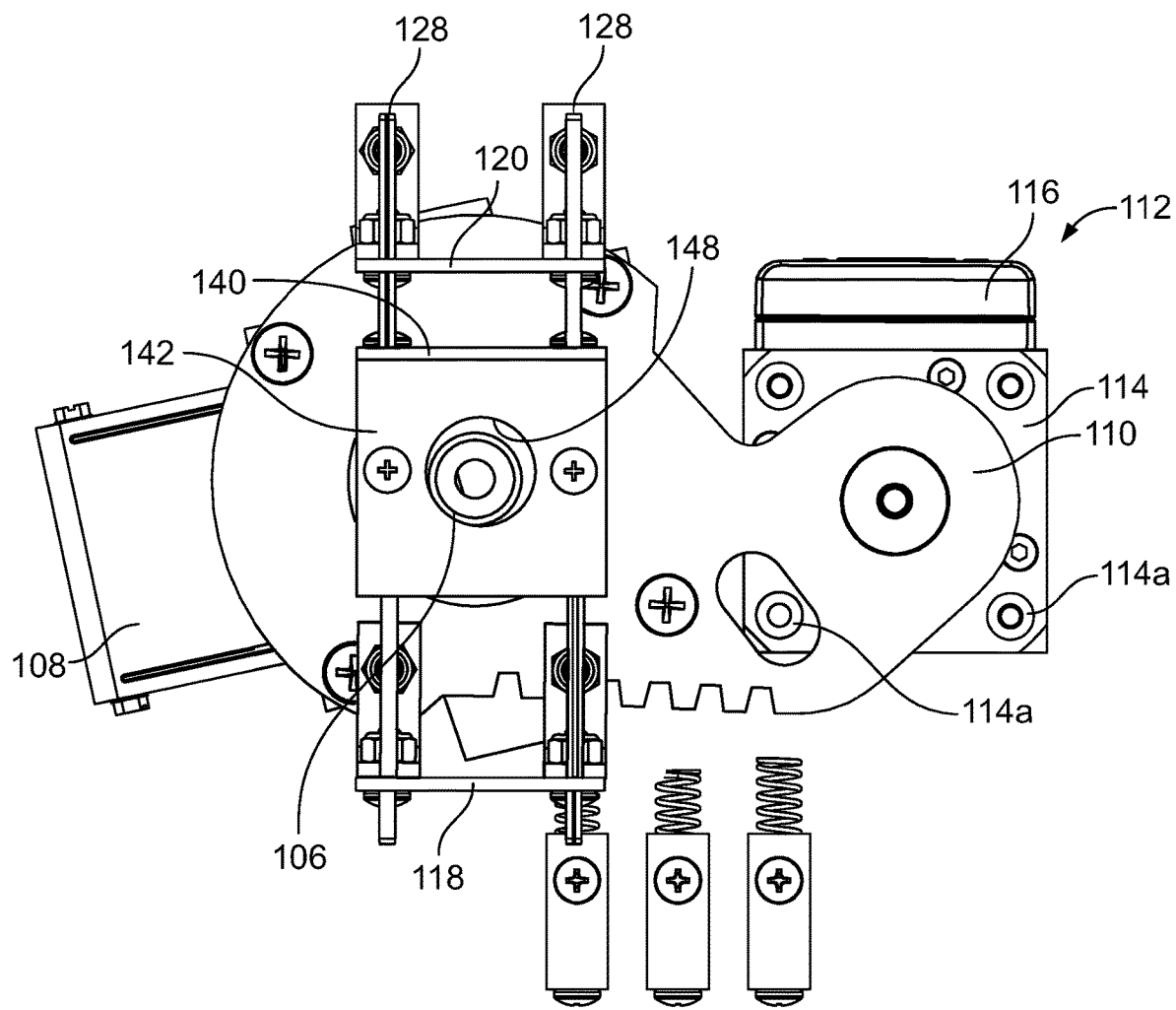
FIG. 25 depicts a cross-sectional view of the clamping assembly in the clamping position.
Figure 26:
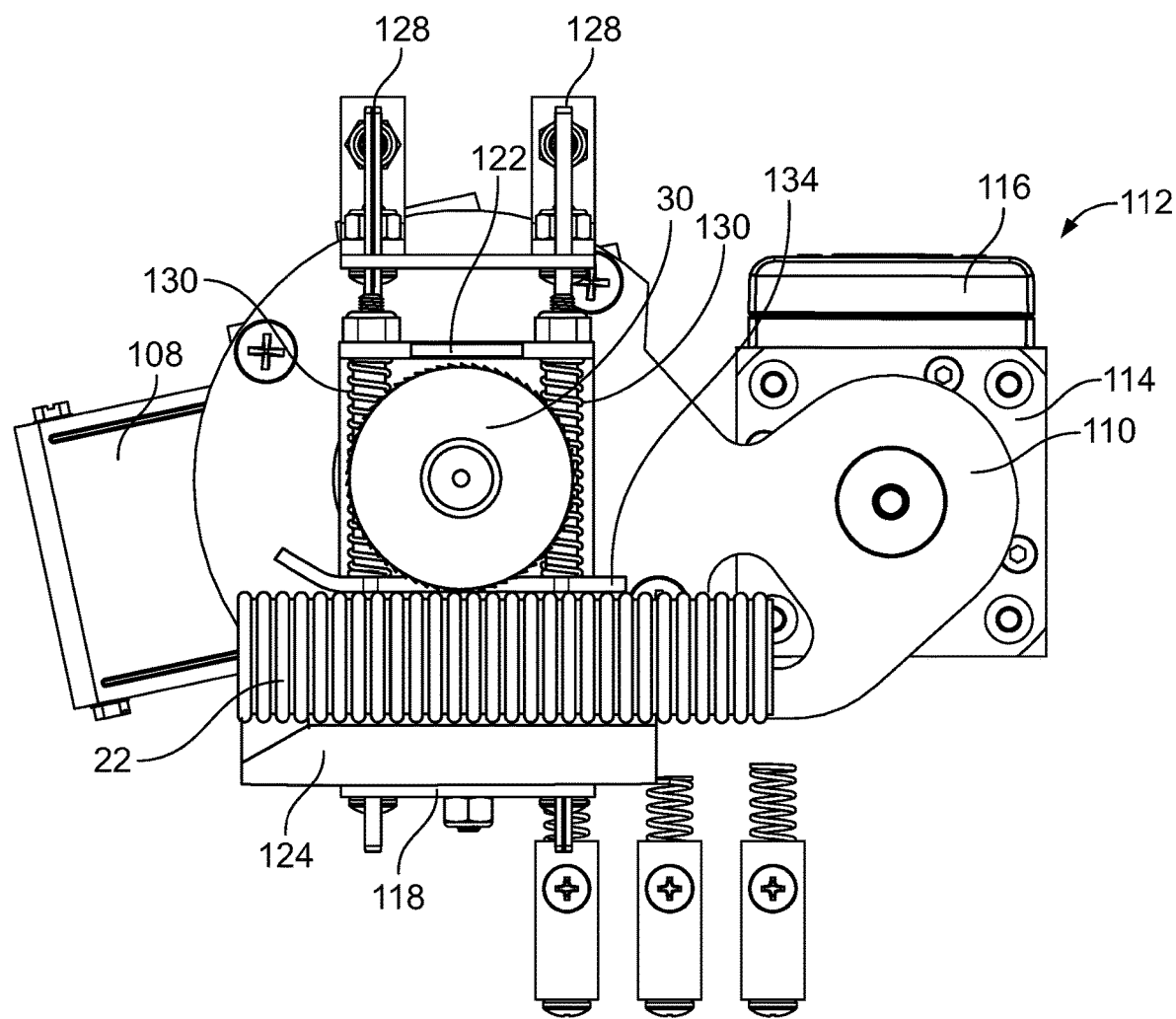
FIG. 26 depicts a side elevation view of the clamping assembly in the clamping position.
Figure 27:
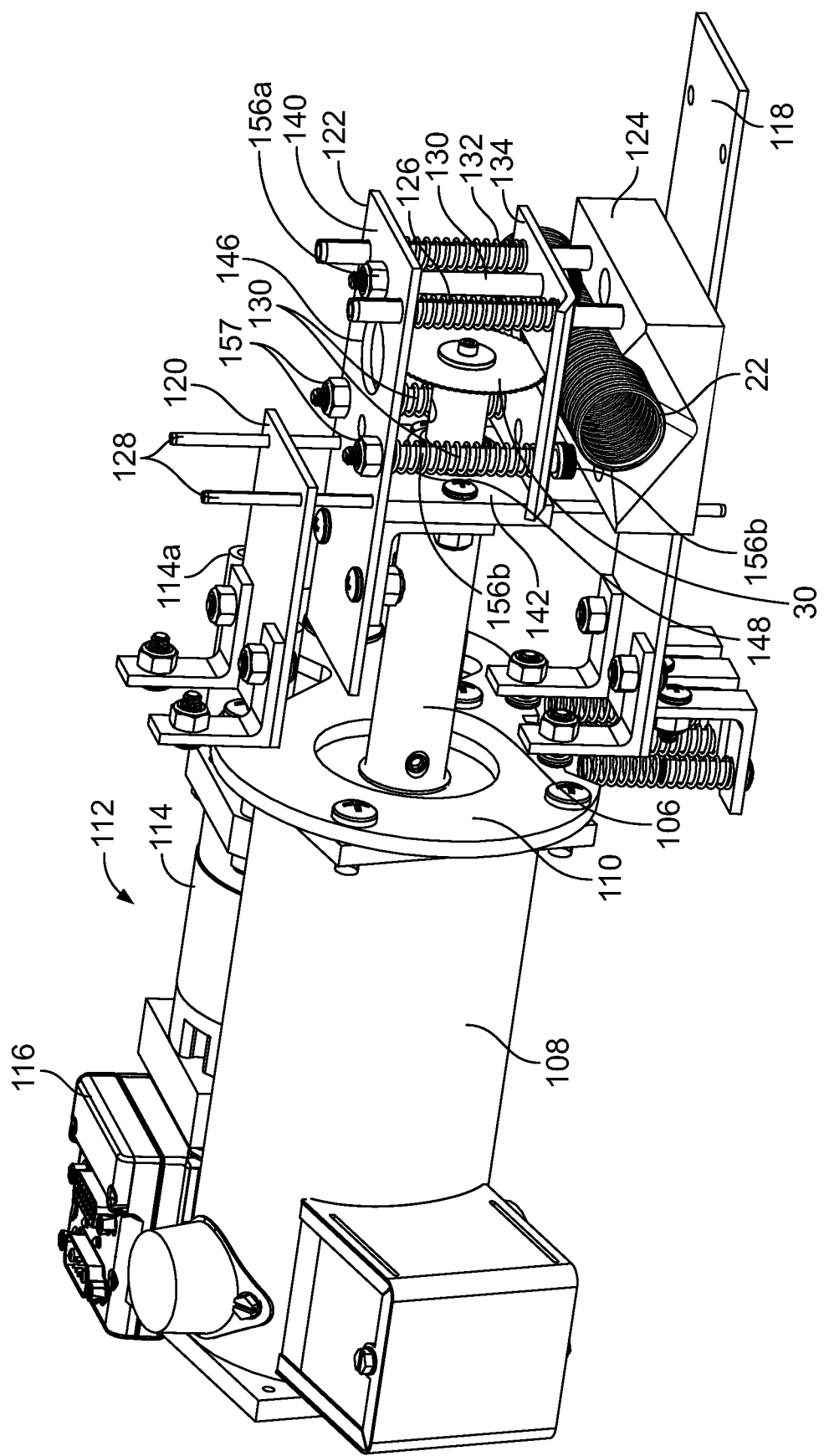
FIG. 27 depicts a perspective view of the clamping assembly with the clamping assembly in a notching position.
Figure 28:
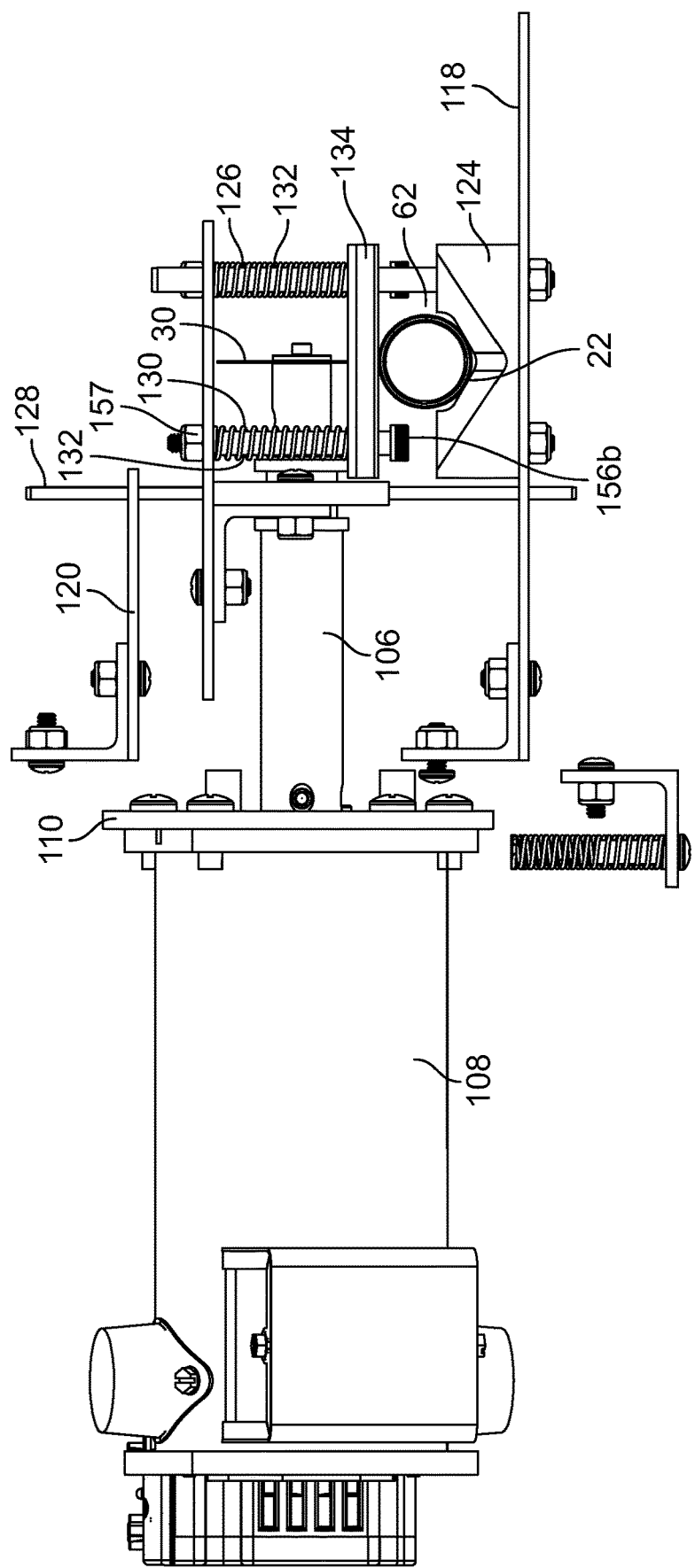
FIG. 28 depicts a front elevation view of the clamping assembly in the notching position.
Figure 29:
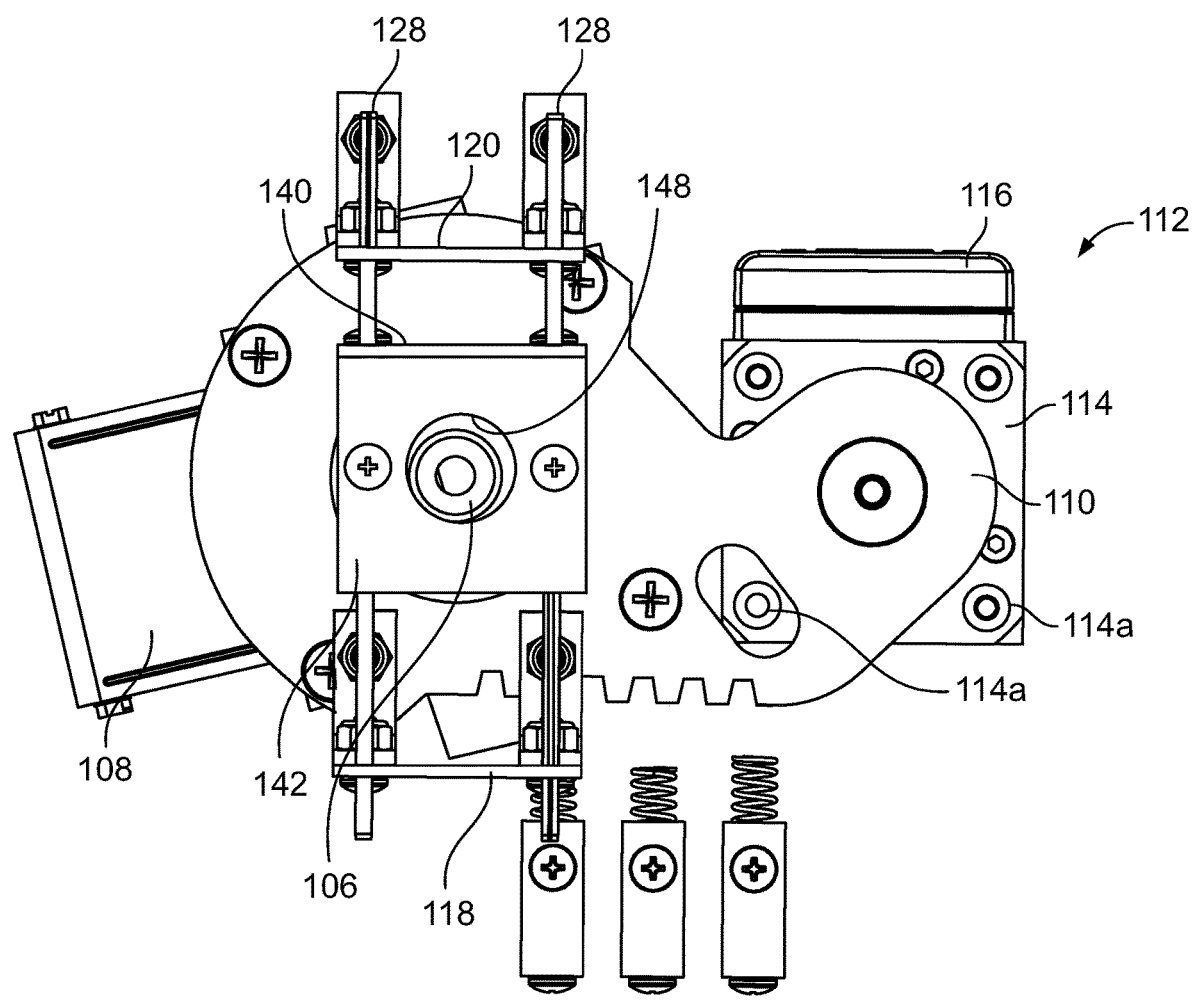
FIG. 29 depicts a cross-sectional view of the clamping assembly in the notching position.
Figure 30:
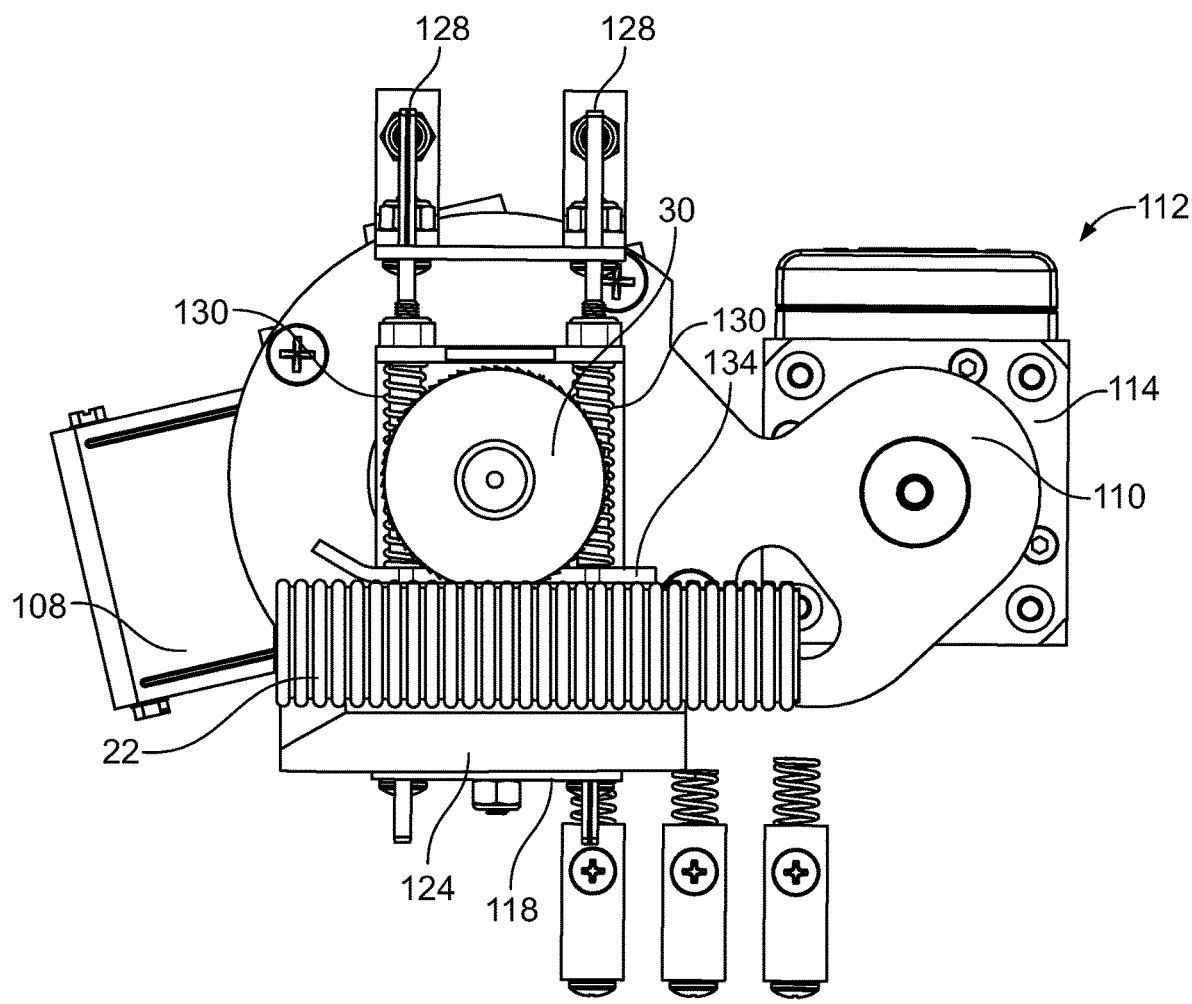
FIG. 30 depicts a side elevation view of the clamping assembly in the notching position.
Figure 31:
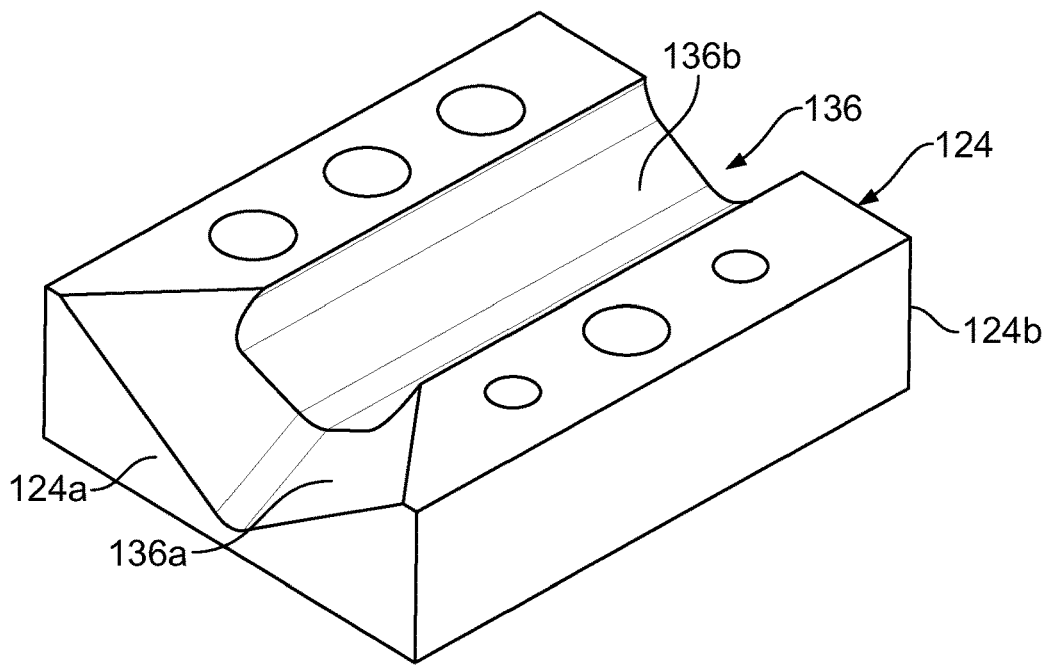
FIG. 31 depicts a perspective view of a positioning block of the clamping assembly.
Figure 32:
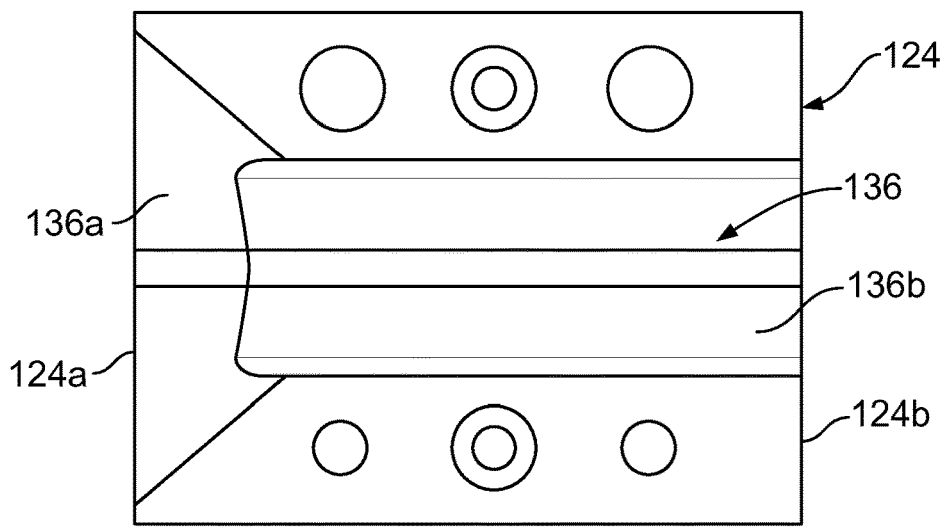
FIG. 32 depicts a top plan view of the positioning block.
Figure 33:
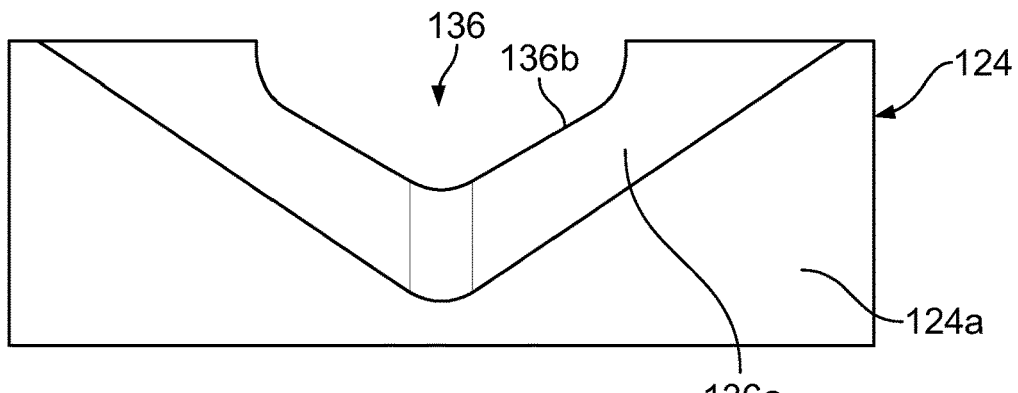
FIG. 33 depicts a front elevation view of the positioning block.
Figure 34:
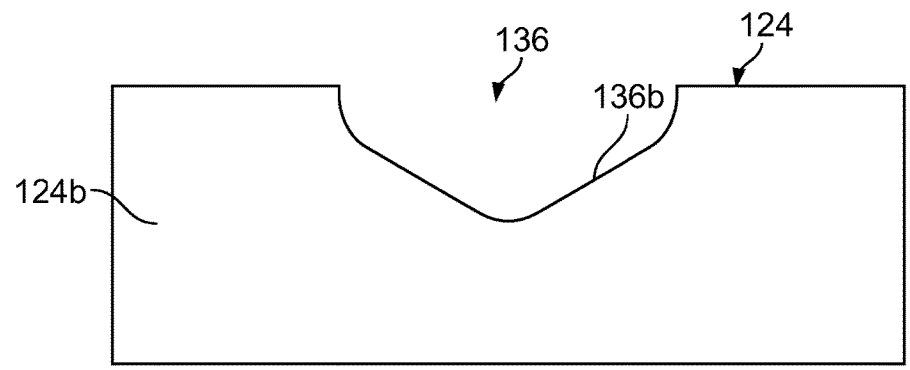
FIG. 34 depicts a rear elevation view of the positioning block.
Figure 35:
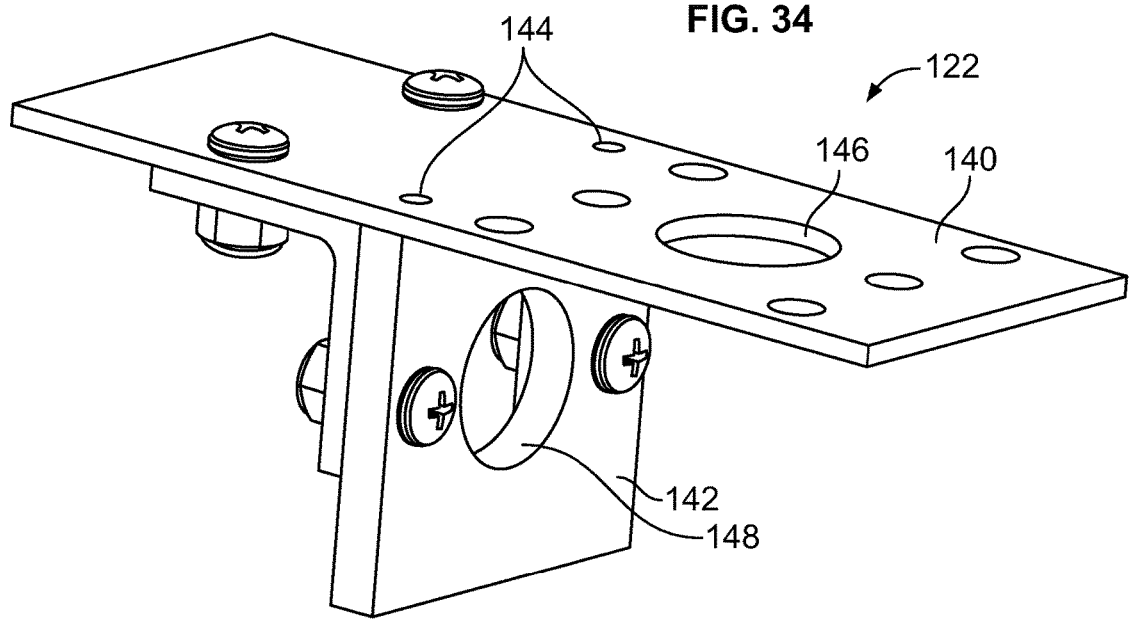
FIG. 35 depicts a perspective view of an intermediate plate of the clamping assembly.
Figure 36:
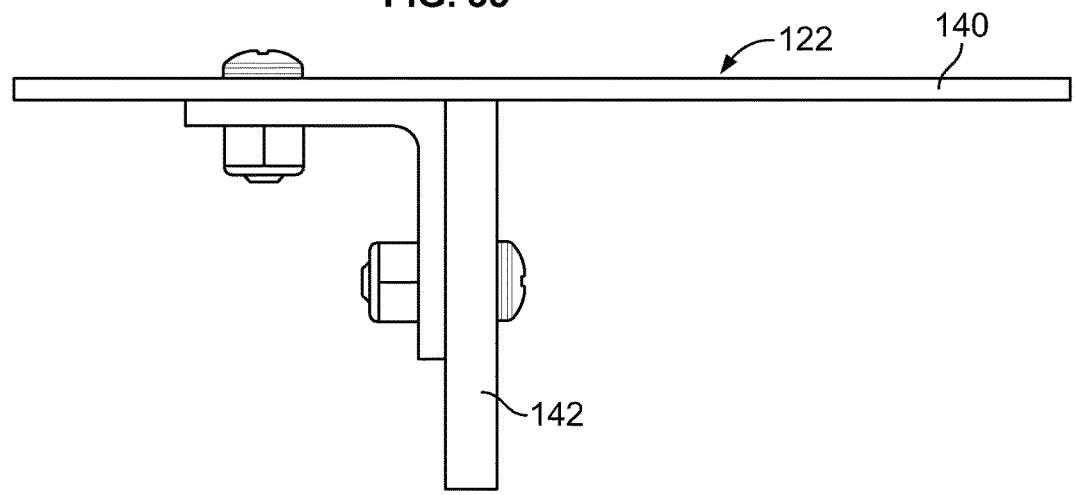
FIG. 36 depicts a front elevation view of the intermediate plate.
Figure 37:
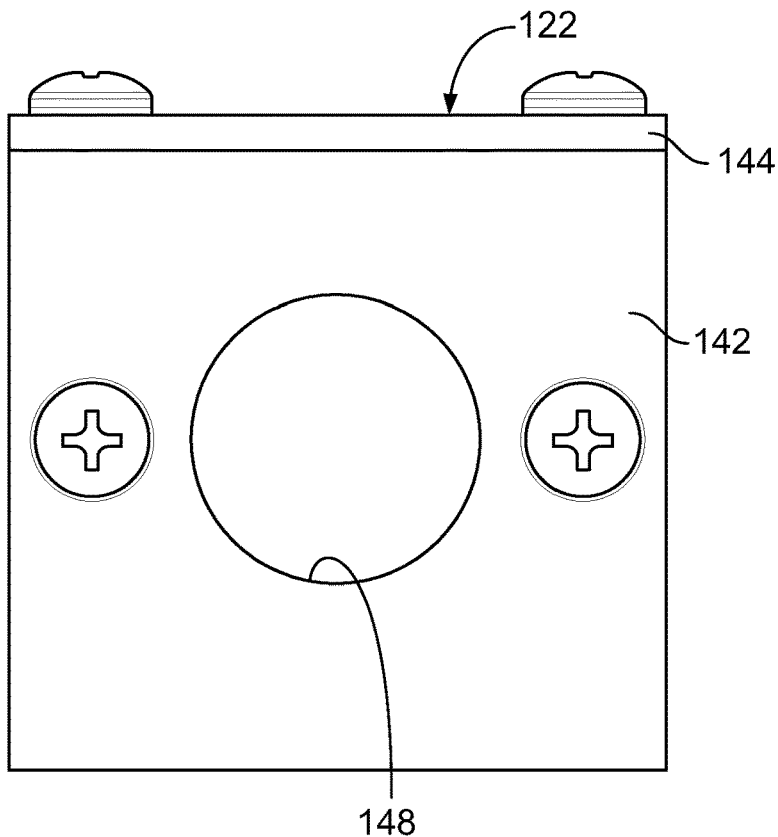
FIG. 37 depicts a side elevation view of the intermediate plate.

As shown in FIG. 18, the support wall 50 of some embodiments includes an elongated aperture 104 therethrough which extends from the front compartment 52 to the rear compartment 54.

As best shown in FIGS. 19-30 (which do not show the cabinet 36), the notching saw assembly 64 includes the notching saw 30 which has a motor shaft 106, a motor 108 configured to rotate the motor shaft 106 and the notching saw 30, and a stamping 110 to which the motor 108 is fixedly mounted and cantilevered from. In an embodiment, the notching saw 30 is a rotary saw. In an embodiment, the notching saw 30 is circular. In an example embodiment, the motor 108 and the stamping 110 are positioned in the rear compartment 54 and the notching saw 30 is positioned in the front compartment 52. In such an embodiment, the motor shaft 106 extends through the stamping 110 and through the aperture 104 in the support wall 50. The aperture 104 is wider than the motor shaft 106. The motor 108 may, for example, be a direct current (DC) motor or an alternating current (AC) induction motor. However, it will be appreciated that other motors may be used to implement the motor 108 within the scope of the disclosure.

The notching saw assembly 64 also includes a drive assembly 112 which in an embodiment is formed by a gearbox 114 and a motor 116, such as a servomotor or stepper motor, or any motor along with positional feedback. In an embodiment, the drive assembly 112 is mounted in the rear compartment 54. The gearbox 114 of some embodiments is affixed to and extends from the motor 116. In accordance with some embodiments, the gearbox 114 is also affixed to the support wall 50 by shafts 114a. One of the shafts 114a may extend through an elongated slot in the stamping 110. The gearbox 114 of the illustrated embodiment has a shaft 114b which is affixed to the stamping 110. Actuation of the drive assembly 112 results in rotation of the gearbox shaft 114b which causes the affixed stamping 110 to rotate around the axis of the shaft 114b, and which causes the motor 108, its motor shaft 106 and the notching saw 30 to move in an arc relative to the support wall 50. Since the aperture 104 in the support wall 50 is wider than the motor shaft 106, the motor shaft 106 can move in the arc. The motor 108, its motor shaft 106 and the notching saw 30 can be returned to their initial position, by reverse actuation of the drive assembly 112 to move the motor 108, its motor shaft 106 and the notching saw 30 in a reverse arc relative to the support wall 50.

The clamping assembly 34 of some embodiments includes a lower plate 118, an upper plate 120, a clamping pad support plate 122, a positioning block 124, a plurality of rods 126, a plurality of roll pins 128, a plurality of shoulder bolts 130, at least one spring 132, and a clamping pad 134. The motor shaft 106 of the notching saw 30 extends through the clamping pad support plate 122 and is moveable relative to the clamping pad support plate 122 as discussed herein. The motor shaft 106 is perpendicular to the line formed by cable travel space 62 such that the notching saw 30 is parallel to the line forming the cable travel space 62 and is capable of forming the first and second notches in the cable 22.

The lower plate 118 is planar and is fixedly mounted between the support wall 50 and the front wall 48. The upper plate 120 is planar and is fixedly mounted to the support wall 50 and cantilevered therefrom. The upper plate 120 is mounted at a spaced position above the lower plate 118. The upper plate 120 could also extend between and be affixed to the support wall 50 and the front wall 48.

The positioning block 124 is mounted on the upper surface of the lower plate 118. As best shown in FIGS. 31-34, the positioning block 124 has a groove 136 provided in its top surface, which in an embodiment is V-shaped, U-shaped, or generally V-shaped or generally U-shaped. The groove 136 extends from a feed end 124a of the positioning block 124 which is proximate to the feed roller 68 to a discharge end 124b of the positioning block 124. A first wall 136a of the groove 136 may be chamfered to allow easier entry of the cable 22 into the groove 136. A second wall 136b of the groove 136 extends linearly.

Rods 126 may be mounted on the positioning block 124 and extend upwardly therefrom. The rods 126 of such embodiments are affixed to the positioning block 124 such that the rods 126 do not move relative to the positioning block 124. As shown in the illustrated embodiment, two rods 126 are mounted on the positioning block 124. One or more of the rods 126 may have a spring 132 mounted thereon.

The clamping pad support plate 122 of some embodiments is mounted between the lower and upper plates 118, 120 by the rolls pins 128. A first pair of roll pins 128 extend between the lower plate 118 and the clamping pad support plate 122, and a second pair of roll pins 128 extend between the upper plate 120 and the clamping pad support plate 122. As best shown in FIGS. 35-38 of such embodiments, the clamping pad support plate 122 has an upper horizontal planar wall 140 and a lower vertical planar wall 142 extending downwardly from the upper wall 140. The walls 140, 142 may be integrally formed in some embodiments or may be formed as two separate components and joined together by angle brackets as shown in the illustrated embodiment. The lower wall 142 of some embodiments has a pair of blind bores (not shown) into which the lower pair of roll pins 128 are fixedly mounted. The lower pair of roll pins 128 extend through apertures (not shown) in the lower plate 118, and the roll pins 128 are slidable relative to the lower plate 118. The upper wall 140 of some embodiments has a pair of blind bores (not shown) into which the upper pair of roll pins 128 are fixedly mounted. The upper pair of roll pins 128 extend through apertures (not shown) in the upper plate 120, and the roll pins 128 are slidable relative to the upper plate 120. The positioning block 124 is proximate to the roll pins 128.

When the cable 22 is first fed into the clamping assembly 34 which is in the raised position, the cable 22 engages with the angled second wall 152 of the clamping pad 134 and the chamfered first wall 136a of the positioning block 124 to direct the entry of the cable 22 into the cable travel space 62 between the clamping pad 134 and the positioning block 124. In addition, as the cable 22 is being fed through the machine 20, the angled second wall 152 of the clamping pad 134 and the chamfered first wall 136a of the positioning block 124 do not catch on the helical turns of the cable 22, thereby promoting the movement of the cable 22 through the machine 20.

The upper wall 140 of some embodiments has an opening 146 therethrough, through which the notching saw 30 may partially extend when the clamping assembly 34 when in a raised position. The opening 146 provides a clearance space for the notching saw 30.

Figure 38:
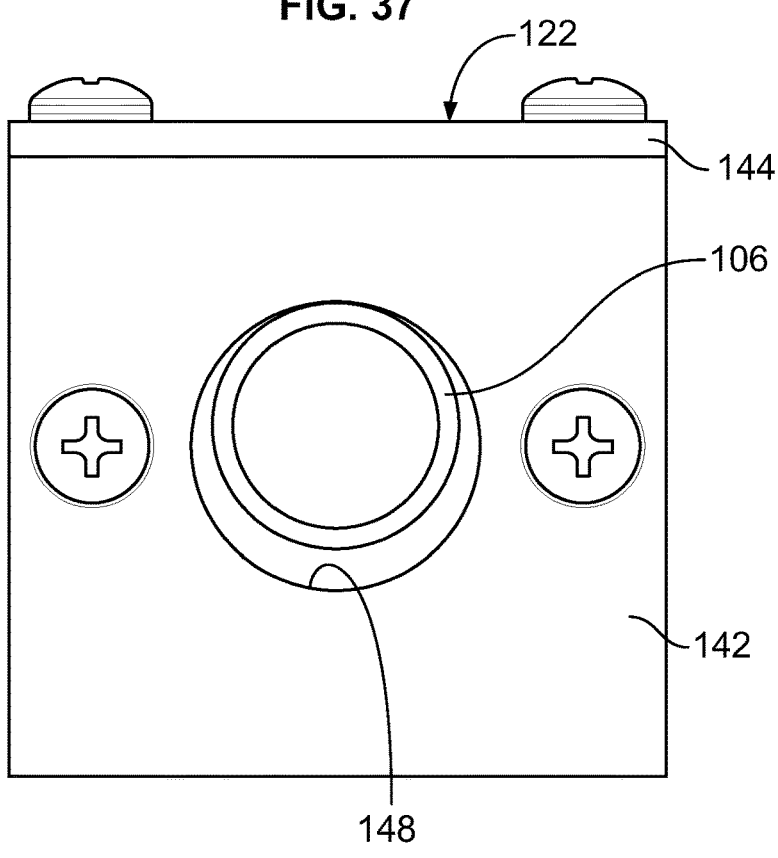
FIG. 38 depicts a side elevation view of the intermediate plate, with a motor shaft of the clamping assembly being shown in cross-section.

In accordance with some embodiments, the lower wall 142 has an aperture 148 therethrough, through which the motor shaft 106 of the notching saw 30 extends, see FIG. 38. The aperture 148 is larger than the motor shaft 106 of the notching saw 30. When the motor shaft 106 moves in its arc, the motor shaft 106 can move within the aperture 148 of the lower wall 142 of the clamping pad support plate 122. When the motor shaft 106 moves in a first arc and engages the bottom of the aperture 148 of the lower wall 142 of the clamping pad support plate 122, the continued movement of the motor shaft 106 in the first arc causes the clamping pad support plate 122 and its roll pins 128 to move linearly downwardly relative to the lower and upper plates 118, 120. When the motor shaft 106 moves in the second arc which is opposite to the first arc and the motor shaft 106 engages the top of the aperture 148 of the lower wall 142 of the clamping pad support plate 122, the continued movement of the motor shaft 106 in the second arc causes the clamping pad support plate 122 and its roll pins 128 to move linearly upwardly relative to the lower and upper plates 118, 120.

Figure 39:
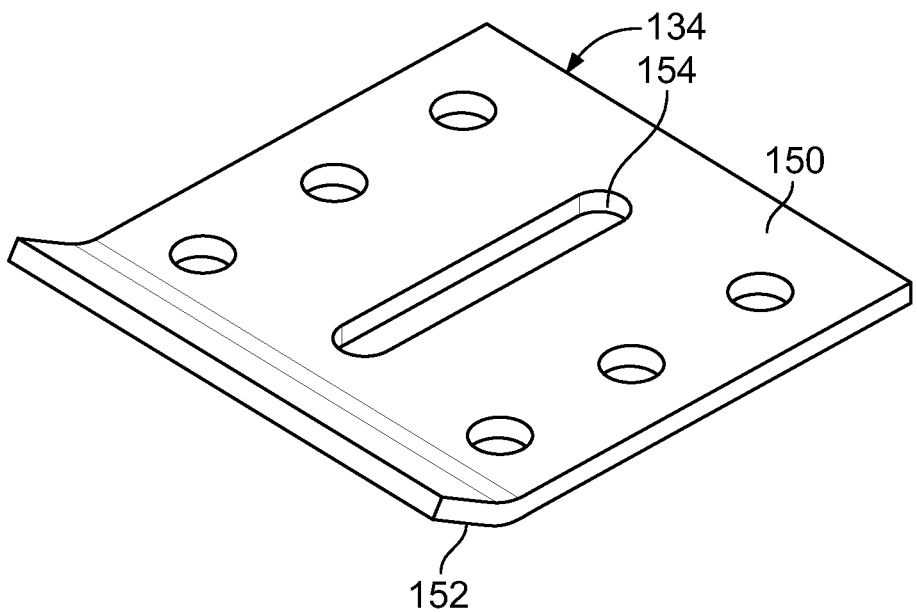
FIG. 39 depicts a perspective view of a clamping pad of the clamping assembly.
Figure 40:
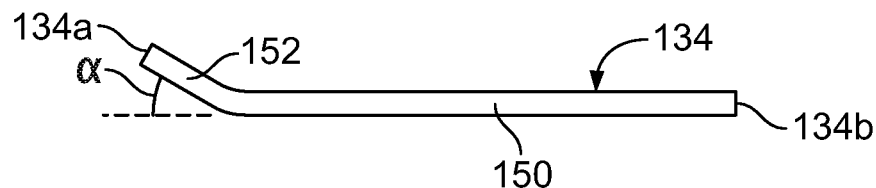
FIG. 40 depicts a side elevation view of the clamping pad.
Figure 41:
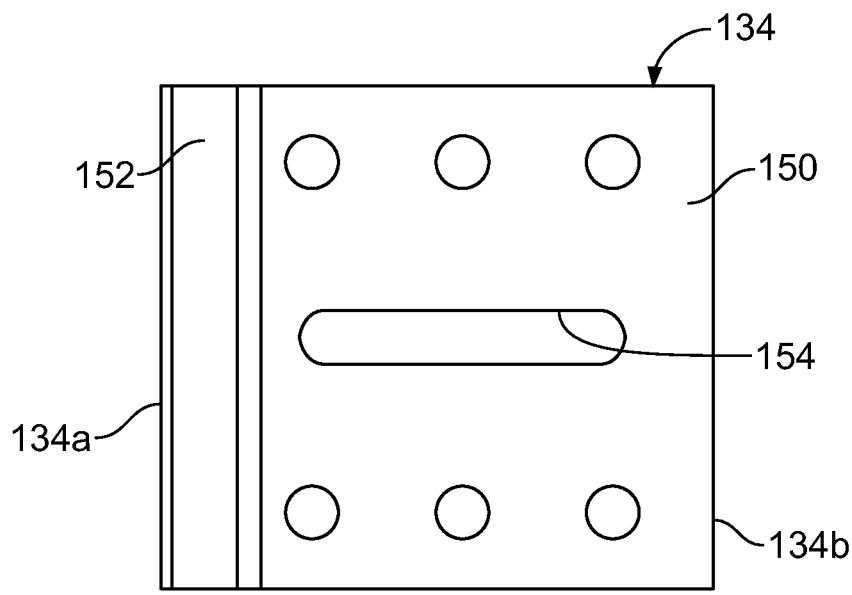
FIG. 41 depicts a top plan view of the clamping pad.
Figure 42:
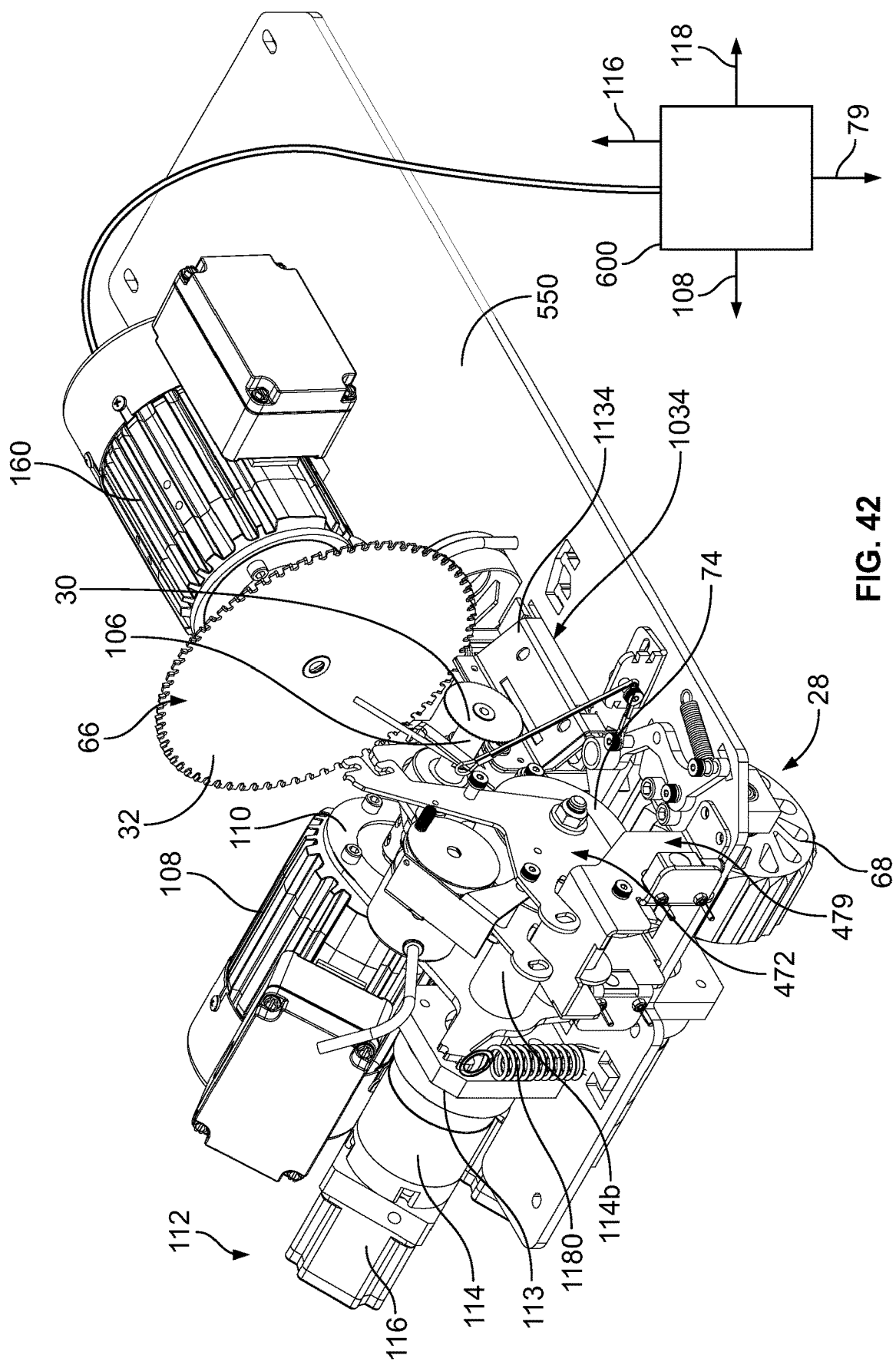
FIG. 42 depicts a perspective view of an alternate clamping assembly of the machine with the clamping assembly in a raised position, and showing a cutting assembly.
Figure 43:
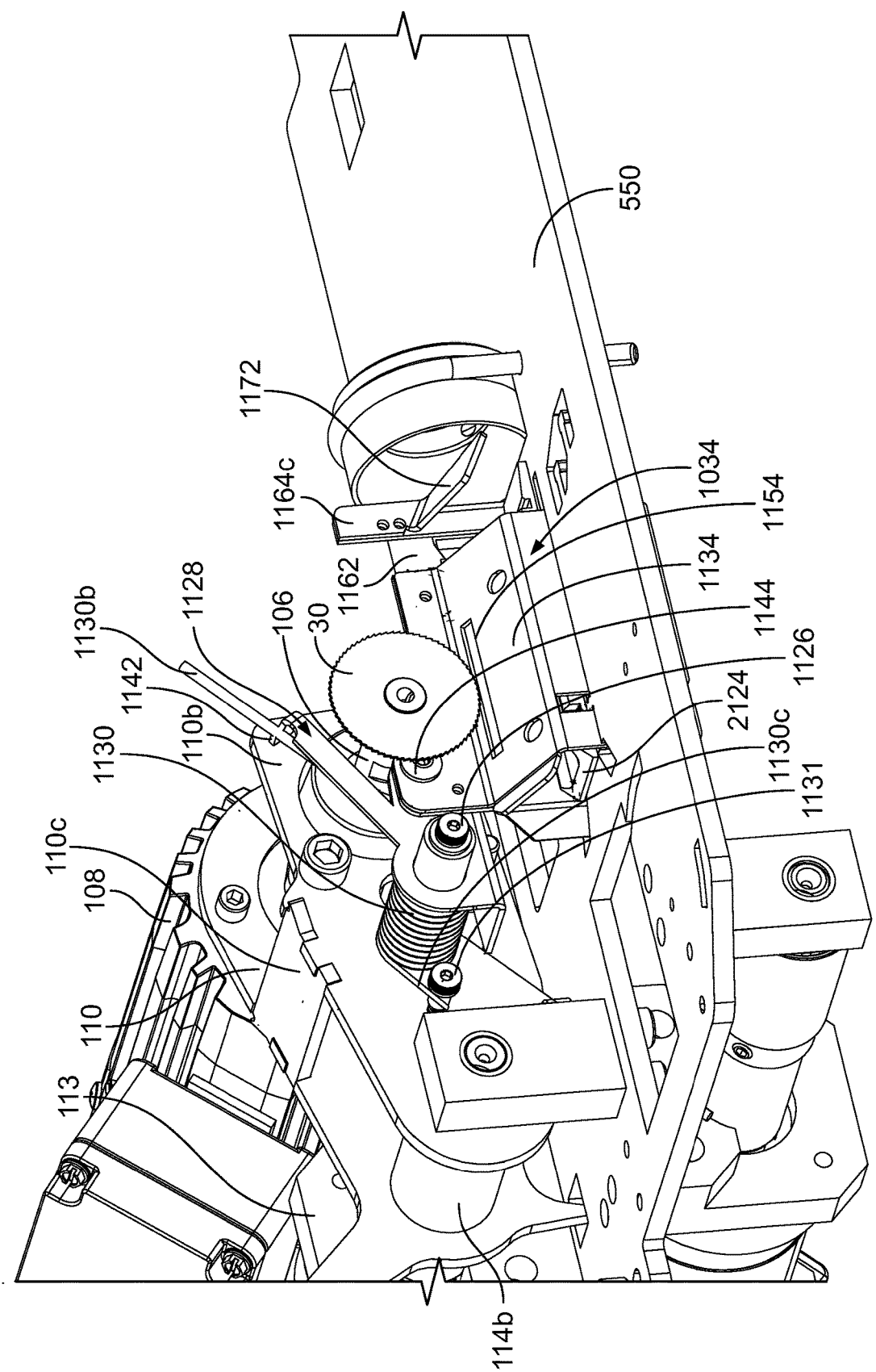
FIG. 43 depicts an enlarged partial perspective view of the clamping assembly of FIG. 42 in the raised position.

As best shown in FIGS. 39-41, the clamping pad 134 of some embodiments is formed of a first planar and horizontal wall 150 and a second wall 152 which is angled upwardly relative to the first wall 150 at an angle α, which may be 45 degrees, and which is less than 90 degrees. The second wall 152 defines a feed end 134a of the clamping pad 134 and the first wall 150 defines a discharge end 134b of the clamping pad 134. The first wall 150 of such embodiments has an elongated slot 154 provided therethrough which extends from its top surface to its bottom surface.

In accordance with various embodiments, the clamping pad 134 is positioned proximate to, but spaced from, the lower end of the lower wall 142 of the clamping pad support plate 122. The clamping pad 134 may be connected to the upper plate 120, such as by the rods 126 and shoulder bolts 130.

In some embodiments, the rods 126 are fixed to the positioning block 124 and extend upwardly therefrom, through the clamping pad 134 and through the upper wall 140 of the clamping pad support plate 122. The clamping pad 134 and the clamping pad support plate 122 of such embodiments are slidable on the rods 126. In some embodiments, some or all of the rods 126 have a spring 132 mounted thereon. The springs 132 in such embodiments may extend between the bottom surface of the upper wall 140 of the clamping pad support plate 122 and the upper surface of the first wall 150 of the clamping pad 134. In some embodiments, the springs 132 are expansion springs which bias the clamping pad 134 downwardly toward or into the cable travel space 62.

In some embodiments, the shoulder bolts 130 extend between and through the clamping pad 134 and the upper wall 140 of the clamping pad support plate 122. In some embodiments, the shoulder bolt 130 has a shaft 156a, a head 156b at a lower end of each shaft 156a and a threaded end onto which a nut 157 is mounted. In such embodiments, the head 156b is capable of engaging against the lower surface of the first wall 150 of the clamping pad 134. The nut 157 is threaded to the threaded end of the shaft 156a and engages against the upper surface of the upper wall 140. In this embodiment, this secures the shoulder bolts 130 to the upper wall 140 of the clamping pad support plate 122, but allows the clamping pad 134 to slide along the shoulder bolts 130. In some embodiments, some or all of the shoulder bolts 130 have a spring 132 mounted thereon. The springs 132 extend between the bottom surface of the upper wall 140 of the clamping pad support plate 122 and the upper surface of the first wall 150 of the clamping pad 134. In some embodiments, the springs 132 are expansion springs which biases the clamping pad 134 downwardly. The shoulder bolts 130 orient the clamping pad 134 and provide a limit to the movement of the springs 132 in some embodiments.

In the illustrated embodiment, the clamping assembly 34 and notching saw 30 are positionable in three different positions, namely a raised position, a clamping position, and a notching position. An example of the raised position is shown in FIGS. 19-22. An example of the clamping position is shown in FIGS. 23-26. An example of the notching position is shown in FIGS. 27-30.

As shown in shown in the raised position in FIGS. 19-22, the clamping assembly 34 and the notching saw 30 are spaced furthest upwardly from the positioning block 124, the clamping pad 134 is not within the cable travel space 62, and the cable 22, if positioned in the cable travel space 62, is not engaged by the clamping pad 134. The motor shaft 106 is at the highest point of the aperture 148 through the lower wall 142 of the clamping pad support plate 122. In this position, the clamping pad support plate 122 and the attached clamping pad 134 are lifted relative to the positioning block 124 and do not engage the cable 22 or interfere with the cable travel space 62. When the clamping pad support plate 122 and the attached clamping pad 134 are lifted relative to the positioning block 124, the springs 132 are fully expanded.

In the illustrated embodiment, in use, the cable 22 is fed into the cable travel space 62 between the clamping pad 134 and the positioning block 124 when the machine 20 is in a raised position by activation of the motor 79 which rotates the feed roller 68 of the feed assembly 28. The cable 22 rests in the groove 136 on the positioning block 124. Thereafter, the clamping assembly 34 and the notching saw 30 can be moved to the clamping position or to the notching position.

As shown in the clamping position in FIGS. 23-26, the clamping assembly 34 and the notching saw 30 are spaced closer to the positioning block 124 than when in a raised position, and the clamping pad 134 is within the cable travel space 62. The clamping pad 134 engages with the cable 22 and deters the cable 22 from moving upwardly and downwardly (that is a direction angled relative to the cable travel space 62) in the machine 20 or side-to-side (that is a direction parallel to the cable travel space 62) in the machine 20. The motor shaft 106 is proximate to, but spaced from the lowest point of the aperture 148 through the lower wall 142 of the clamping pad support plate 122. In this position, the clamping pad support plate 122 and the attached clamping pad 134 are closer to the positioning block 124 than when in a raised position and the clamping pad 134 engages the upper surface of the cable 22. The springs 132 bias the clamping pad 134 down onto the cable 22 and clamp the cable 22 between the clamping pad 134 and the positioning block 124.

As shown in the notching position in FIGS. 27-30, the clamping assembly 34 and the notching saw 30 are spaced closer to the positioning block 124 than when in a raised position, and the clamping pad 134 and the notching saw 30 are within the cable travel space 62, but the notching saw 30 is spaced closer to the positioning block 124 than when in the clamping position. The clamping pad 134 engages with the cable 22 and deters the cable 22 from moving upwardly and downwardly or side-to-side, so that the notching saw 30 can notch the cable 22 without the cable 22 moving within the groove 136 of the positioning block 124. This provides for a more accurate notch. The motor shaft 106 is proximate to the lowest point of the aperture 148 through the lower wall 142 of the clamping pad support plate 122. The springs 132 bias the clamping pad 134 down onto the cable 22 and clamp the cable 22 between the clamping pad 134 and the positioning block 124 in the cable travel space 62. Thus, in the notching position, the cable 22 is also clamped in the cable travel space 62 by the clamping assembly 34. In this notching position, the notching saw 30 extends through the slot 154 in the first wall 150 of the clamping pad support plate 122 and engages with the cable 22 so that the cable 22 can be cut.

To move the machine 20 from the raised position to the clamping position, the drive assembly 112 is engaged to rotate the stamping 110 and the motor 108. This causes the motor shaft 106 to move along the arc in the elongated aperture 104 in the support wall 50 and in the enlarged aperture 148 in the lower wall 142 of the clamping pad support plate 122. As the motor shaft 106 moves in the arc, the clamping pad support plate 122, the roll pins 128 and its attached clamping pad 134 move downwardly when the motor shaft 106 engages the bottom of the aperture 148. The roll pins 128 slide relative to the upper and lower plates 118, 120. The clamping pad support plate 122, the roll pins 128 and the clamping pad 134 slide along rods 126. When the motor shaft 106 is moved downwardly far enough into the clamping position, the clamping pad 134 moves into the cable travel space 62 and engages the top surface of the cable 22. The springs 132 bias the clamping pad 134 into engagement with the cable 22 and further into the cable travel space 62 to clamp the cable 22.

To move the machine 20 from the clamping position to the notching position, the drive assembly 112 is engaged to further rotate the stamping 110 and the motor 108. This causes the motor shaft 106 to move further along the arc in the elongated aperture 104 in the support wall 50 and in the enlarged aperture 148 in the lower wall 142 of the clamping pad support plate 122 to move the clamping pad support plate 122 and the notching saw 30. The clamping pad 134 maintains its clamping position by sliding along the shoulder bolts 130. The springs 132 continue to bias the clamping pad 134 into the clamping position. The notching saw 30 extends through the slot 154 in the first wall 150 in the clamping pad support plate 122 to engage the cable 22. In this notching position, the clamping pad support plate 122 and the attached clamping pad 134 are in the same position relative to the positioning block 124 as when in the clamping position such that the clamping pad 134 engages the upper surface of the cable 22. Thus, in the notching position, the cable 22 is also clamped by the clamping assembly 34.

To move the machine 20 from the notching position to the clamping position, the drive assembly 112 is engaged to rotate the stamping 110 and the motor 108. This causes the motor shaft 106 to move along the opposite arc in the elongated aperture 104 in the support wall 50 and in the enlarged aperture 148 in the lower wall 142 of the clamping pad support plate 122. The notching saw 30 exits the slot 154 in the first wall 150 in the clamping pad support plate 122.

To move the machine 20 from the clamping position to a raised position, the drive assembly 112 is engaged to further rotate the stamping 110 and the motor 108. This causes the motor shaft 106 to move further along the opposite arc in the elongated aperture 104 in the support wall 50 and in the enlarged aperture 148 in the lower wall 142 of the clamping pad support plate 122. When the motor shaft 106 is moved far enough to contact the upper end of the enlarged aperture 148 in the lower wall 142 of the clamping pad support plate 122, the further movement of the motor shaft 106 causes the clamping assembly 34 to move upwardly. The motor shaft 106 bears against the upper end of the enlarged aperture 148 in the lower wall 142 of the clamping pad support plate 122, which causes the clamping pad support plate 122 and its attached clamping pad 134 to move upwardly. The roll pins 128 slide relative to the upper and lower plates 118, 120. The clamping pad support plate 122, the roll pins 128 and the clamping pad 134 slide along rods 126. When the clamping pad 134 is lifted away from the cable 22, the springs 132 expand to their natural state. The clamping assembly 34 is lifted to the extent such that the clamping pad 134 is no longer in contact with the cable 22 or interferes with the cable travel space 62.

If the machine 20 is being moved to the notching position, the motor 108 may be activated to rotate the notching saw 30 at the time when the movement from a raised position. Alternatively, in some embodiments, the motor 108 may be activated to rotate the notching saw 30 when the machine 20 reaches the clamping position. In a raised position, the notching saw 30 is not rotated.

In an embodiment as shown in FIGS. 42-58, the machine 20 includes the feed assembly 28 configured to advance the cable 22 through the machine 20 from the feed end 24 to the discharge end 26, the notching saw 30 which is configured to notch the cable 22, the cutting assembly 66 which is configured to cut the cable 22 into individual whips, and the clamping assembly 1034 which is configured to clamp the cable 22 to deter the cable 22 from moving upwardly and downwardly or side-to-side in the machine 20 while the cable 22 is being notched by the notching saw 30 and the cutting assembly 66. A shelf 1172 is additionally included with this embodiment and is used to back tension the cable 22 after the clamping assembly 1034 is moved to the clamping position. The shelf 1172 is positioned downstream of the cutting assembly 66. While this shelf 1172 is shown with regard to the embodiment shown in FIGS. 42-58, a moveable shelf can be used with the embodiment shown in FIGS. 1-41.

The clamping assembly 1034 is mounted within the cabinet 36, 336 and is proximate to the feed assembly 28. The notching saw assembly 64, which includes the notching saw 30, is proximate to the clamping assembly 1034. The cutting assembly 66 is proximate to the clamping assembly 1034 and to the output 60. The input 58, the feed assembly 28, the clamping assembly 1034, the notching saw assembly 64, the cutting assembly 66, the shelf 1172, and the output 60 are in-line with each other in some embodiments.

Figure 45:
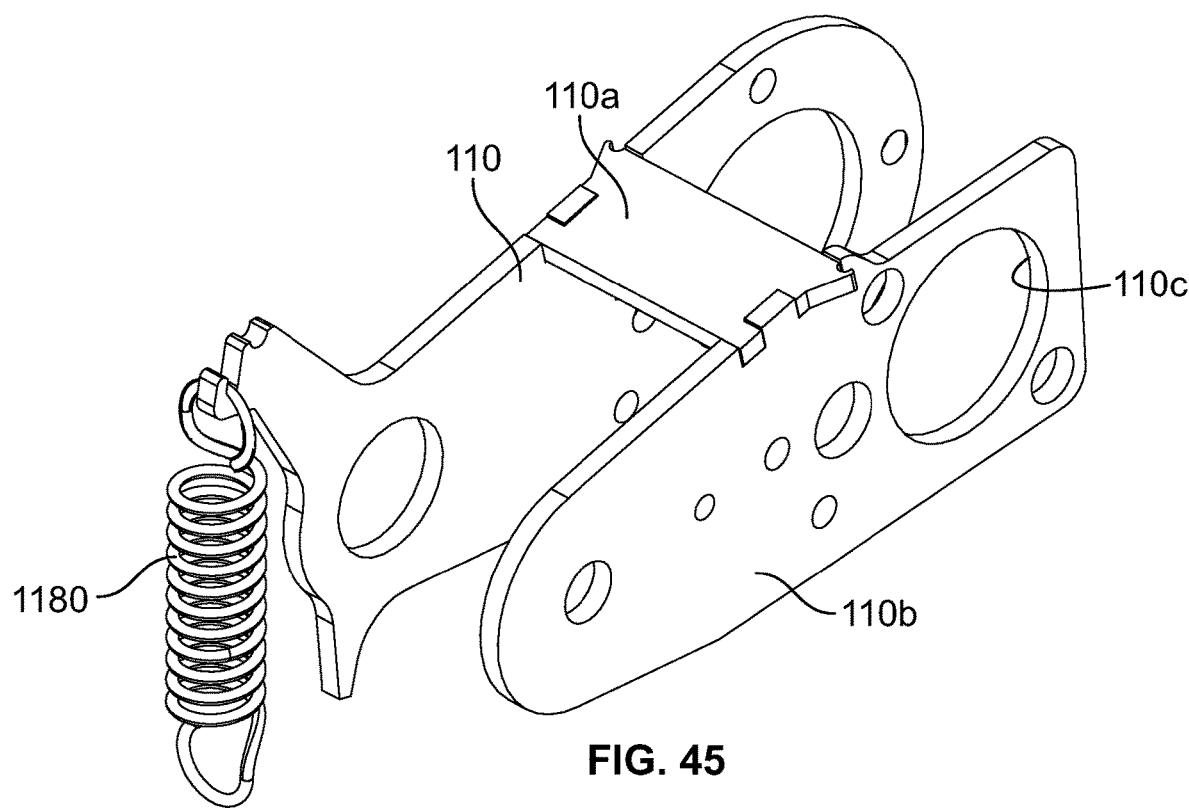
FIG. 45 depicts a perspective view of a stamping of the clamping assembly of FIG. 42.

The notching saw assembly 64 also includes the drive assembly 112 which in an embodiment is formed by the gearbox 114 and the motor 116, such as a servomotor or stepper motor, or any motor along with positional feedback. In an embodiment, the drive assembly 112 is mounted by a bracket 113 on a support wall 550. The gearbox 114 of the illustrated embodiment has a shaft 114b which is affixed to the stamping 110. As shown in FIG. 45, the stamping 110 in this embodiment has been modified to include a bridge plate 110a which extends from the stamping 110 and a second stamping 110b which is cantilevered from the bridge plate 110a. The stamping 110b extends downwardly from the bridge plate 110a. An aperture 110c is provided through the stamping 110b through which the motor shaft 106 of the motor 108 extends.

The clamping assembly 1034 of some embodiments includes a positioning block 2124, a shaft 1126 extending outwardly from the stamping 110b, a clamping pad support plate 1128 rotatably mounted on the shaft 1126, a spring 1130 mounted on the shaft 1126 between the stamping 110b and clamping pad support plate 1128, a clamping pad 1134 mounted on the clamping pad support plate 1128. The shaft 1126 is affixed to the stamping 110b such that the shaft 1126 rotates with the stamping 110b as described herein.

Figure 46:
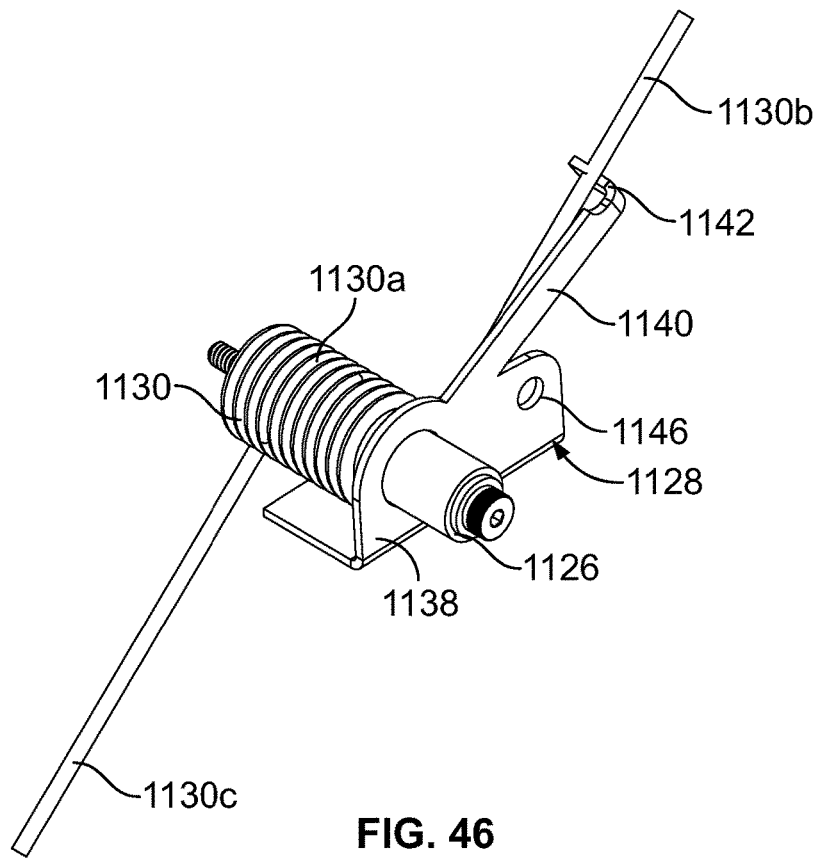
FIG. 46 depicts a perspective view of a clamping pad support and spring of the clamping assembly of FIG. 42.

The clamping pad support plate 1128, see FIG. 46, has a planar body 1138 through which the shaft 1126 extends and a finger 1140 planar with the body 1138 and extending outwardly from the body 1138, upwardly from the body 1138, and at an angle relative to the body 1138. The clamping pad support plate 1128 is supported on the shaft 1126 and is rotatable relative to the shaft 1126. A hook end 1142 extends inwardly from the free end of the finger 1140 toward the stamping 110b. The clamping pad 1134 is rotatably attached to the body 1138 by a fastener 1144 which extends through an aperture 1146 that is provided through the body 1138 below the finger 1140. As such, the finger 1140 and the clamping pad 1134 are positioned on the same side of the body 1138 and are spaced from the shaft 1126.

Figure 44:
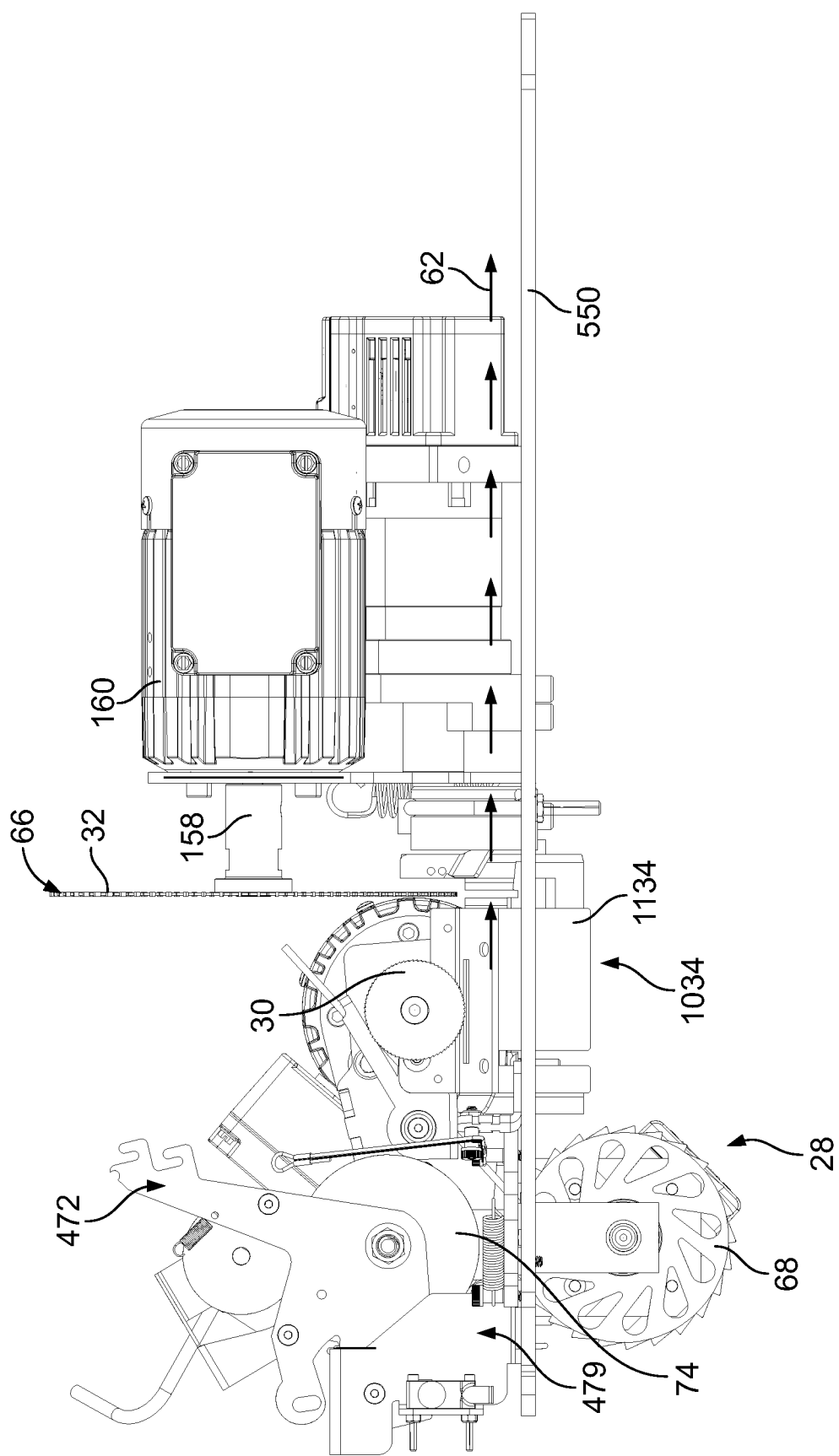
FIG. 44 depicts a side elevation view of the clamping assembly of FIG. 42 in the raised position, and showing the cutting assembly.

The spring 1130 includes a coiled section 1130a which wraps around the shaft 1126, a first arm 1130b extending from the coiled section 1130a and which engages with the hook end 1142 on the finger 1140 of the clamping pad support plate 1128, and a second arm 1130c extending from the coiled section 1130a and which engages with a protrusion 1131, see FIG. 44, extending from the stamping 110b. As such, the spring 1130 biases the clamping pad support plate 1128 into at rest position.

Figure 47:
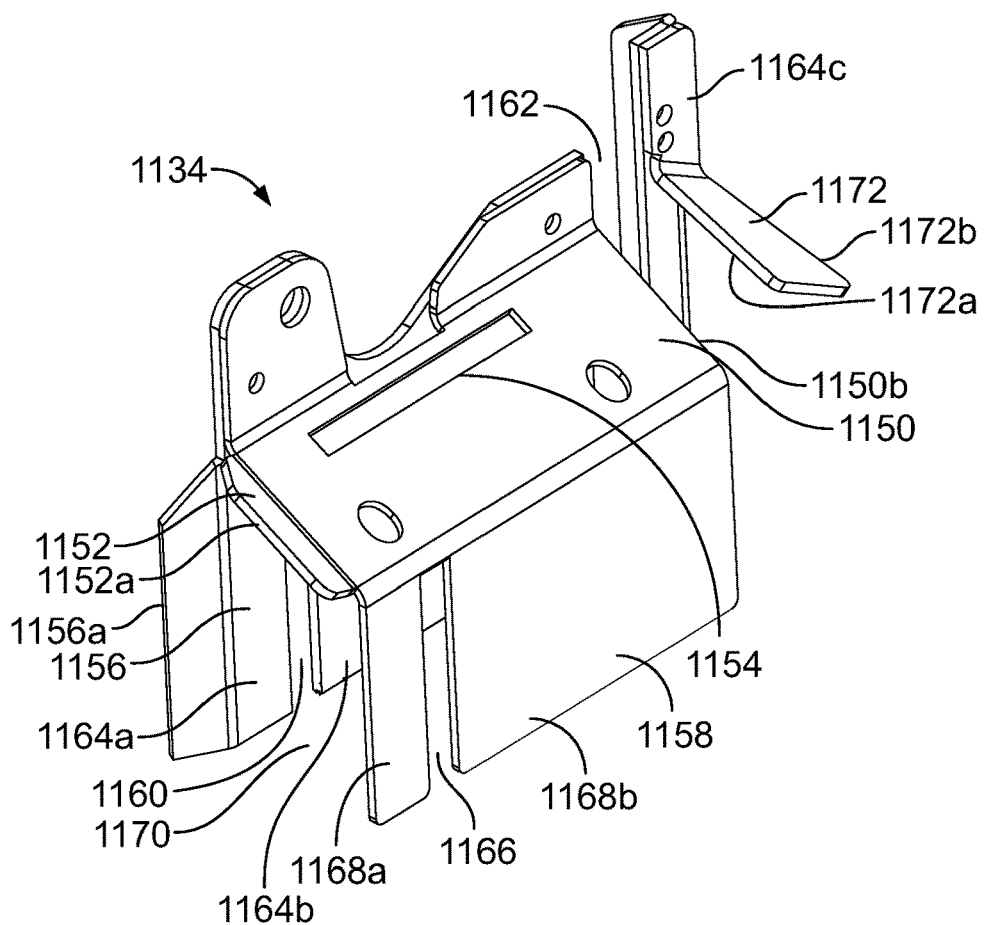
FIG. 47 depicts a perspective view of a clamping pad of the clamping assembly of FIG. 42.
Figure 48:
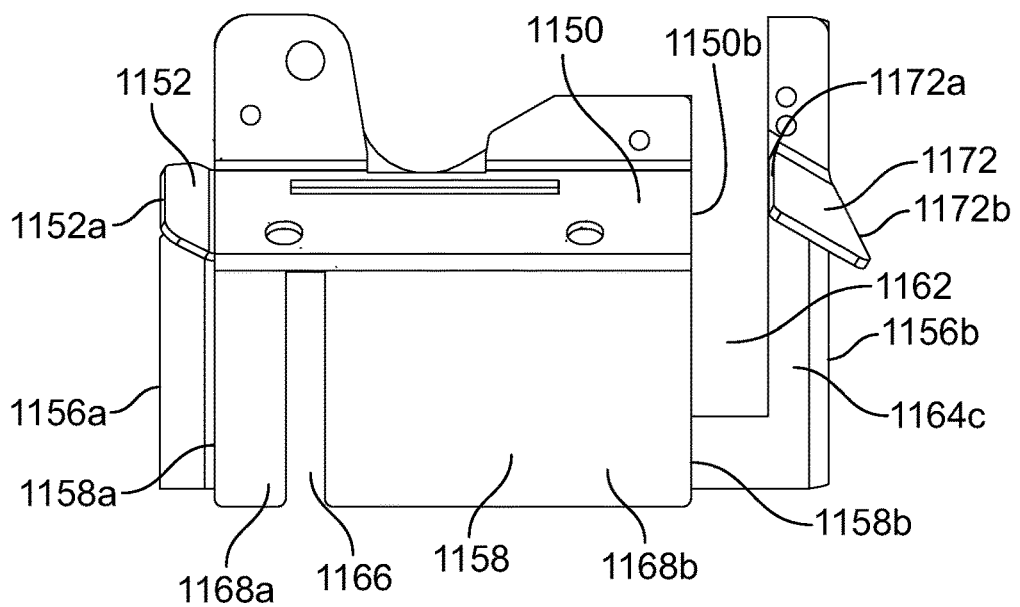
FIG. 48 depicts a side elevation view of the clamping pad of FIG. 47.
Figure 49:
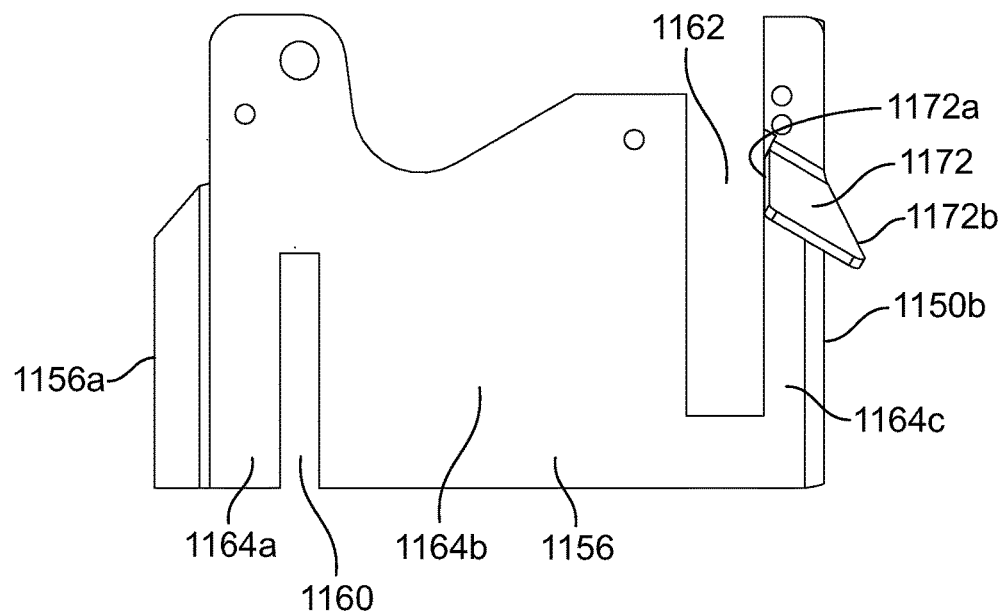
FIG. 49 depicts a side elevation view of a first side wall of the clamping pad of FIG. 47.

As best shown in FIGS. 47-49, the clamping pad 1134 of some embodiments is formed of a first planar wall 1150 and a second wall 1152 which is angled upwardly relative to the first wall 1150 at an angle α, which may be 45 degrees, and which is less than 90 degrees. The second wall 1152 defines a feed end 1152a and the first wall 1150 defines a discharge end 1150b. The first wall 1150 of such embodiments has an elongated slot 1154 provided therethrough which extends from its top surface to its bottom surface and extends axially along the first wall 1150.

The clamping pad 1134 further includes a first side wall 1156 extending downwardly from a side edge of the first wall 1150 which extends between the feed end 1152a and the discharge end 1150b, and a second side wall 1158 extending downwardly from the opposite side edge of the first wall 1150 which extends between the feed end 1152a and the discharge end 1150b. The side walls 1156, 1158 extend vertically. In an embodiment, the first and second walls 1150, 1152 are at an angle relative to the vertical. As an example, the first and second walls 1150, 1152 are angled at 45 degrees relative to the vertical. The first and second walls 1150, 1152 may also be horizontal.

The first side wall 1156 has a length which is defined between a feed end 1156a of the first side wall 1156 and a discharge end 1156b of the first side wall 1156. The first side wall 1156 has a first elongated slot 1160 which extends vertically upwardly from a bottom edge of the first side wall 1156 and a second elongated slot 1162 which extends vertically downwardly from a top edge of the first side wall 1156. The slots 1160, 1162 divide the first side wall 1156 into a front portion 1164a, an intermediate portion 1164b and a rear portion 1164c; the intermediate portion 1164b being between the slots 1160, 1162. In an embodiment, the first slot 1160 is proximate to, but spaced from the feed end 1156a. The second slot 1162 is proximate to, but spaced from the discharge end 1156b.

The second side wall 1158 has a length which is defined between a feed end 1158a of the second side wall 1158 and a discharge end 1158b of the second side wall 1158. The second side wall 1158 has an elongated slot 1166 which extends vertically upwardly from a bottom edge of the second side wall 1158. The slot 1166 divides the second side wall 1158 into a front portion 1168a and a rear portion 1168b. In an embodiment, the slot 1166 is proximate to, but spaced from the feed end 1156a. The slot 1162 is proximate to, but spaced from the discharge end 1156b. In an embodiment, the slots 1160, 1166 are aligned with each other.

The length of the first side wall 1156 is greater than the length of the second side wall 1158 such that the second slot 1162 and the rear portion 1164c are downstream of the discharge end 1158a of the second side wall 1158.

The walls 1150, 1152, 1156, 1158 define a cavity 1170 through which the cable 22 extends during use as described herein.

The shelf 1172 is attached to the rear portion 1164c of the first side wall 1156 and extends outwardly towards the second side wall 1158 and downwardly toward the lower edge of the first side wall 1156. The shelf 1172 overlaps into the cavity 1170. The shelf 1172 has a feed end 1172a and a discharge end 1172b. The shelf 1172 is angled relative to the horizontal such that the feed end 1172a is spaced a greater distance from the lower edge of the first side wall 1156 than the discharge end 1172b.

Figure 50:
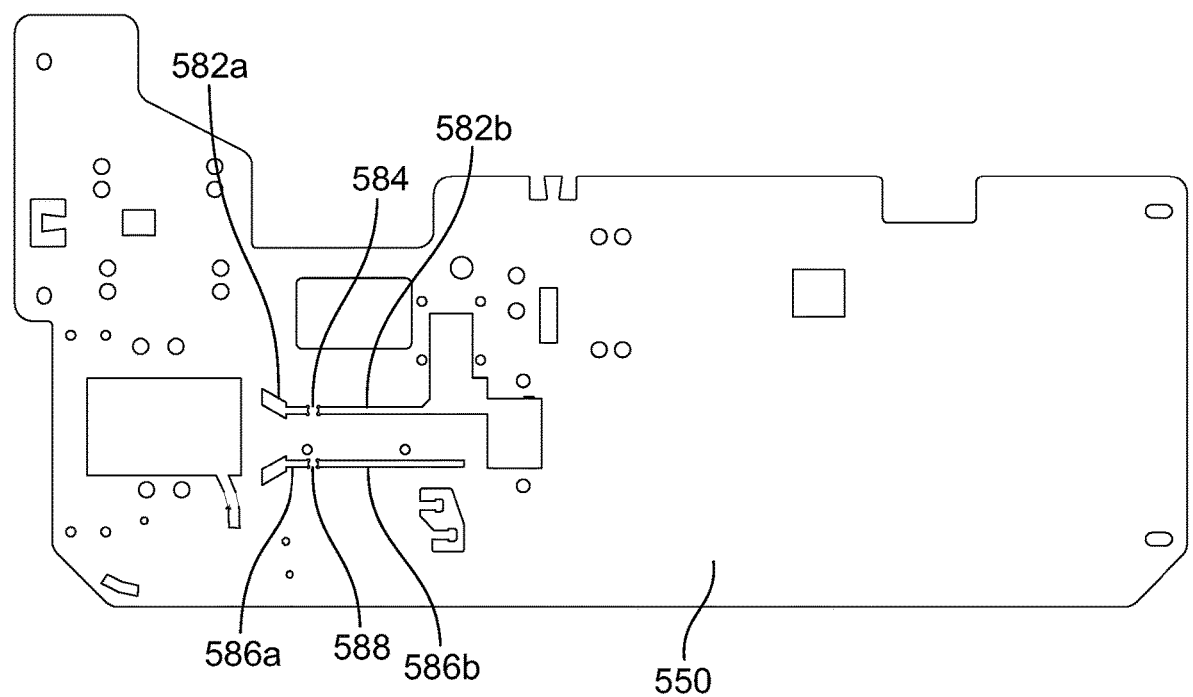
FIG. 50 depicts a top plan view of a support wall used in an embodiment of the machine.

As shown in FIG. 50, the support wall 550 has front and rear spaced apart slots 582a, 582b which are separated by a wall section 584. The front portion 1164a of the first side wall 1156 extends through the front slot 582a and the intermediate and rear portions 1164b, 1164c of the first side wall 1156 extends through the rear slot 582b. The wall section 584 seats within the slot 1160. The support wall 550 further has front and rear spaced apart slots 586a, 586b which are separated by a wall section 588. The front portion 1168a of the second side wall 1158 extends through the front slot 586a and the rear portion 1168b of the second side wall 1158 extends through the rear slot 586b. The wall section 588 seats within the slot 1166.

Figure 51:
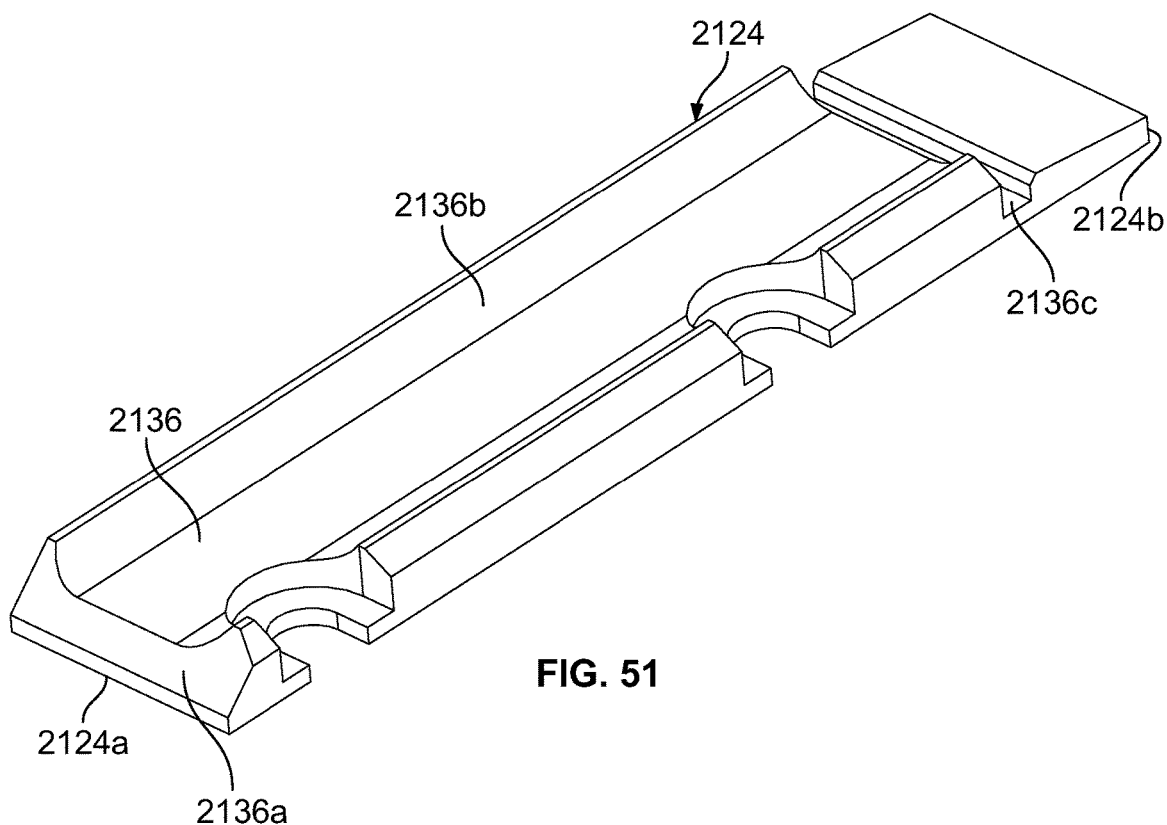
FIG. 51 depicts a perspective view of an alternate positioning block of the clamping assembly.
Figure 52:
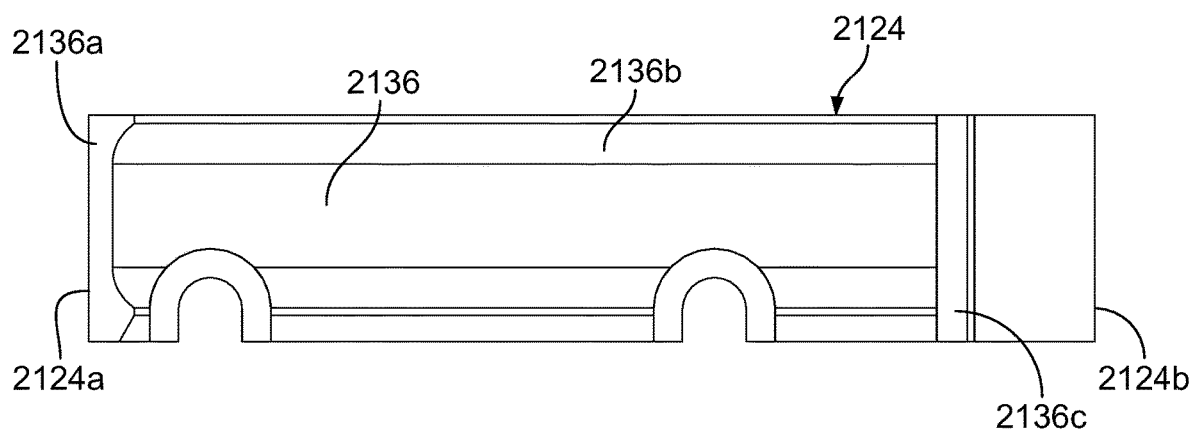
FIG. 52 depicts a top plan view of the positioning block of FIG. 51.

As best shown in FIGS. 51 and 52, the positioning block 2124 has a groove 2136 provided in its top surface, which in an embodiment is V-shaped, U-shaped, or generally V-shaped or generally U-shaped. The groove 2136 extends from a feed end 2124a of the positioning block 2124 which is proximate to the feed roller 68 to a discharge end 2124b of the positioning block 2124. A first wall 2136a of the groove 2136 may be chamfered to allow easier entry of the cable 22 into the groove 2136. A second wall 2136b of the groove 2136 extends linearly. A notch 2136c is provided in the second wall 2136b proximate to, but spaced from, the discharge end 2124b of the positioning block 2124 and transverse to the length of the positioning block 2124. The positioning block 2124 is mounted on the upper surface of the support wall 550 between the slots 582a, 582b and 586a, 586b and the notch 2136c is positioned to be acted upon by a saw blade 32 of the cutting assembly 66.

Figure 53:
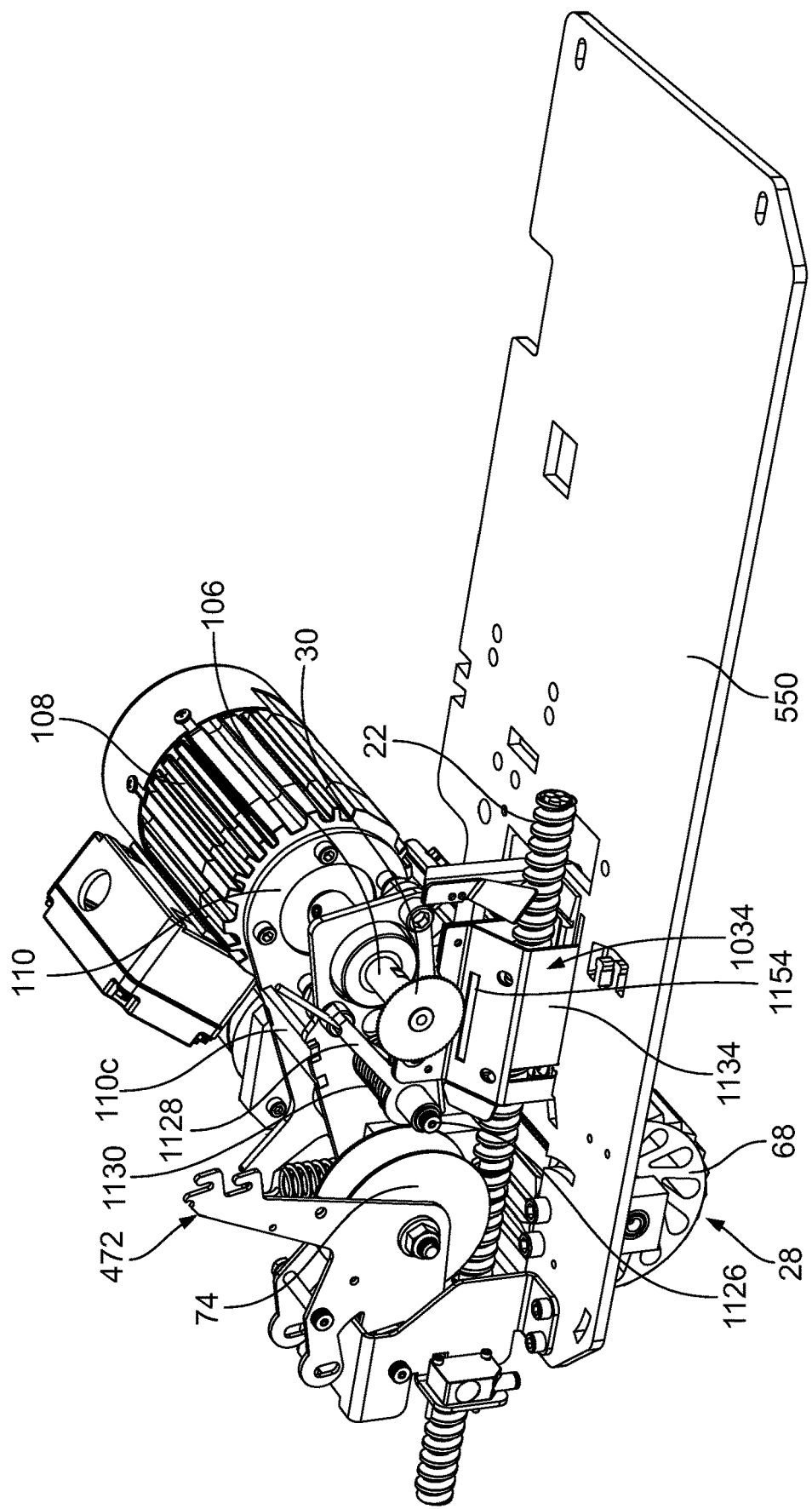
FIG. 53 depicts an alternate perspective view of the clamping assembly of FIG. 42 with the clamping assembly in the raised position, and showing a cable.
Figure 54:
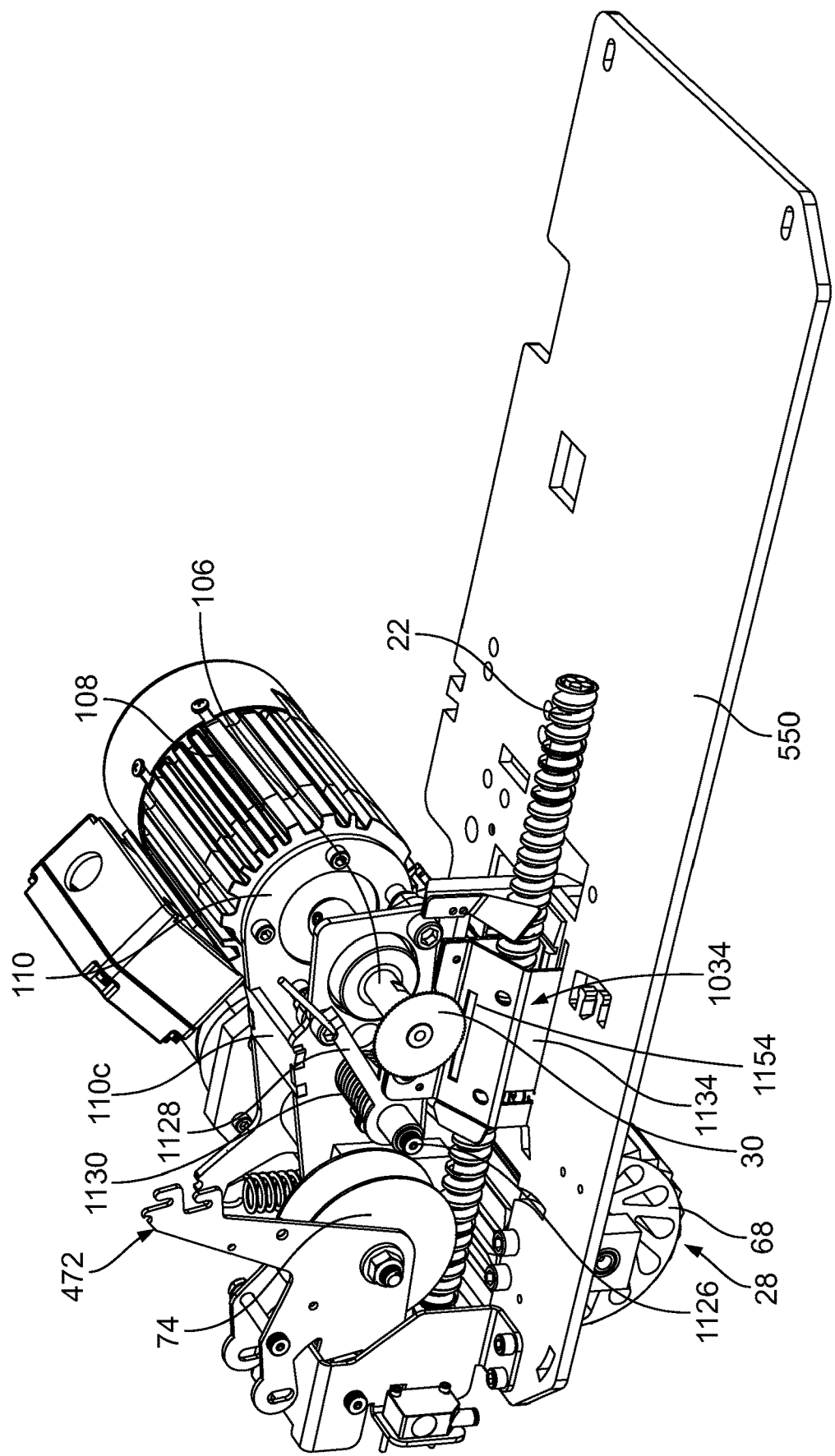
FIG. 54 depicts a perspective view of the clamping assembly of FIG. 42 with the clamping assembly in a clamping position, and showing a cable.
Figure 55:
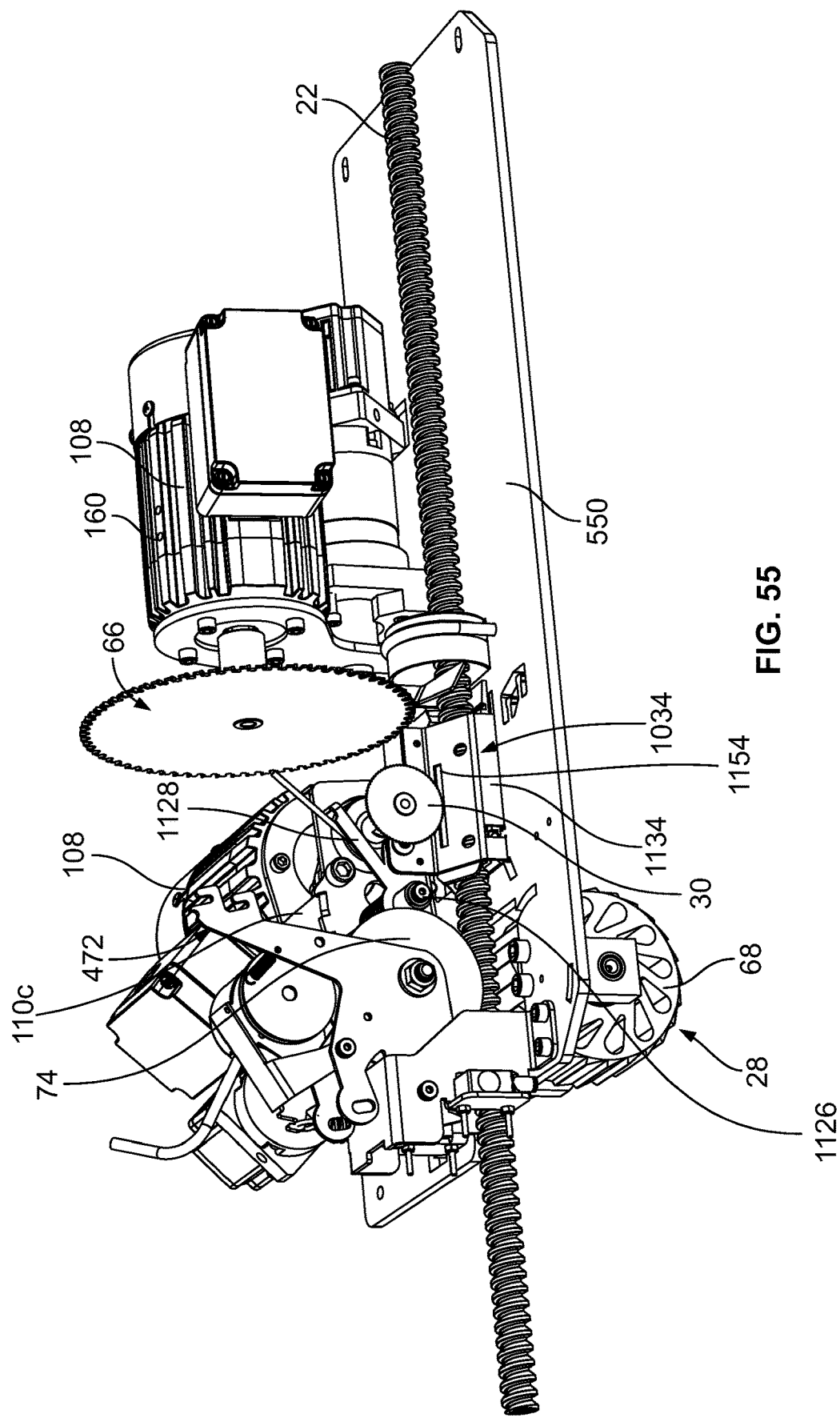
FIG. 55 depicts a perspective view of the clamping assembly of FIG. 42 with the clamping assembly in a back-tensioning position, and showing a cable.
Figure 56:
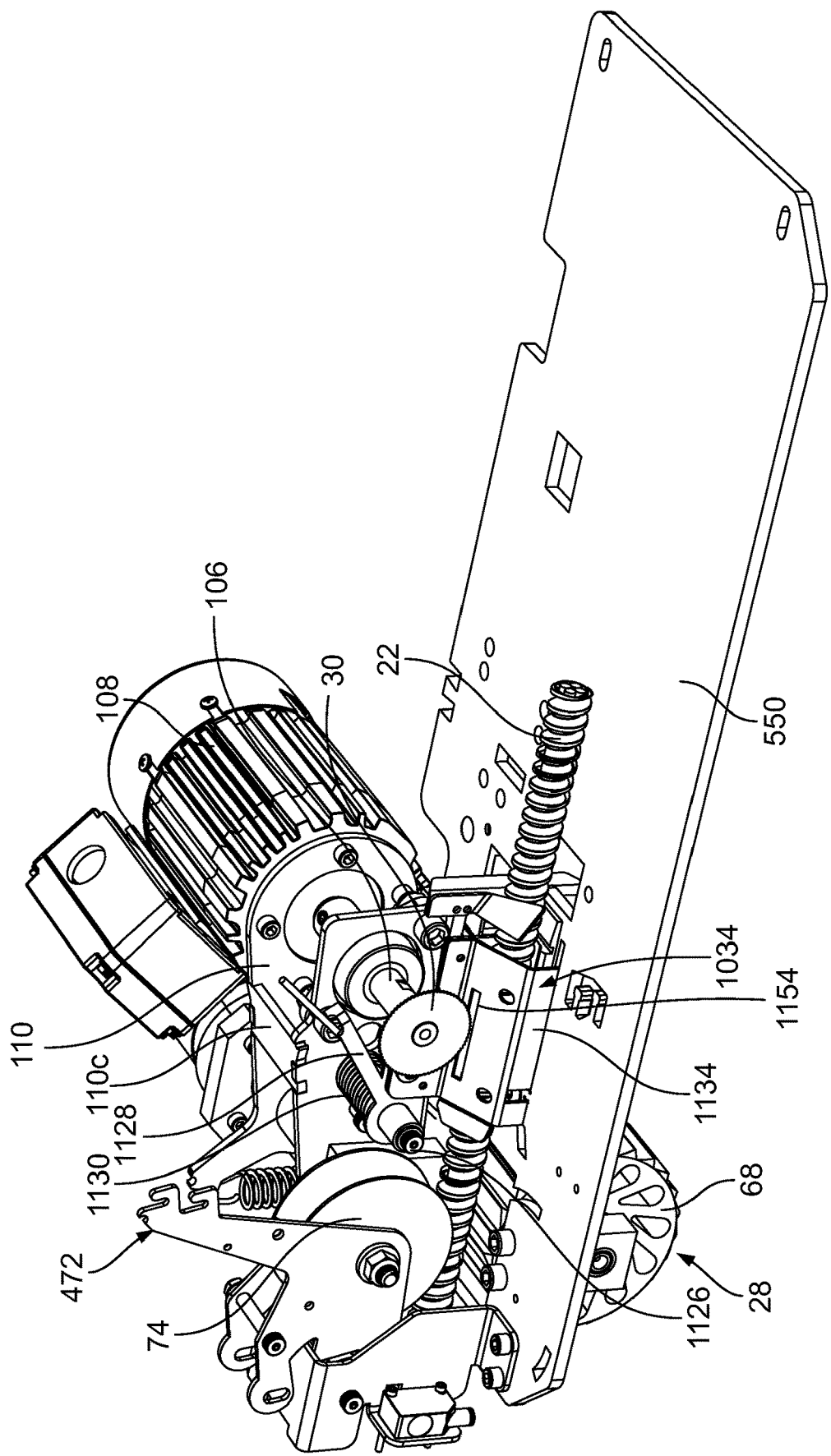
FIG. 56 depicts an alternate perspective view of the clamping assembly of FIG. 42 with the clamping assembly in the back-tensioning position, and showing a cable.
Figure 57:
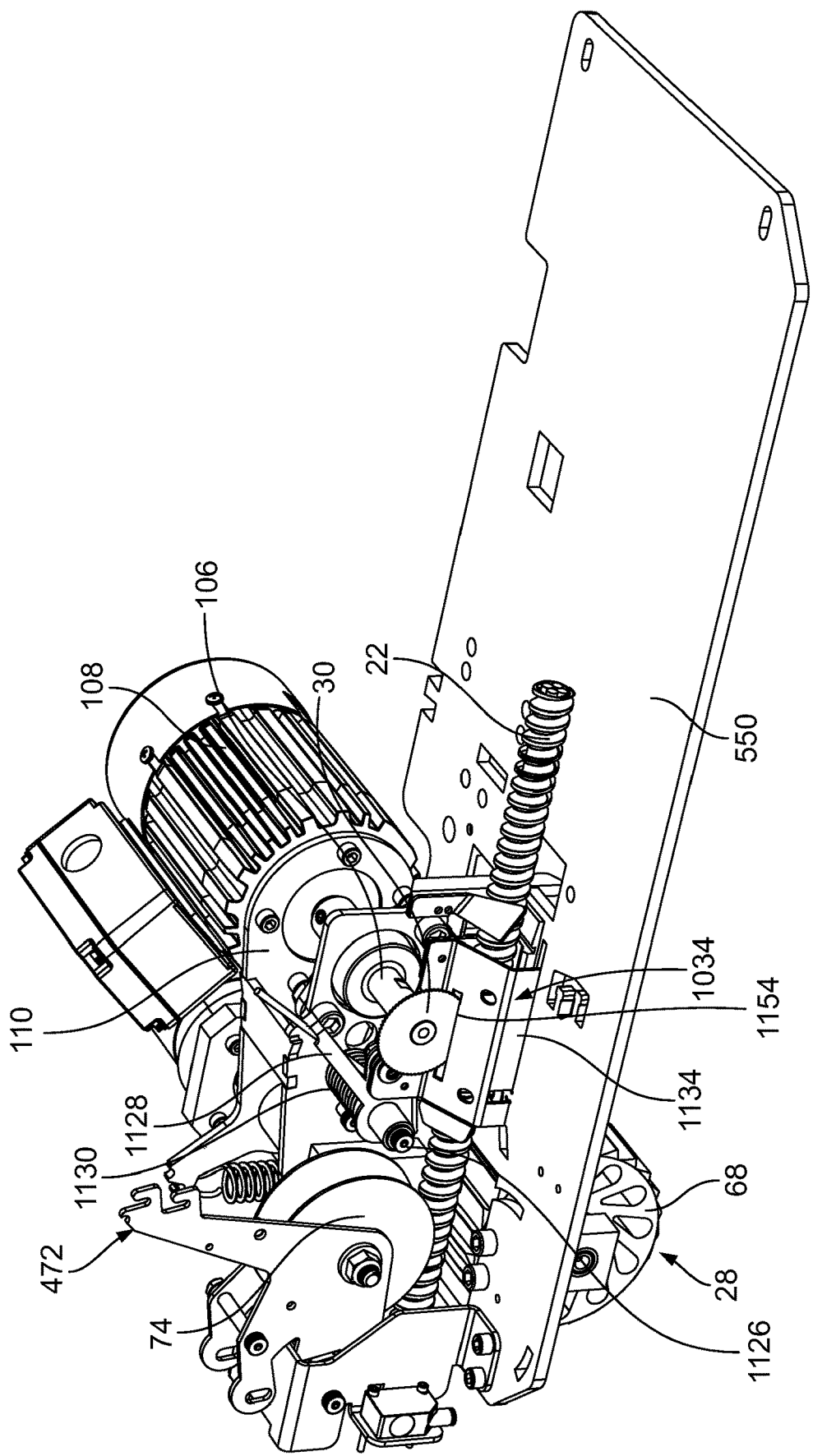
FIG. 57 depicts a perspective view of the clamping assembly of FIG. 42 with the clamping assembly in the notching position, and showing a cable.
Figure 58:
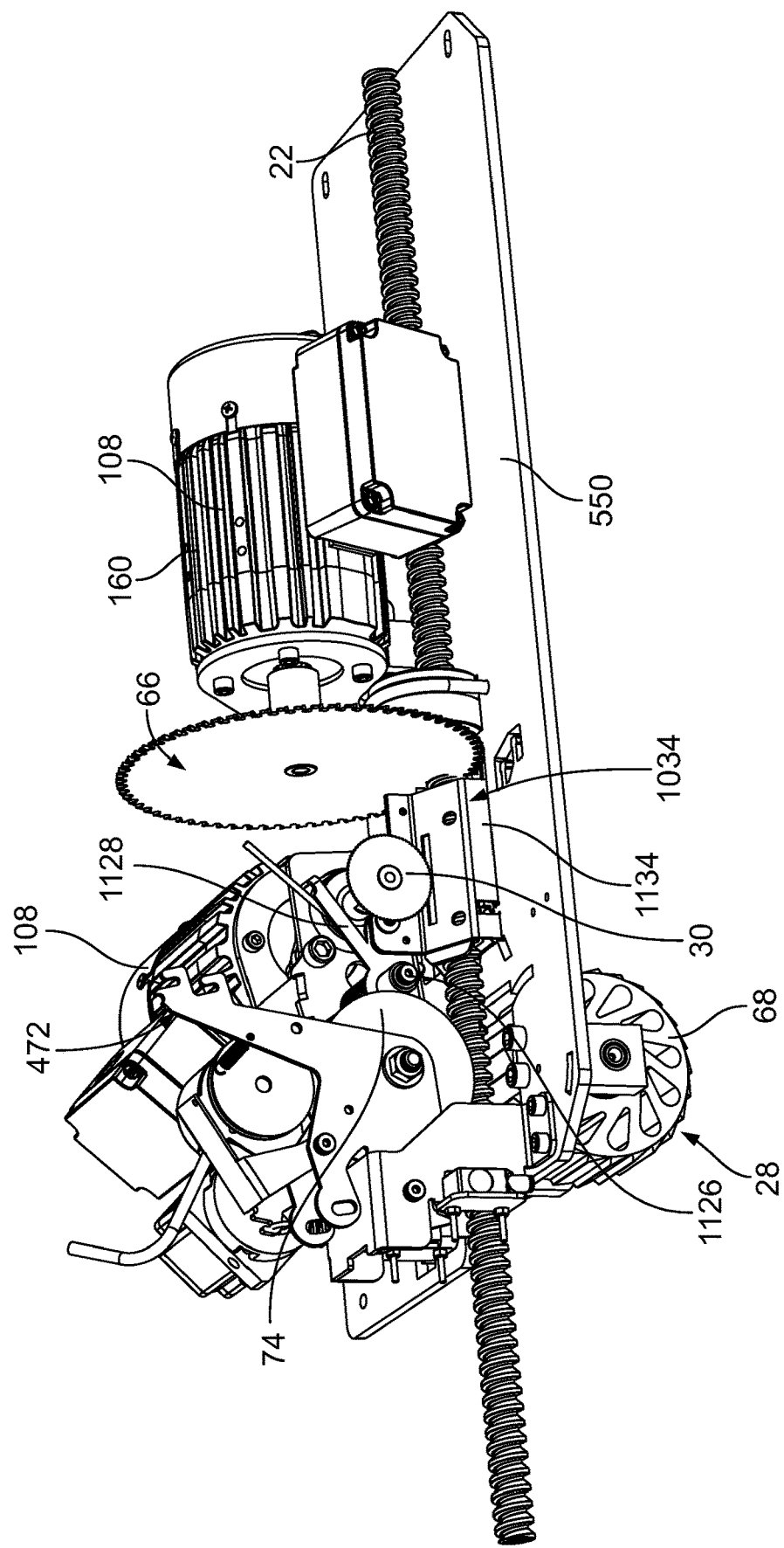
FIG. 58 depicts a perspective view of the clamping assembly of FIG. 42 with the clamping assembly in a cutting position, and showing a cable.

In the illustrated embodiment, as discussed herein, the clamping assembly 1034 and notching saw 30 are positionable in four different positions, namely the raised position, the clamping position, a back-tensioning position, and the notching position. An example of the raised position is shown in FIG. 53. An example of the clamping position is shown in FIG. 54. An example of the back-tensioning position is shown in FIGS. 55 and 56. An example of the notching position is shown in FIG. 57.

When in the raised position as shown in FIG. 53, the clamping assembly 1034 is not engaged with the cable 22 and the first wall 1150 is not within the cable travel space 62. The clamping assembly 1034 and the notching saw 30 are spaced furthest upwardly from the positioning block 2124, the first wall 1150 of the clamping pad 1134 is not within the cable travel space 62, and the cable 22, if positioned in the cable travel space 62, is not engaged by the clamping pad 1134. In the illustrated embodiment, in use, the cable 22 is fed into the cable travel space 62 between the clamping pad 1134 and the positioning block 2124 when the machine 20 is in a raised position by activation of the motor 79 which rotates the feed roller 68 of the feed assembly 28. The cable 22 rests in the groove 2136 on the positioning block 2124. When the cable 22 is first fed into the clamping assembly 1034, the cable 22 engages with the angled second wall 1152 of the clamping pad 1134 and the chamfered first wall 2136a of the positioning block 2124 to direct entry of the cable 22 into the cable travel space 62 between the clamping pad 1134 and the positioning block 2124. In addition, as the cable 22 is being fed through the machine 20, the angled second wall 1152 of the clamping pad 1134 and the chamfered first wall 2136a of the positioning block 2124 do not catch on the helical turns of the cable 22, thereby promoting the movement of the cable 22 through the machine 20. Thereafter, the clamping assembly 1034 and the notching saw 30 can be moved to the clamping position or to the notching position.

Actuation of the drive assembly 112 results in rotation of the gearbox shaft 114b which causes the affixed stamping 110 and shaft 1126 to rotate around the axis of the shaft 114b, and which causes the motor 108, its motor shaft 106 and the notching saw 30 to move in an arc. As the stamping 110 and shaft 1126 rotate, the clamping pad support plate 1128 moves in an arc which causes the clamping pad 1134 to move vertically downwardly through the support wall 550. The clamping pad support plate 1128 rotates relative to the clamping pad 1134 during this movement. When the first wall 1150 of the clamping pad 1134 engages with the cable 22 within the cavity 1170, the clamping assembly 1034 is in the clamping position as shown in FIG. 54. The coiled section 1130a of the spring 1130 unwinds to permit this rotation. The discharge end 1172b of the shelf 1172 is not engaged with a turn of the cable 22. As shown in the clamping position in FIG. 54, the first wall 1150 of the clamping assembly 1034 and the notching saw 30 are spaced closer to the positioning block 2124 than when in the raised position, and the clamping pad 1134 is within the cable travel space 62. The clamping pad 1134 engages with the cable 22 and deters the cable 22 from moving upwardly and downwardly or side-to-side in the machine 20.

Further actuation of the drive assembly 112 results in rotation of the gearbox shaft 114b which causes the affixed stamping 110 and shaft 1126 to rotate around the axis of the shaft 114b, and which causes the motor 108, its motor shaft 106 and the notching saw 30 to continue to move in the arc. As the stamping 110 and shaft 1126 further rotate, the clamping pad support plate 1128 no longer moves in the arc and instead rotates around fastener 1144 and continues to move vertically until the discharge end 1172b of the shelf 1172 engages with a turn of the cable 22 and the clamping assembly 1034 is the back-tensioning position as shown in FIGS. 55 and 56. When in the back-tensioning position, in some embodiments, the machine 20 is back tensioned to apply a tension to the cable 22 prior to the cable 22 being notched. To provide the back tension, the feed roller 68 is driven in the reverse direction by the motor 79 until the motor 79 is at a predetermined torque. Thereafter, the motor 79 is stopped. Since the cable 22 is held by the discharge end 1172b of the shelf 1172, the cable 22 is tensioned when the feed roller 68 is driven in the reverse direction.

Even further actuation of the drive assembly 112 results in rotation of the gearbox shaft 114b which causes the affixed stamping 110 and shaft 1126 to rotate around the axis of the shaft 114b, and which causes the motor 108, its motor shaft 106 and the notching saw 30 to continue to move in the arc. As the stamping 110 and shaft 1126 further rotate, the clamping pad support plate 1128 no longer moves in the arc and instead rotates around fastener 1144 such that the position of the clamping pad 1134 is maintained. The notching saw 30 passes through the slot 1154 of the clamping pad 1134 to engage with the jacket of the cable 22 and place the machine 20 into the notching position. As shown in the notching position in FIG. 58, the clamping assembly 1034 and the notching saw 30 are spaced closer to the positioning block 2124 than when in a raised position, and the clamping pad 1134 and the notching saw 30 are within the cable travel space 62, but the notching saw 30 is spaced closer to the positioning block 2124 than when in the clamping position. The clamping pad 1134 engages with the cable 22 and deters the cable 22 from moving upwardly and downwardly or side-to-side in the machine 20, so that the notching saw 30 can notch the cable 22 without the cable 22 moving within the groove 2136 of the positioning block 2124. This provides for a more accurate notch.

Thereafter, to move the cable 22 toward the output 60, the clamping assembly 1034 is returned to the raised position in some embodiments or to the clamping position in some embodiments.

The clamping assembly 1034 can be returned to the raised position from the clamping or back-tensioning positions, or the clamping assembly 1034 can be returned to the clamping position from the back-tensioning position, by reverse actuation of the drive assembly 112 to move the motor 108, its motor shaft 106, the notching saw 30, the stamping 110, the shaft 1126 and the clamping pad support plate 1128 in a reverse arc and which causes the clamping pad 1134 to move vertically upwardly relative to the support wall 550. When the components are moved in the reverse arc, the clamping pad 1134 is initially pulled upwardly relative to the support wall 550 by the coiled section 1130a of the spring 1130 re-winding around the shaft 1126 which pivots the clamping pad support plate 1128, and the clamping pad 1134 is further moved vertically upwardly by the clamping pad support plate 1128 as it moves in the reverse arc.

In an embodiment, a spring 1180 is attached to the stamping 110 and to the support wall 550 to further bias the stamping 110 towards the initial position.

While the notching saw 30, its motor 108 and motor shaft 106 are shown as being above the clamping pad 1134 and moving with the stamping 110, the notching saw 30, its motor 108 and motor shaft 106 can be provided separate from the stamping 110 and below the positioning block 2124. The notching saw 30, its motor 108 and motor shaft 106 are supported by a lifting assembly (not shown) which raises the notching saw 30 through a slot (not shown) in the positioning block 2124 into the notching position and lowering the notching saw 30 through the slot in the positioning block 2124 when the machine 20 is moved to the raised or clamping positions.

The drawings show example embodiments of cutting assemblies 66, each of which has a cutting tool having a cutting edge or edges. As used herein with regard to the cutting assembly 66, the term "cut" or "cutting" means that at least the conductors within the cable 22 are severed in half, a length of the cable 22 is cut off, a length of the cable 22 is cut through to form halves, the cable 22 is sheared in half, the cable 22 is guillotined cut into halves, and the like. This cutting action by the cutting assembly 66 is not limited to the specific embodiments shown herein as there are a variety of structures suitable for cutting the cable 22.

In an embodiment, the cutting assembly 66 includes a cutting tool in the form of a saw blade 32 having a cutting edge which cuts the cable 22 into the individual whips. The saw blade 32 is driven by a motor shaft 158 of a motor 160 which form part of the cutting assembly 66. The cutting assembly 66 further includes a stamping 162 to which the motor 160 is fixedly mounted and cantilevered from. In an embodiment as shown for example in FIGS. 1-3, the saw blade 32 is a rotary saw. In an embodiment, the saw blade 32 is circular. The motor 160 may, for example, be a direct current (DC) motor or an alternating current (AC) induction motor. However, it will be appreciated that other motors may be used to implement the motor 160 within the scope of the disclosure. In an embodiment, the cutting assembly 66 is positioned in the front compartment 52. In an embodiment, the motor shaft 158 extends through the stamping 162. In such an embodiment, the motor shaft 158 is parallel to the line formed by cable travel space 62 such that the saw blade 32 is perpendicular to the line forming the cable travel space 62 and is capable of cutting the cable 22 into whips.

The cutting assembly 66 also includes a drive assembly 164, which in an embodiment is formed by a gearbox 166 and a motor 168, such as a servomotor or stepper motor, or any motor along with positional feedback. In an embodiment, the motor 168 is affixed to the support wall 50 or to the side wall 40. The gearbox 166 of some embodiments is affixed to and extends from the motor 168. In accordance with some embodiments, the gearbox 166 is affixed to the stamping 162. Rotation of the gearbox 166 by the motor 168 causes the stamping 162 to rotate, which causes the motor 160, its motor shaft 158 and the saw blade 32 to move in an arc relative to the support wall 50.

Figure 59:
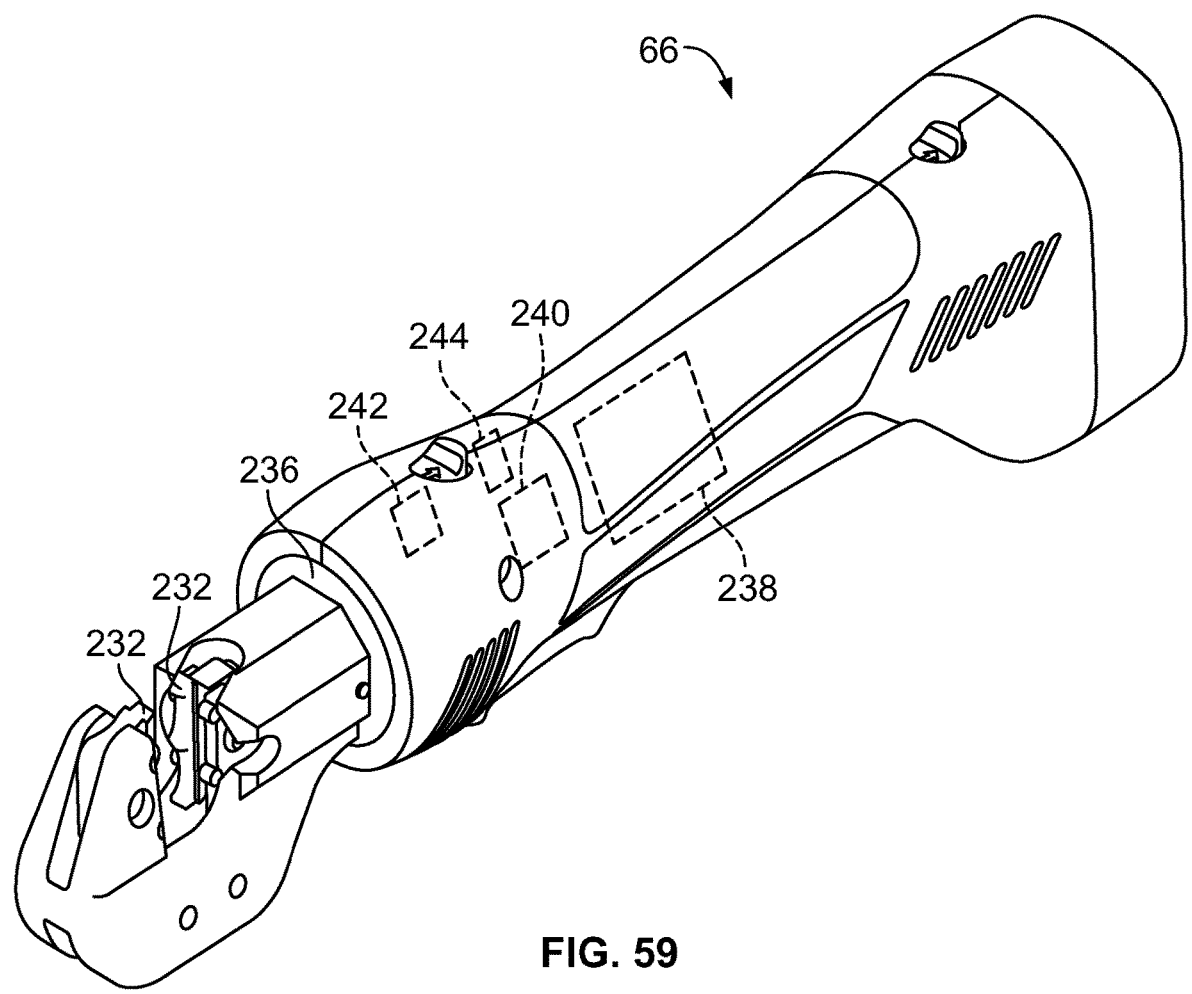

In an embodiment, the cutting assembly 66 is an electrohydraulic device having a cutting tool in the form of cutting inserts 232, each cutting insert 232 having a cutting edge, the cutting inserts 232 shearing the cable 22 into the individual whips. Such electrohydraulic device is shown for example in FIG. 59. The cutting device 232 is mounted by suitable frame (not shown) in the cabinet 36, 336. An example of such an electrohydraulic device is shown in U.S. Pat. No. 7,254,982, the contents of which are incorporated herein in its entirety. The pressing inserts in U.S. Pat. No. 7,254,982 are replaced with cutting inserts 232 to affect the shearing of the cable 22 into the individual whips. The cable 22 seats between the cutting inserts 232. In general, and as shown in FIG. 59, the cutting assembly 66 includes a working head 236 in which the cutting inserts 232 are seated, an electric motor 238, a pump 240, a hydraulic reservoir 242, and a gear mechanism 244 extending between the electric motor 238 and the pump 240. When the motor 238 is activated, the cutting inserts 232 are moved toward each other to shear the cable 22 into the whip. The pump 240 may be self-contained within the cutting assembly 66 or may be external to the cutting assembly 66. The control device 600 is in communication with the motor 238 to control and monitor the motor 238. Accordingly, the control device 600 may be configured to control movement of the cutting assembly 66. When the cutting inserts 232 are in an open position, the cable 22 can pass therethrough. When the cutting inserts 232 are moved to the closed position, the cutting inserts 232 cut the cable 22 into the whip. While illustrated embodiment shows the cutting assembly 66 with an integrated electric motor 238, in some embodiments an external drive unit can be provided. The external drive unit would include a hydraulic reservoir and a hydraulic line attached to the cutting assembly 66 to operate the cutting assembly 66.

The cutting assembly 66 may take other forms that those shown in the illustrated embodiments. As an example, the cutting assembly 66 may have a guillotine blade that cuts the cable 22.

The cutting assembly 66 can be withdrawn from the cable travel space 62 and can pass into the cable travel space 62. When the cutting assembly 66 passes into the cable travel space 62, the cable 22 is cut into a whip. During the cutting by the cutting assembly 66, the machine 20 is in the back-tensioning position to deter movement of the cable 22 relative to the positioning block 124. In some embodiments, the motor 108 rotating the notching saw 30 is not activated during movement of the cutting assembly 66.

While the cutting assembly 66 is shown and described as being actuated from above the cable 22, the machine 20 can be designed such that the cutting assembly 66 is actuated from below the cable 22.

In embodiments where the shelf 1172 is provided, when the cutting assembly 66 is moved into the cable travel space 62, the saw blade 32 or the cutting inserts 232 moves into the slot 1162 of the shelf 1172.

While the shelf 1172 has been described as being formed as part of the clamping pad 1134, the shelf 1172 can be independent of the clamping pad 1134 such that the shelf 1172 is moved independently of the clamping pad 1134. In such an embodiment, the shelf 1172 would have a driving mechanism configured to raise and lower the shelf 1172.

In some embodiments, operation of the machine 20 is affected by one or more control device(s) 600, see FIG. 60, which may be at least partially mounted on the cabinet 36, and/or may be at least partially located in a remote location to the cabinet 36. For example, the control device 600 may be mounted to the cabinet 36, such as via the clamping pad support plate 122, and/or may be disposed remotely from the cabinet 36, but that may be communicatively coupled to the machine 20, such as through a wireless and/or wireline communication.

In some example embodiments, the control device 600 may be configured to provide the user interface 180 to display and/or enter the data used to form the whips. The user interface 180 may include a display with a touchscreen 186 for a user to interact with control buttons and/or a keypad of the user interface 180, and/or to view and enter cutting information and other data into the machine 20 to form the whips, as described in more detail below. Other types of possible user interfaces 180 include but are not limited to a physical keyboard, mouse, trackball, switches, physical buttons, etc. The control device 600 can also include a non-transitory memory 602, a processor 604 configured to process the inputted data used for accurately forming the whips, and interface(s) 606 to be used for wireless and/or wired connections to the control device 600. The interface(s) 606 can operably connect the machine 20 to external wireless and wired devices 608, 610 to receive data from wireless or wired devices 608, 610 to be used when forming the whips. The received data can be stored in memory 602. While illustrated as a single memory 602, it will be appreciated that in some example embodiments, the memory 602 may include multiple individual memory devices collectively providing functionality of the memory 602, which may be distributed across one or more computing devices that may provide functionality of the control device 600. In some example embodiments, the memory 602 may include non-transitory memory. The memory 602 can store the inputted cutting information and other data, and also store instructions (e.g., compiled executable program instructions, uncompiled program code, some combination thereof, or the like), which when performed (e.g., executed, translated, interpreted, and/or the like) by the processor 604, causes the processor 604 to perform the processes described herein. For example, when the instructions are executed by the processor 604, the processor can use the data to fabricate the whip, e.g., as described in FIGS. 61 and 62A-62D and elsewhere herein. In this regard, the processor 604 may be configured to control operation (e.g., movement) of one or more components of the machine 20 that may be used to form a whip based at least in part on inputted data, code stored in memory 602, and/or based on a hardware configuration of the processor 604. The data may include various types of information regarding the cable 22 including, but not limited to, the cable manufacturer, the cable armor (aluminum or steel jacket), the cable type, the notch depth and the notch length, see FIGS. 63 and 66) and various types of information regarding the whip(s) to be formed including, but not limited to, the whip length, the lead length (the amount of cable 22 prior to the first notch), the tail length (the amount of cable 22 after the second notch), and the number of whips, see FIGS. 64 and 67. While illustrated as a single processor 604, it will be appreciated that in some embodiments, the processor 604 may include multiple processors collectively configured to provide functionality of the processor 604 and which may be distributed across one or more computing devices that may provide functionality of the control device 600.

An example processor 604 includes, but is not limited to, a programmable logic controller (PLC) manufactured by Horner APG, LLC, model number XL7 (HE-XW1E2). The interface(s) 606 can include one or more wired and wireless interfaces. Wired interfaces can include connectors and/or ports to connect with one or more of controller area network (CAN) bus, universal serial bus (USB), USB mini, FireWire, Thunderbolt, Lightning, memory cards, Ethernet (RJ-45 connector), modular jack (MJ), input and output (I/O), other serial communications ports, other parallel communications ports, and/or other wired interfaces that may be used to operably connect the machine 20 with wired input devices, etc. Wired devices 610 can include one of more of computers, smartphones, USB memory sticks, memory cards, sensors, etc. Wireless interfaces can include, but are not limited to, one or more of BLUETOOTH™, IEEE 802.11 Wi-Fi communications, satellite, cellular communications, Zigbee, etc., and/or other wireless interfaces that may be used to operably connect the machine 20 to wireless input devices. Wireless devices 610 include one or more computers, smartphones, tablets, etc.

In some embodiments, the control device 600 is in communication with the motor 79 and is configured to control and monitor the motor 79 which drives the feed roller 68. Accordingly, the control device 600 may be configured to control rotation of the feed roller 68. In some embodiments, the control device 600 is in communication with the motor 108 and is configured to control and monitor the motor 108. Accordingly, the control device 600 may be configured to control rotation of the notching saw 30. In some embodiments, the control device 600 is in communication with the motor 116 and is configured to control and monitor the motor 116. Accordingly, the control device 600 may be configured to control movement of the notching saw 30. In some embodiments, the control device 600 is in communication with the motor 160 and is configured to control and monitor the motor 160. Accordingly, the control device 600 may be configured to control actuation of the cutting assembly 66. In some embodiments, the control device 600 is in communication with the motor 168 and is configured to control and monitor the motor 168. Accordingly, the control device 600 may be configured to control movement of the cutting saw blade 32. In some embodiments, the motors 116 and 168 include interfaces, such as CAN bus interfaces configured to receive control signals from the control device 600. Other types of communication interfaces can be used to send control signals to the motors 116 and 168. In some embodiments, the control device 600 is in communication with the motor 238 configured to control and monitor the motor 238. Accordingly, the control device 600 may be configured to control actuation of the cutting inserts 232.

In some embodiments, the machine 20 allows for the fabrication of whips based upon received data, such as may be inputted by a user (e.g., via user interface 180) and/or received from an external computing device (e.g., from a wireless device 608 or wired device 610) that may interface with the machine 20 (e.g., via interface(s) 606). The data used to form the whips can include various types of information including one or more of the cable manufacturer, the cable armor (aluminum or steel jacket), the cable type, the notch depth and the notch length, see FIGS. 63 and 66) and various types of information regarding the whip(s) to be formed including, but not limited to, the whip length, the lead length (the amount of cable 22 prior to the first notch), the tail length (the amount of cable 22 after the second notch), and the number of whips, see FIGS. 64 and 67.

The control device 600 can control and monitor the motors 79, 108, 116, 160, 168 based on data that is inputted to the control device 600 by the user. Additionally, or alternatively, in some embodiments, the machine 20 allows for the fabrication of whips based upon data that is automatically extracted from architectural drawing models using an application, e.g., including but not limited to AUTODESK REVIT, BENTLY. The control device 600 can control and monitor the motors 79, 108, 116, 160, 168 based on data that is inputted to the control device 600 from the application. Additionally, or alternatively, in some embodiments, the machine 20 allows for the fabrication of whips based upon information inputted from a spreadsheet(s), for example as shown in spreadsheets illustrated in FIGS. 63 and 64. The spreadsheet may be interpretable by a spreadsheet application, such as by way of non-limiting example, EXCEL by MICROSOFT, as a list of comma separated values (CSV), and/or other data structure capable of organizing the output data in a manner that may be interpreted by a computer application and/or by a human operator. The control device 600 can control and monitor the motors 79, 108, 116, 160, 168 based on data that is inputted to the control device 600 from the spreadsheet. Additionally, or alternatively, in some embodiments, the machine 20 allows for the fabrication of whips based upon saved files which are in the memory 602 of the control device 600. The control device 600 can control and monitor the motors 79, 108, 116, 160, 168 based on data that is saved in the memory 602. Additionally, or alternatively, in some embodiments, the machine 20 allows the user to change the inputted dimensions for a particular whip. The control device 600 can control and monitor the motors 79, 108, 116, 160, 168 based on data that is changed by inputs to the control device 600 by the user.

Architectural drawing models used in some embodiments for inputting cutting information and other data to the machine 20 to control the machine 20 include but are not limited to building information modeling (BIM) drawings. The BIM drawings may be produced by software used by architects, structural engineers, mechanical, electrical and plumbing (MEP) engineers, designers and contractors, etc. Example types of BIM software include AUTODESK REVIT, BENTLY and other BIM applications. The applications, and any of the software described herein, may be implemented by hardware, software or firmware, or a combination thereof, and may be stored locally to the machine 20, embodied in the form of a portable computer-readable medium and code, embodied on one or more external computing devices and/or distributed over a network, etc. In embodiments in which the machine 20 allows for the fabrication of whips based on data that is automatically extracted from the architectural drawing models using the application, the application may, for example, be implemented as a plug-in application. The control device 600 controls and monitors the motors 79, 108, 116, 160, 168 based on data that is inputted to the control device 600, e.g., the data that the application automatically determined from architectural drawings for controlling the machine 20 to form the whip.

Figure 61:
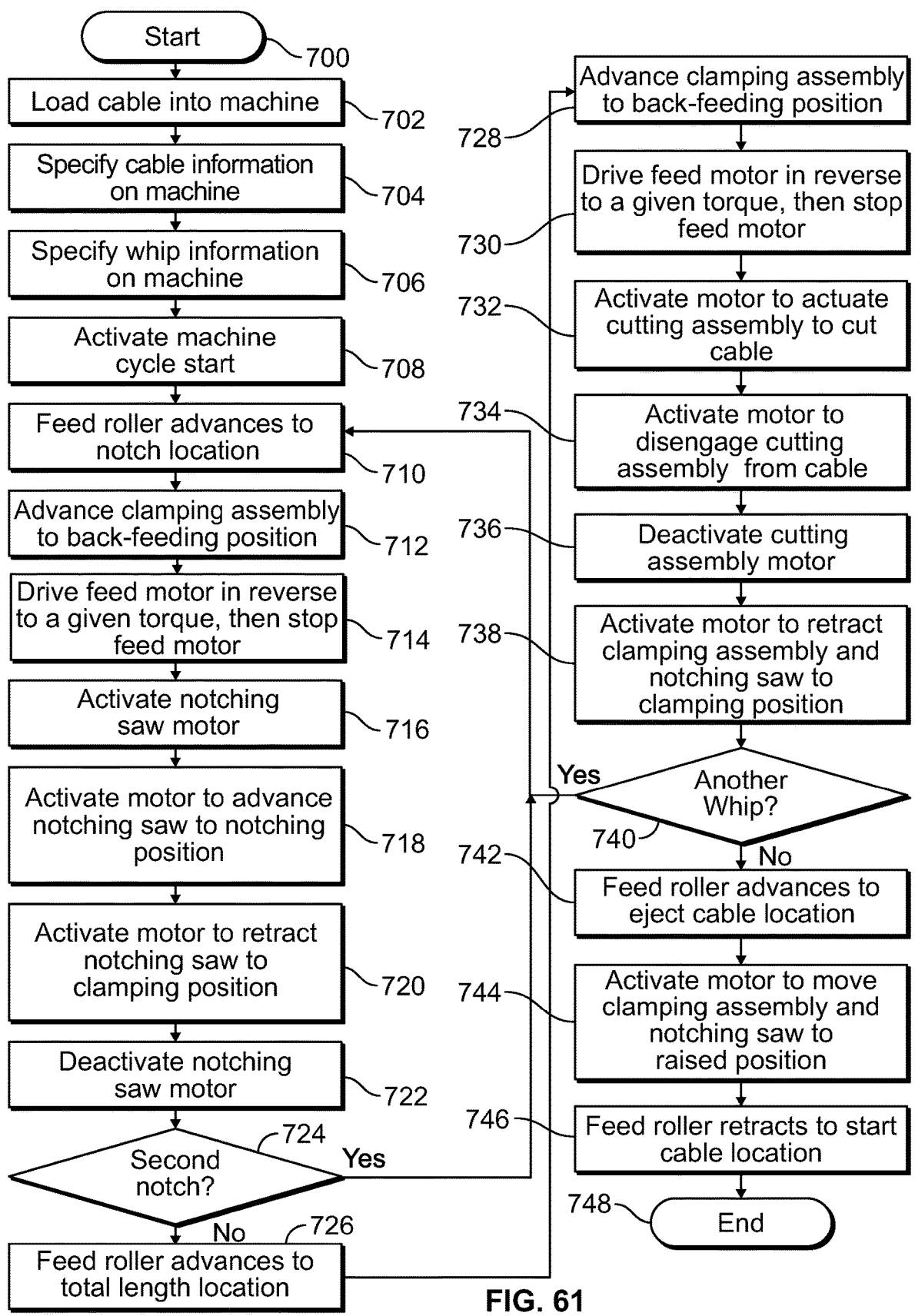
FIG. 61 depicts an example flow chart which illustrates example operations taken to form a whip in some embodiments.
Figure 62A:
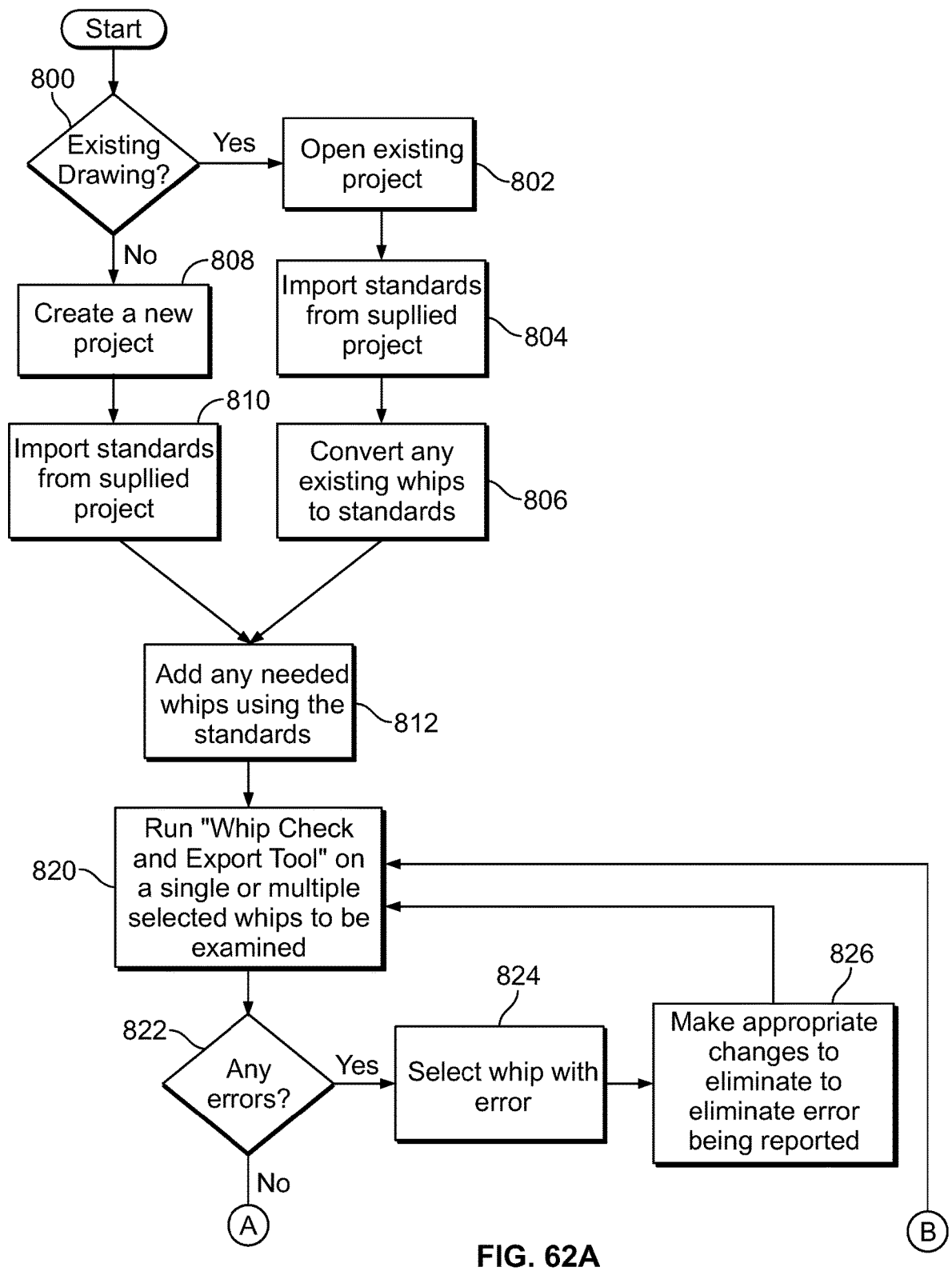
FIGS. 62A-62D depict a flowchart of an example process in accordance with an example embodiment configured to convert architectural drawings to data used to fabricate the whips.
Figure 62B:
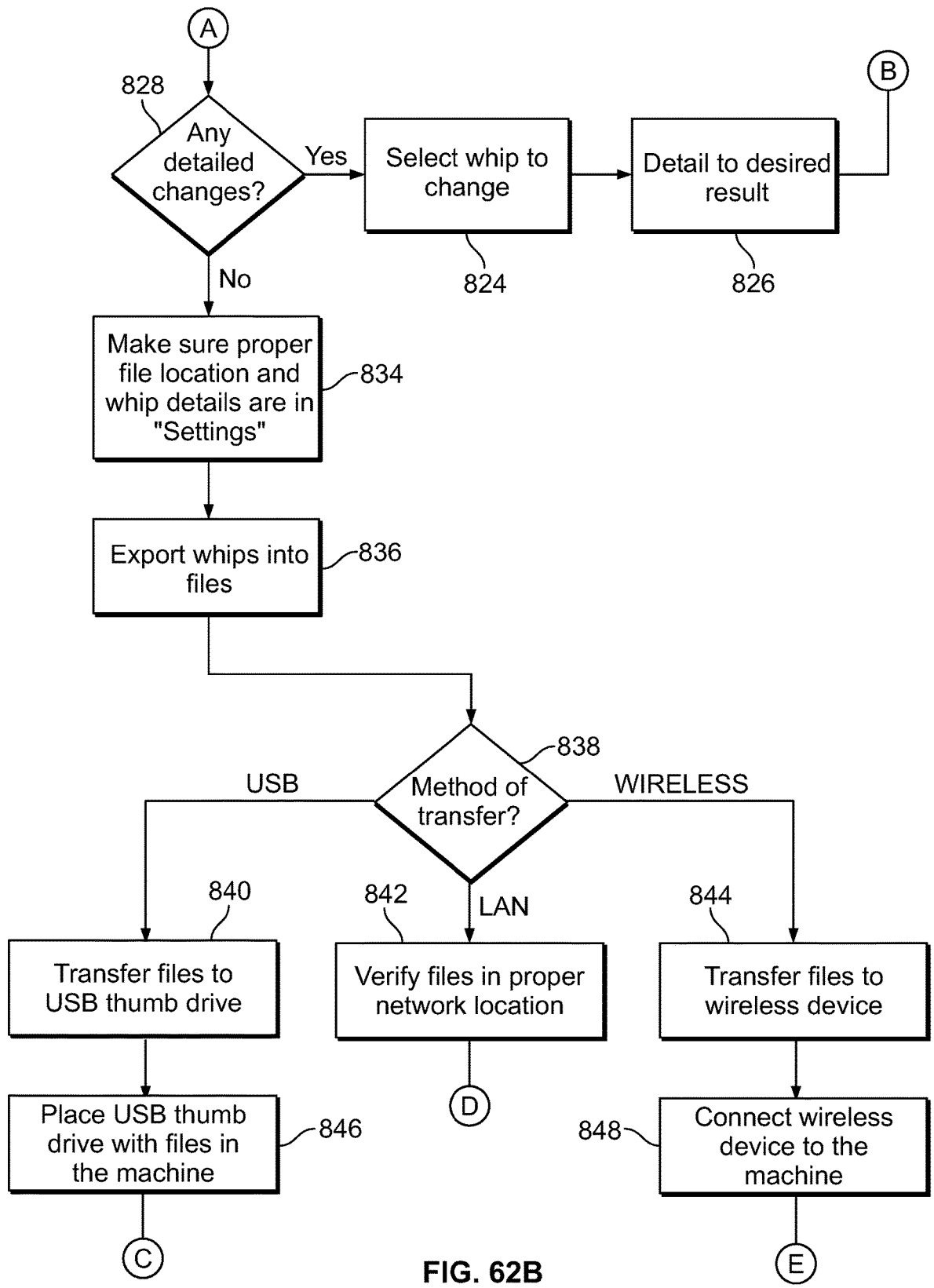
Figure 62C:
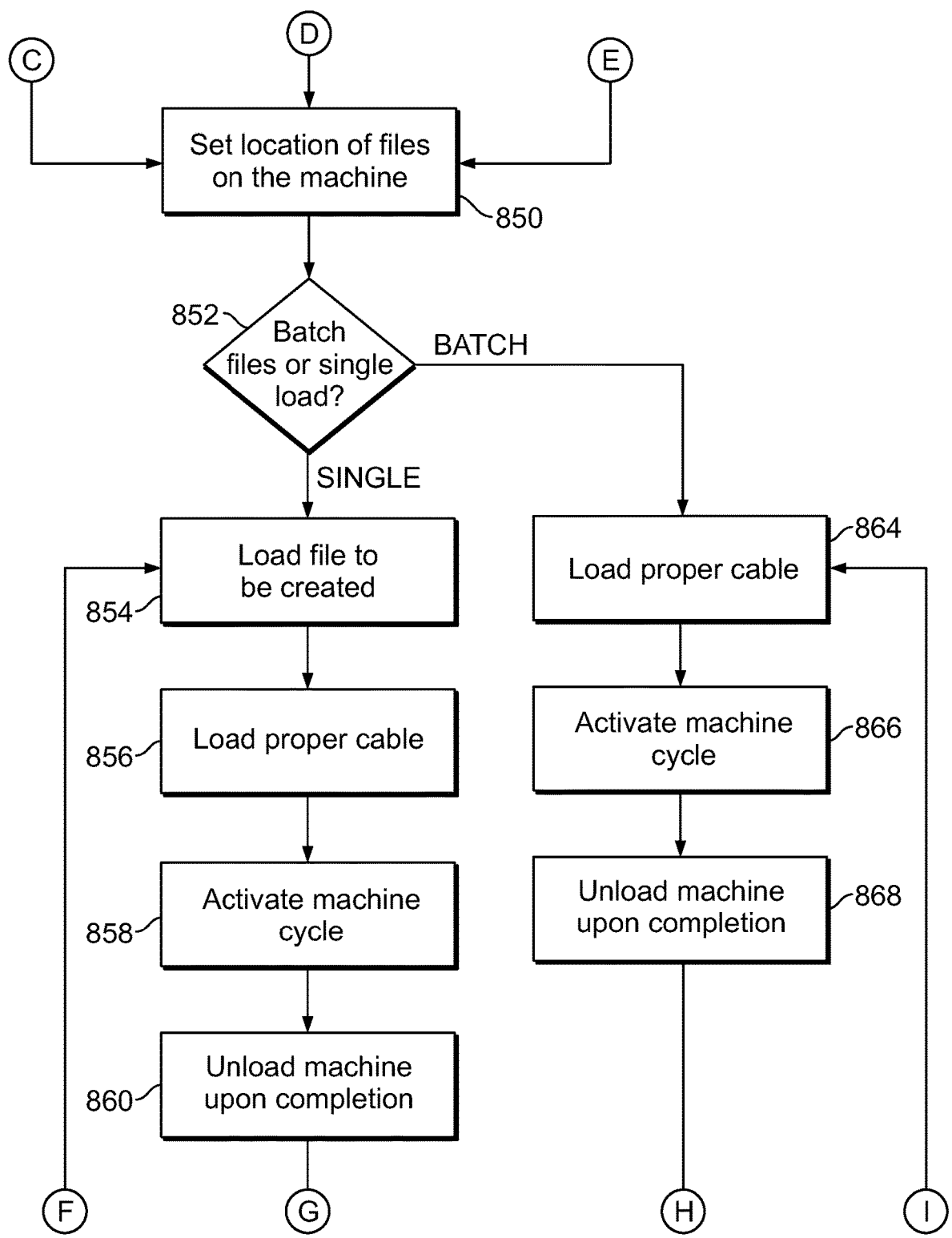
Figure 62D:
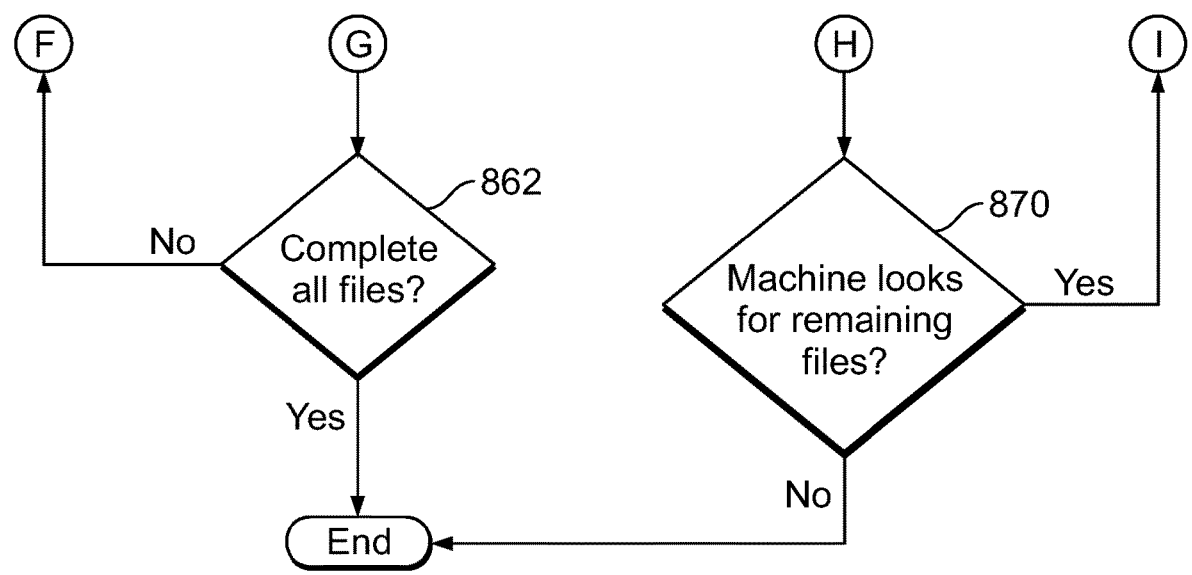

FIG. 61 depicts an example flow chart which illustrates example operations taken to form a whip in some embodiments. In some embodiments, alternative and/or additional or fewer operations may be used. Further, in some embodiments, one or more operations may be performed in an order different from that illustrated and/or some operations may be performed concurrently. In accordance with various embodiments, one or more of the operations illustrated in and described with respect to FIG. 61 may be at least partially performed by and/or at least partially performed under the control of processing circuitry (e.g. memory 602 and/or processor 604), such as may be provided by a control device 600 as described herein.

Referring now to FIG. 61, in accordance with some embodiments, in an initial operation, the machine 20 is turned on (700) and cable 22 is loaded into the machine 20 through the input 58 (702). Information regarding the cable (22) and whip information are specified (704, 706), such as described in the example embodiments via information inputted by a user (e.g., via user interface 180) and/or received from an external computing device (e.g., from a wireless device 608 or wired device 610), via data that is automatically extracted from architectural drawing models using an application, via information inputted from a spreadsheet, via upon saved files. Regardless of how the information is specified (704, 706), it will be appreciated that these operations include receipt by the control device 600 of the information. At (708) the machine cycle start is activated. The motor 79 is activated to rotate feed roller 68 until the cable 22 advances along the cable travel space 62 and into the clamping assembly 34 a predetermined amount where the first notch will be made (710). The motor 116 is activated to move the clamping assembly 34, 234 to the back-tensioning position (712). The cable 22 is then back tensioned by rotating the feed roller 68 in a reverse direction by driving the motor 79 until the motor 79 is at a predetermined torque, and hereafter, the motor 79 is deactivated (714). The motor 108 is activated to rotate the notching saw 30 (716). The motor 116 is activated to move the notching saw 30 to the notching position (718) to notch the cable 22. Thereafter, the motor 116 is activated to move the notching saw 30 to the clamping position (720). The motor 116 is then deactivated (722). The control device 600 determines if a second notch needs to be made at (724). If yes at (724), operations (710) through (724) are repeated. If no at (724), the motor 79 is activated to rotate the feed roller 68 to move the cable 22 to the total length location (726). The motor 116 is activated to move the clamping assembly 34, 234 to the back-tensioning position (728). The cable 22 is then back tensioned by rotating the feed roller 68 in a reverse direction by driving the motor 79 until the motor 79 is at a predetermined torque, and hereafter, the motor 79 is stopped (730). The motor 160/238 is activated to activate the cutting assembly 66 to cut the cable 22 (732), and the cutting assembly 66 is then disengaged from the cable 22. The cutting assembly 66 is thereafter deactivated (736). The motor 116 is activated to move the clamping assembly 34 and the notching saw 30 to the clamping position (738). The control device 600 then determines if another whip is to be formed at (740). If yes at (740), operations (710) through (740) are repeated. If no at (740), the motor 79 is activated to rotate the feed roller 68 until the cable 22 is advanced to the cable discharge location (742). The motor 116 is activated to move the clamping assembly 34, 1034 to the raised position (744). Thereafter, the feed roller 68 is retracted to the start cable location (746). When no further whips are to be formed by the machine 20, the operation ends at (750).

With regard to operations (716) and (718), the length of the notch can be adjusted to be longer as shown by column in FIG. 63 and the input in FIG. 66 which provides for notch length. Because the notching saw 30 may be circular, the depth at which the notching saw 30 penetrates past the outer metal jacket of the cable 22 must be controlled to avoid damage to the internal conductors of the cable 22. By providing the length of the notch, the notch depth can be controlled (for example to a bare minimum) to ensure that the notches are properly formed in the cable 22. By keeping the notch depth to a minimum, the intrusion of the notching saw 30 into the cable 22 is minimized such that the possibility of damaging the internal conductors is minimized.

In an embodiment, the back-tensioning is not performed.

FIGS. 62A-62D depicts a flowchart of an example process in accordance with an example embodiment for converting architectural drawings to data used for fabricating the whips. It will be appreciated the operations illustrated and described with respect to FIGS. 62A-62D are provided by way of example, and not by way of limitation. In some embodiments, alternative and/or additional or fewer operations may be used. Further, in some embodiments, one or more operations may be performed in an order different from that illustrated and/or some operations may be performed concurrently. In accordance with various embodiments, one or more of the operations illustrated in and described with respect to FIGS. 62A-62D may be at least partially performed by, at least partially performed under the control of, and/or at least partially facilitated by memory 602, processor 604, interface(s) 606, user interface 180, and/or other elements of the control device 600.

The application may be stored as code in a memory, such as memory 602, and executed by a processor, such as processor 604, on a computer having the architectural software. In this example embodiment, application processes architectural drawings to determine data from the drawings needed by the machine 20 to form whips. The application may be loaded onto the machine 20 for executing with the architectural BIM drawing tool, e.g., AUTODESK REVIT, BENTLEY, etc. or may be stored separately, e.g., in the cloud, on an external computing device that may communicate with machine 20, such as a wireless device 608 and/or wired device 610, and/or may otherwise be stored on and/or executed by one or more computing devices external to machine 20. For existing drawings (800), the drawing project is opened in the BIM software (802) and a standard or set of standards for the whips (generally referred to as standards) are imported from the application (804). The application converts existing whips in the drawings to match the standards (806), e.g., by replacing the lengths of the existing whips to match the standards. The data determined by the application for the whip length (see, e.g., FIG. 64) are sent to machine 20 and then used by the machine 20 to form the whips. Depending on an implementation, the application may also provide for other types of standards that differ from the standards. If a new project drawing is being created (808), the application imports the standards for use with the creation of the new drawing (810).

After the whips are drawn or converted to the desired standard, any whips that are missing are added to the drawings based on the standard (812). The runs include, for example, the number of whips, the length of the whips, etc. The standards help ensure that the whips are formed as accurately as possible using the BIM software.

The user may then initiate a "Whip Check and Export Tool" of the application for single or multiple selected whips to be examined (820). The application determines whether there are any errors, e.g., whether the whips meet the specifications for the standards that may be imported to the drawing application (822). The application may output a table or other data structure that lists the name of the whip and other characteristics of the whip, whether there were errors, the type of errors, etc. The output data structure may, for example, be formatted as a spreadsheet interpretable by a spreadsheet application, such as by way of non-limiting example, EXCEL by MICROSOFT, as a list of comma separated values (CSV), and/or other data structure capable of organizing the output data in a manner that may be interpreted by a computer application and/or by a human operator. The application may select the whips with errors (824) and changes are made to correct the error being reported (826). After the modifications are made to the drawing, the "Whip Check and Export Tool" of the application may be re-executed and the outputted table re-checked for errors (820).

After any errors are corrected, the application checks for any detail changes (828). The whips with details to be changed are selected (830) and the details of the whips are changed based on the desired result (832). The "Whip Check and Export Tool" of the application is re-executed and the outputted table re-checked for errors (820).

The application may include a settings menu such as for setting details about the whip including length of the whip in some embodiments. In some embodiments, the user may set desired whip details and data export location in the settings menu (834). The data determined by the application based on the architectural drawings may be exported in files (836). One example file is a comma separated values (CSV), but other file formats may be used. The files may be transferred to on-board storage (838) (e.g., a hard drive, flash memory, and/or other on-board storage) of the control device 600 executing the application and/or external memory, such as a universal serial bus (USB) flash memory device (840) that may be inserted into the machine 20. Additionally, or alternatively, in some embodiments the data may be sent over a wireless and/or wired communications network, e.g., to a memory location accessible by the machine 20 (842). Additionally, or alternatively, in some embodiments the data may be transferred by a wireless or wired capable device 608, 610, e.g., a computer, a tablet, a smartphone, etc. (844). Additionally, or alternatively, in some embodiments the data may be transferred via a cloud memory storage, etc. The USB device may be inserted in a USB slot of the interface(s) 606 (846). Additionally, or alternatively, in some embodiments the wireless or wired device 608, 610 may connect with the machine 20 to communicate the data files via a wired, wireless or hybrid communication to the control device 600 of the machine 20 (848). Wired technologies include but are not limited to telephone networks, cable networks, fiber-optic communications, the Ethernet, etc. Wireless technologies include but are not limited to Wi-Fi, BLUETOOTH, ZigBee, Z-wave, WirelessUSB, WirelessHD, Wireless HART, UWB, Wireless Regional Area Network (WRAN), near field communication (NFC), ISA100a, Radio Frequency Identification (RFID), Infrared (IR), ISM Band, Institute of Electrical and Electronics Engineers (IEEE) 802.15.4, ANT+, 6LoWPAN, Ultra Wideband, satellite networks, cellular networks, etc.

The BIM drawing includes whip runs. Using the application each whip run may be broken down to standard sized whips. A selected whip is a user or application selected whip. The selected whip includes an identified start point and endpoint. The application also allows for selection of properties of the selected whip.

A comma separated value (CSV) output file may be generated which includes data as determined by the application. The output file may be outputted to a spreadsheet application, such as MICROSOFT EXCEL, or other application. The output file shows the version of the file format 1102 and units 1104, e.g., English or Metric. The output file (e.g., an EXCEL file) and/or an application that may be used to read or otherwise access the output file may include a macro application to convert the output data to a format or visual picture that a user may read to form the whips. As described above, the application determines the data from architectural drawings and outputs the data as output files, such as comma separated value (CSV) files, to be used by the machine 20 to form whips. This may provide accuracy and save a lot of time and money over currently known methods.

In an example embodiment, the control device 600 of the machine 20 allows the user to set a location of the whip file or files storage so that the machine 20 may find the files to use data determined from the application for forming the whips (850). For example, the control device 600 allows the user to identify a network location of the data file or files. If multiple files are stored at the location, the machine 20 may obtain and work through all the files one-by-one. For example, the machine 20 may work through a series of files corresponding to the whips to be used for a particular job construction site or subsection of the job site. When an autoloader is used together with the machine 20, all of the length(s) of cable 22 may be loaded into the autoloader and the machine 20 may receive the length(s) of cable 22 one-by-one from the autoloader to form the whips based on the data in the files, without the need for each length of cable 22 to be individually loaded into the machine 20 by a user. All or some of the length(s) of cable 22 may be loaded into the autoloader at the same time. When the autoloader runs out of length(s) of cable 22, more length(s) of cable 22 may be loaded into the autoloader. In some example embodiments, regardless of whether the length(s) of cable 22 are individually loaded or batch loaded, the control device 600 may prompt the user regarding what type of cable 22 to load in the machine 20, when to place the length(s) of cable 22 in the machine 20, and when the formation of the whip is completed and the whip is ready to be removed from the machine 20.

The control device 600 determines if the files containing the data for creating the whips are for a batch or single load (852). For single files, the control device 600 loads the data from the file to the machine 20 (854). The proper whip size and type is loaded into the machine 20 (856). The machine 20 forms the whip based on the data provided by the application (858). The processor 604 of the control device 600 executes the programs stored in memory 602 with the data to form the whips.

After the whip has been formed, the whip exits the machine 20 and is removed from or output from the machine 20 (860). The machine 20 is then ready to form another whip. The control device 600 determines if all the files for forming the whips have been completed (862). If not, data from a next file to be completed is loaded to the machine 20 (854).

If the files are being processed as a batch of files, then the lengths of whips for those files are loaded into the machine 20. The loaded whips are formed based on the data in the batch of files (864). For example, all or a portion of the whips for a job site are loaded at once to an auto-loader. The control device 600 may point to a directory containing the batch of files, either stored locally in memory 602 of the control device 600 and/or stored remotely. The machine 20 is activated to form the whips based on the data in the files (866). After the whips are formed based on the batch of files, the machine 20 may determine if there are any more files remaining to be processed (870). A flag may be set in the file once it is processed so that the machine 20 may determine which files, if any, remain to be processed.

Figure 70:
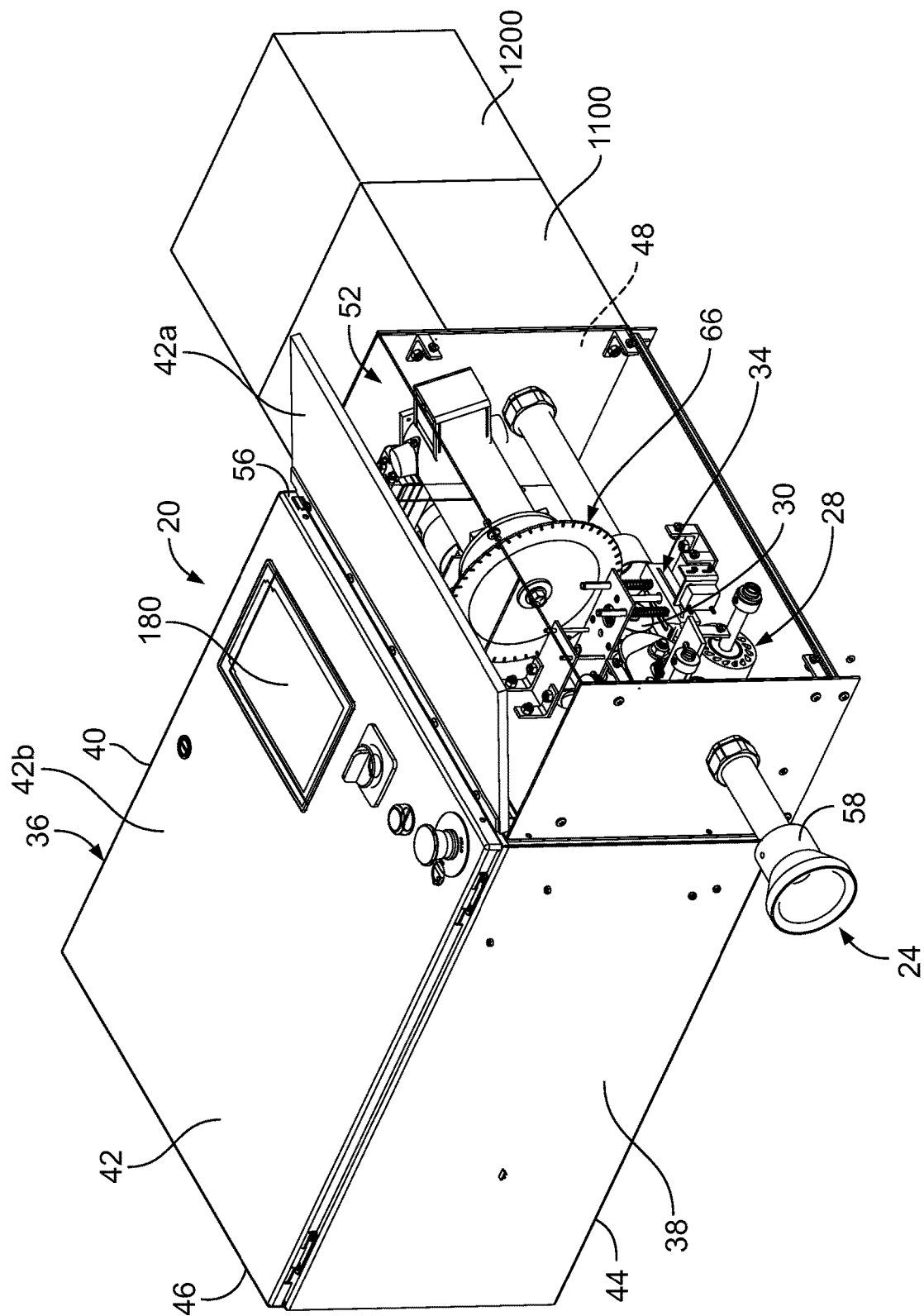
FIG. 70 depicts a perspective view of a machine showing an embodiment with a labeler and a coiling apparatus.

As shown in FIG. 70, the machine 20 may include a labeler 1100 such that the whips may be labeled for assembling the formed whips in the correct locations and order at a jobsite. The label may include assembly information, e.g., a unique identifier for the whip. The label may be applied in several ways and at one or more of several different locations on or attached to the machine 20. The labeler 1100 may be mounted before and/or after the machine 20, or within the cabinet 36, 336. As shown in FIG. 1, the labeler 1100 is after the machine 20. The output tube 60 can be provided as part of the labeler 1100. The labeler 1100 may be formed as a separate component and attached to the cabinet 36, 336. For example, the label may be applied before and/or after formation of the whips, and/or after and/or before the whip is removed from the machine 20. In one example, the label is applied by laser or thermal printing, or as a decal/sticker, e.g., as a barcode by a barcode printer, such as a barcode printer available from ZEBRA located on the machine 20. In another example, the label includes an RFID tag encoded and printed by ZEBRA RFID printer models. In another example, an inkjet printer head, etcher or ball pen applies a label directly to the length of cable 22 before being notched, or after the whip has been formed. The label printing may be triggered when the control device 600 is activated to load the cable in the machine (block 802) or when the control device 600 is activated to unload the machine 20 upon completion of the formation of the whip (blocks 860 or 868).

As shown in FIG. 70, the machine 20 may include a coiling apparatus 1200 such that the whips may be coiled for shipment. The coiling apparatus 1200 winds the whips into coils and then secures the coil with a tie to maintain the coil shape. Examples of suitable ties are plastic or metal zip ties, rope, shrink wrap, etc. The coiling apparatus 1200 is provided after the machine 20 (or labeler 1100 if the labeler is after the machine 20), or within the cabinet 36, 336 after the whip is formed. The labeler 110 could be provided after the coiling apparatus 1200 and the label applied to the coiled whip. The coiling apparatus may be triggered when the control device 600 is activated to unload the machine 20 upon completion of the formation of the whip (blocks 860 or 868).

In the embodiment in which the machine 20 allows for the fabrication of whips based upon information from a spreadsheet, see FIGS. 63 and 64, such as for example in a comma separated value (CSV) file format, the user inputs the data for forming the whip or whips. In a building, the whip requirements are known based off of layout, for example based upon blueprints. The data may include various types of information regarding the cable 22 including, but not limited to, the cable manufacturer 900, the cable armor 902 (aluminum or steel jacket), the cable type 904, the notch depth 906 and the notch length 908, see FIGS. 63 and 64) and various types of information regarding the whip(s) to be formed including, but not limited to, the whip length 910, the lead length 912 (the amount of cable 22 prior to the first notch), the tail length 914 (the amount of cable 22 after the second notch), and the number of whips 916 to be formed, see FIGS. 64 and 67. The information is input into a spreadsheet or CFC format and then the machine 20 reads in the spreadsheet from a USB or from a network or download through Bluetooth device, such as a phone or a tablet. The machine 20 may read that as whole batch of files and then processes it from that. The output data structure may, for example, be formatted as a spreadsheet interpretable by a spreadsheet application, such as by way of non-limiting example, EXCEL by MICROSOFT, as a list of comma separated values, and/or other data structure capable of organizing the output data in a manner that may be interpreted by a computer application and/or by a human operator. Upon receipt of the data from the spreadsheet, the control device 600 is programmed to form the individual whips.

Figure 65:
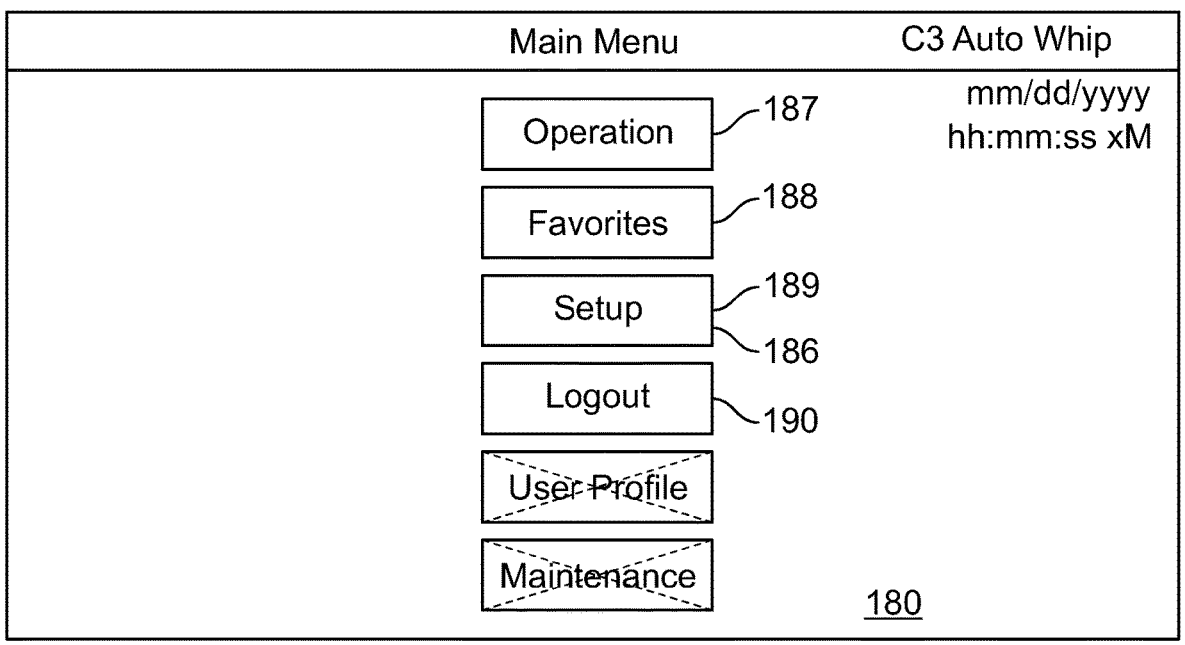
FIG. 65 depicts a screenshot of an example main menu displayed by a user interface of the machine.

FIG. 65 is a screenshot of an example main menu displayed by the user interface 180 of the machine 20. It will be appreciated that the example of FIG. 65 is provided by way of example, and not by way of limitation and alternative display arrangements of information, selectable menu options, inputs, and the like are contemplated within the scope of the disclosure. The user interface 180 of some example embodiments comprises the touchscreen 186 enabling touch interaction with inputs displayed on the user interface 180. The touchscreen 186 may, for example, comprise a capacitive touchscreen display. However, it will be appreciated that any suitable touchscreen technology may be used within the scope of the disclosure. In some embodiments, the main menu displays input buttons including an 'operation' button 187, a 'favorites' button 188, a 'setup' button and a 'logout' button 190.

In the embodiment in which the machine 20 allows for the fabrication of whips based upon saved files which are in the memory 602 of the control device 600, information is programmed into the memory 602 as stored files. The user can touch the user interface 180 to access the saved files under the 'favorites' button. A plurality of stored files which relate to different whip lengths may be programmed into the memory 602 and will be displayed upon the touching of the 'favorites' button. The user can call up a desired whip or several desired whips. The control device 600 may be programmed to allow the user to enter an individual stored whip file to form a particular whip, or to enter a batch of whip files to form a plurality of whips which may have different specifications. When the user calls up a desired whip or whips, the machine 20 forms the whip or whips under the control of the control device 600.

In the embodiment in which the machine 20 allows for the fabrication of whips based upon inputted dimensions for a particular whip, the user enters in the necessary data, for example the whip length, the lead length, the tail length and the number of whips, via the user interface 180 for example by touching the 'setup' button.

FIGS. 66-68 depict screenshots of an example display of the user interface 180 during setup for forming a whip or whips. On a first screen as shown in FIG. 66, the touchscreen 186 includes input fields for a user to supply the cable type configuration, which may include a cable manufacturer name, the cable armor, the cable type, the notch depth and the notch length. On a second screen as shown in FIG. 67, the touchscreen 186 includes input fields for a user to supply the whip configuration, which may include a whip length, lead length, trail length and number of whips for each whip to be formed. On a third screen as shown in FIG. 68, the touchscreen 186 includes input fields for a user to supply the cut length setup, which may include the notch position, the number of cables 22, the lead length, the trail length and the cut length. When the input field is touched on the touchscreen 186, the user interface 180 can display an alphanumeric keypad for the user to enter the field information to an application via the touchscreen 186. The user interface 180 can also allow for selection of different measurement systems, e.g., lbs/ft or Kg/M, using the touchscreen 186, e.g., via an application. A 'Start Cycle' icon 198, see FIG. 68, is used to start the formation of the whip.

FIG. 69 is a screenshot of an example display of the user interface 180 during a whip forming operation. The user interface 180 displays various items of information relating to the formation of the whip, the cable 22 length remaining on the spool, the number of notches made by the notching saw 30, the number of cuts made by the cutting assembly 66 etc.

Additional or alternative, to Bluetooth, wireless communication in some embodiments includes but is not limited to near field communication (NFC), Wi-Fi, ZigBee, Z-wave, WirelessUSB, WirelessHD, Wireless HART, UWB, Wireless Regional Area Network (WRAN), ISA100a, Radio Frequency Identification (RFID), Infrared (IR), ISM Band, Institute of Electrical and Electronics Engineers (IEEE) 1802.15.4, ANT+, 6LoWPAN, Ultra-Wideband, satellite networks, cellular networks, etc. Additionally, or alternatively, in some embodiments the communication device can connect to the machine 20 via a wired technology including but not limited to telephone networks, cable networks, fiber-optic communications, the Ethernet, etc. In one example, the communication device connects with the machine 20 via a communication port.

In each embodiment, the notch depth can be selected based on predefined parameters, such as user stored settings. A look-up table with pre-set notch depths based on manufacturer and/or cable type can be stored in the memory 602 and used by the processor 604 during the operation. The presets may be scaled/adjusted based on saw wear.

In some embodiments, a sensor may be mounted on the machine 20, for example on one of the arms 84, by suitable means, and is configured to sense the presence, and/or size, of the cable 22 under the feed roller 68. The sensor is in communication with the control device 600 and can be embodied as any of a variety of sensors capable of detecting presence and/or proximity and/or size of the cable 22, such as by way of non-limiting example, a laser sensor, a photoelectric sensor or a proximity sensor. The sensor senses whether the cable 22 is present and communicates this information to the control device 600.

In some embodiments, a sensor may be mounted on the clamping assembly 34 to monitor the amount of force of the clamping assembly 34 when the clamping assembly 34 is moved to the various positions, namely the raised position, the clamping position, and the notching position. Such a sensor may be mounted on the stamping 110. The sensor is in communication with the control device 600 and can be embodied as any of a variety of sensors capable of detecting force, such as by way of non-limiting example, a force pin, a pressure pad sensor or a bolt sensor. The sensor senses force of the clamping assembly 34 on the cable and communicates this information to the control device 600.

In some embodiments, a sensor may be mounted on the notching saw assembly 64 to monitor the amount of travel of the notching saw 30 when the notching saw 30 is moved to the various positions, namely the raised position, the clamping position and the notching position. Such a sensor may be mounted on the stamping 110. The sensor is in communication with the control device 600 and can be embodied as any of a variety of sensors capable of detecting travel, such as by way of non-limiting example, a laser sensor, a photoelectric sensor or a proximity sensor. The sensor senses the travel distance of the notching saw 30 and communicates this information to the control device 600.

In some embodiments, a sensor may be mounted on the cutting assembly 66 to monitor the amount of travel of the cutting assembly 66 when the cutting assembly 66 cuts the cable 22 into a whip. Such a sensor may be mounted on the stamping 162. The sensor is in communication with the control device 600 and can be embodied as any of a variety of sensors capable of detecting travel, such as by way of non-limiting example, a laser sensor, a photoelectric sensor or a proximity sensor. The sensor senses the travel distance of the cutting assembly 66 and communicates this information to the control device 600.

In some embodiments, a sensor may be mounted on the cutting assembly 66 to monitor the amount of force of the cutting assembly 66 when the cutting assembly 66 cuts the cable 22 into a whip. In some embodiments, such a sensor may be mounted on the stamping 162 to detect but not limited to saw wear, when saw is moving through the cable material, and when the cutting has been complete. The sensor is in communication with the control device 600 and can be embodied as any of a variety of sensors capable of detecting force, such as by way of non-limiting example, a force pin, a pressure pad sensor or a bolt sensor. The sensor senses the force of the cutting assembly 66 while cutting and communicates this information to the control device 600.

In some embodiments, the machine 20 may have a tray (not shown) provided under the notching saw 30 and the cutting assembly 66 to collect any chips which result from the operations.

In some embodiments, the machine 20 may include a lock (not shown) on the front wall section 42*a* to prevent easy access to the components in the front compartment 52 of the machine 20. The lock may be in communication with the control device 600 and the control device 600 is programmed to lock the front compartment 52 during the operation.

In the first embodiment shown in FIGS. 1-41, some components of the machine 20 are described as being attached, affixed or mounted on the support wall 50. It is to be understood that the support wall 50 can be eliminated and replaced by the support wall 550 and brackets to hold the various components in the cabinet 36, 336.

While various embodiments have been described as forming one or more notches in a length of cable 22 (e.g., a whip cut to length), it will be appreciated that the operation/function of cutting a notch/notches in the cable 22 can be omitted within the scope of the disclosure in accordance with various alternative embodiments. For example, in operation, in accordance with some embodiments, information specified for a given whip may specify that one or more of the lead length, tail length, notch depth, and notch length is to be zero (0), such that cutting of one or both of a lead or tail notch is omitted. As another example, in some embodiments the machine 20 may be configured to cut whips to length, but may not be configured to cut notches and some or all elements of the notching saw assembly 64 may be omitted.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A machine for fabricating a whip from a cable, the cable having an outer jacket and one or more conductors enclosed by the outer jacket, the whip having a portion of the outer jacket and the one or more conductors therein, the machine comprising:
   an input into which the cable is fed into the machine and an output through which the whip exits the machine, wherein a cable travel space is defined along a longitudinal axis between the input and the output;
   a notching saw downstream of the input;
   a first motor operatively connected to the notching saw, wherein the notching saw is configured to be moved between a first position and a second position by the first motor, wherein the notching saw is in contact with the outer jacket of the cable in the first position, and wherein the notching saw is not in contact with the outer jacket of the cable the second position;
   a second motor operatively connected to the notching saw, wherein the second motor is configured to drive the notching saw, wherein activation of the first and second motors causes the notching saw to cut the outer jacket of the cable in a direction parallel to or substantially parallel to the longitudinal axis of the cable to form a notch in the cable when the notching saw is in the first position;
   a cutting tool downstream of the notching saw and upstream of the output, the cutting tool having at least one cutting edge;
   at least one motor operatively connected to the cutting tool, wherein activation of the at least one motor operatively connected to the cutting tool causes the at least one cutting edge of the cutting tool to completely cut the outer jacket and the conductors of the cable from a remainder of the cable during the same cutting motion and in a direction transverse to the longitudinal axis when the at least one cutting edge of the cutting tool passes through the cable travel space to form the whip; and
   a controller configured to receive whip information corresponding to the whip to be fabricated, the controller operatively coupled to the motors and configured to control operation of the motors based at least in part on the whip information corresponding to the whip to be fabricated, wherein in response to receipt of the whip information the controller causes:
   a. the first motor to move the notching saw into the first position when the cable is in a first location,
   b. the second motor to actuate the notching saw to cut a first longitudinally extending notch having a length in the outer jacket of the cable,
   c. the first motor to move the notching saw into the second position,
   d. the first motor to move the notching saw into the first position when the cable is a second location which is spaced from the first location,
   e. the second motor to actuate the notching saw to cut a second longitudinally extending notch having a length in the outer jacket of the cable, the second notch being longitudinally aligned with the first notch,
   f. the first motor to move the notching saw into the second position, and
   g. the least one motor operatively connected to the cutting tool to actuate the cutting tool to completely cut the outer jacket and the conductors of the cable to separate the whip from the remainder of the cable when the cable is in a third location.

2. The machine of claim 1, wherein the whip information includes whip length, lead length, and tail length.

3. The machine of claim 1, wherein the whip information is received based at least in part on one or more of a received user input, information received from an external computing device through wireless or wired technology, data automatically extracted from architectural drawing models using an application, information extracted from a spreadsheet, and one or more saved files.

4. The machine of claim 1, wherein the motors are coupled wirelessly or through wired technology to one or more external devices.

5. The machine of claim 1, further comprising
   a feed roller, and a motor operatively connected to and configured to rotate the feed roller in a reverse direction to back tension the cable, wherein the controller is further configured to control operation of the motor operatively connected to the feed roller based at least in part on the whip information.

6. The machine of claim 1, further including at least one of a coiling assembly configured to wind the whip into a coil after the cable is cut and secure the coil with a tie, and a labeler assembly configured to label the whip after the cable is cut.

7. The machine of claim 6, wherein the labeler assembly is mounted to the machine before or after the machine or mounted within a cabinet.

8. The machine of claim 1, further comprising a pad downstream of the input and operatively coupled to the first motor, wherein a first activation of the first motor causes the pad and the notching saw to move into the first position, and a second activation of the first motor causes the pad and the notching saw to move into the second position.

9. The machine of claim 1, wherein the at least one motor operatively connected to the cutting tool includes a first motor which causes the cutting tool to move into the cable travel space, and a second motor which causes the at least one cutting edge of the cutting tool to completely cut the outer jacket and the conductors of the cable in a direction transverse to the longitudinal axis.

10. The machine of claim 1, further including an interface operatively coupled to the controller, the interface configured to receive whip information and communicate information to the controller.

11. The machine of claim 1, further comprising
   a feed roller downstream of the input and upstream of the notching saw; and
   a motor operatively connected to the feed roller, the motor operatively connected to the feed roller being configured to rotate the feed roller in a first direction to advance the cable along the cable travel space from the input toward the output under the direction of the controller, and further configured to rotate the feed roller in a reverse direction to advance the cable toward the input to back tension the cable under the direction of the controller.

12. The machine of claim 11, further comprising
   a pad downstream of the input and operatively coupled to the first motor; and
   wherein
      a first activation of the first motor causes the pad and the notching saw to move into the first position, and a second activation of the first motor causes the pad and the notching saw to move into the second position.

13. The machine of claim 1, wherein multiple whips are formed along the length of the cable.

14. The machine of claim 13, wherein the whip information includes whip length, lead length, tail length, and number of whips.

15. The machine of claim 1, wherein the third location is spaced from the second location.

16. A machine for fabricating a plurality of whips from a single cable, the cable having an outer jacket and one or more conductors enclosed by the outer jacket, each whip having a portion of the outer jacket and the one or more conductors therein, the machine comprising:

an input into which the cable is fed into the machine and an output through which the whips exit the machine, wherein a cable travel space is defined along a longitudinal axis between the input and the output;

a notching saw downstream of the input;

a first motor operatively connected to the notching saw, wherein the notching saw is configured to be moved between a first position and a second position by the first motor, wherein the notching saw is in contact with the outer jacket of the cable in the first position, and wherein the notching saw is not in contact with the outer jacket of the cable the second position;

a second motor operatively connected to the notching saw, wherein the second motor is configured to drive the notching saw, wherein activation of the first and second motors causes the notching saw to cut the outer jacket of the cable in a direction parallel to or substantially parallel to the longitudinal axis of the cable to form a notch in the cable when the notching saw is in the first position;

a cutting tool downstream of the notching saw and upstream of the output, the cutting tool having at least one cutting edge;

at least one motor operatively connected to the cutting tool, wherein activation of the at least one motor operatively connected to the cutting tool causes the at least one cutting edge of the cutting tool to completely cut the outer jacket and the conductors of the cable from a remainder of the cable during the same cutting motion and in a direction transverse to the longitudinal axis when the at least one cutting edge of the cutting tool passes through the cable travel space to form each whip; and a controller configured to receive whip information corresponding to the whips to be fabricated, the controller operatively coupled to the motors and configured to control operation of the motors based at least in part on the whip information corresponding to the whips to be fabricated, wherein in response to receipt of the whip information the controller causes:

a. the first motor to move the notching saw into the first position when the cable is in a first location, b. the second motor to actuate the notching saw to cut a longitudinally extending notch having a length in the outer jacket of the cable, c. the first motor to move the notching saw into the second position, d. the least one motor operatively connected to the cutting tool to actuate the cutting tool to completely cut the outer jacket and the conductors of the cable in accordance with specifications defined by the whip information to separate the whip from the remainder of the cable when the cable is in a second location and thereby forming a first whip, the second location being spaced from the first location, e. the first motor to move the notching saw into the first position when the cable is in a third location, the third location being spaced from the second location, f. the second motor to actuate the notching saw to cut a longitudinally extending notch having a length in the outer jacket of the cable, g. the first motor to move the notching saw into the second position, and h. the least one motor operatively connected to the cutting tool to actuate the cutting tool to completely cut the outer jacket and the conductors of the cable in accordance with specifications defined by the whip information to separate the whip from the remainder of the cable when the cable is in a fourth location and thereby forming a second whip, the fourth location being spaced from the third location.

17. The machine of claim 16, wherein the whip information is received based at least in part on one or more of a received user input, information received from an external computing device through wireless or wired technology, data automatically extracted from architectural drawing models using an application, information extracted from a spreadsheet, and one or more saved files.

18. The machine of claim 16, further comprising a feed roller, and a motor operatively connected to and configured to rotate the feed roller in a reverse direction to back tension the cable, wherein the controller is further configured to control operation of the motor operatively connected to the feed roller based at least in part on the whip information corresponding to the whip to be fabricated.

19. The machine of claim 16, wherein the at least one motor operatively connected to the cutting tool includes a first motor which causes the cutting tool to move into the cable travel space, and a second motor which causes the at least one cutting edge of the cutting tool to completely cut the outer jacket and the conductors of the cable in a direction transverse to the longitudinal axis.

20. The machine of claim 16, further including an interface operatively coupled to the controller, the interface configured to receive whip information and communicate information to the controller.

* * * * *